US012597529B2

(12) United States Patent
Clarkson et al.

(10) Patent No.: US 12,597,529 B2
(45) **Date of Patent: *Apr. 7, 2026**

(54) NUCLEAR REACTOR PROTECTION SYSTEMS AND METHODS

(71) Applicants: NuScale Power, LLC, Portland, OR (US); PARAGON ENERGY SOLUTIONS, LLC, Forth Worth, TX (US)

(72) Inventors: Gregory Wayne Clarkson, Waverly, KS (US); Rufino Ayala, Corvallis, OR (US); Jason Pottorf, Lebanon, OR (US)

(73) Assignee: NuScale Power, LLC, Corvallis, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 18/518,408

(22) Filed: Nov. 22, 2023

(65) Prior Publication Data

US 2024/0087761 A1     Mar. 14, 2024

Related U.S. Application Data

(63) Continuation of application No. 17/189,038, filed on Mar. 1, 2021, now Pat. No. 11,961,625, which is a
(Continued)

(51) Int. Cl.
*G21C 7/36*          (2006.01)
*G05B 9/03*          (2006.01)
(Continued)

(52) U.S. Cl.
CPC ................. *G21C 7/36* (2013.01); *G05B 9/03* (2013.01); *G21C 9/02* (2013.01); *G21D 3/04* (2013.01);
(Continued)

(58) Field of Classification Search
CPC . H03K 19/00; H02H 3/05; G21C 7/36; G21D 3/00; G21D 3/04; G21D 3/08; G05B 3/03; G05B 2219/25428
See application file for complete search history.

(56) References Cited

U.S. PATENT DOCUMENTS 3,597,939 A       8/1971   Ripley et al.
4,421,716 A  *  12/1983   Hench ...................... G21D 3/06
                                                                          376/207
(Continued)

FOREIGN PATENT DOCUMENTS

CA          3144136 A1  *  7/2015   ............... G05B 9/03
CN          1075224 A        8/1993
(Continued)

OTHER PUBLICATIONS

ISA, International Preliminary Report on Patentability for International Application No. PCT/US2014/072224. Mail Date: Jul. 5, 2016. 9 pages.
(Continued)

*Primary Examiner* — Lily C Garner
(74) *Attorney, Agent, or Firm* — Lee & Hayes, P.C.

(57)          ABSTRACT

A nuclear reactor protection system includes a plurality of functionally independent modules, each of the modules configured to receive a plurality of inputs from a nuclear reactor safety system, and logically determine a safety action based at least in part on the plurality of inputs, each of the functionally independent modules comprising a digital module or a combination digital and analog module, an analog module electrically coupled to one or more of the functionally independent modules, and one or more nuclear reactor safety actuators communicably coupled to the plurality of
(Continued)

functionally independent modules to receive the safety action determination based at least in part on the plurality of inputs.

12 Claims, 42 Drawing Sheets

Related U.S. Application Data continuation of application No. 15/860,434, filed on Jan. 2, 2018, now Pat. No. 11,069,450.

(60) Provisional application No. 62/440,989, filed on Dec. 30, 2016.

(51) Int. Cl.
| | |
|---|---|
| *G21C 9/02* | (2006.01) |
| *G21D 3/04* | (2006.01) |
| G21D 3/00 | (2006.01) |
| H02H 3/05 | (2006.01) |

(52) U.S. Cl.
CPC ... *G05B 2219/25428* (2013.01); *G21D 3/008* (2013.01); *H02H 3/05* (2013.01); *Y02E 30/30* (2013.01)

(56) References Cited

U.S. PATENT DOCUMENTS

| | | | | |
|---|---|---|---|---|
| 4,661,310 A | * | 4/1987 | Cook | G21D 3/04 |
| | | | | 376/254 |
| 4,675,147 A | * | 6/1987 | Schaefer | G21D 3/04 |
| | | | | 702/182 |
| 4,752,869 A | * | 6/1988 | Miller | G21C 17/00 |
| | | | | 976/DIG. 207 |
| 4,783,307 A | * | 11/1988 | Galligan | G21D 3/04 |
| | | | | 376/217 |
| 4,820,475 A | | 4/1989 | Mayers et al. | |
| 4,853,175 A | * | 8/1989 | Book, Sr. | G21C 17/00 |
| | | | | 376/217 |
| 5,621,776 A | | 4/1997 | Gaubatz | |
| 5,892,440 A | * | 4/1999 | Bryan | G05B 23/0267 |
| | | | | 715/810 |
| 6,049,578 A | | 4/2000 | Senechal et al. | |
| 6,292,523 B1 | | 9/2001 | Senechal et al. | |
| 6,369,836 B1 | | 4/2002 | Larson | |
| 6,418,178 B1 | | 7/2002 | Kobsa | |
| 6,449,732 B1 | | 9/2002 | Rasmussen | |
| 6,532,550 B1 | * | 3/2003 | Crew | G21D 3/001 |
| | | | | 714/11 |
| 6,754,846 B2 | | 6/2004 | Rasmussen | |
| 6,988,221 B2 | | 1/2006 | Rasmussen | |
| 7,102,343 B1 | | 9/2006 | Brown | |
| 7,512,917 B2 | * | 3/2009 | Izumi | G06F 30/331 |
| | | | | 716/106 |
| 7,558,292 B2 | | 7/2009 | Gunston | |
| 7,840,285 B2 | | 11/2010 | Wilson | |
| 7,870,299 B1 | | 1/2011 | Sorensen | |
| 8,037,356 B2 | | 10/2011 | Rasmussen | |
| 8,117,512 B2 | | 2/2012 | Sorensen | |
| 8,156,251 B1 | | 4/2012 | Sorensen | |
| 8,331,855 B2 | | 12/2012 | Williams | |
| 8,498,900 B1 | | 7/2013 | Spirin et al. | |
| 8,615,313 B2 | | 12/2013 | Wilson | |
| 10,547,313 B2 | | 1/2020 | Auer | |
| 11,017,907 B2 | * | 5/2021 | Clarkson | G21D 3/001 |
| 11,043,949 B2 | | 6/2021 | Allory et al. | |
| 11,728,051 B2 | * | 8/2023 | Clarkson | G21C 9/00 |
| | | | | 376/245 |
| 2002/0002538 A1 | | 1/2002 | Ling | |
| 2003/0149576 A1 | | 8/2003 | Sunyich | |
| 2006/0031713 A1 | | 2/2006 | Rasmussen | |
| 2007/0076765 A1 | | 4/2007 | Gunston | |

| | | | | |
|---|---|---|---|---|
| 2007/0083444 A1 | | 4/2007 | Matthews et al. | |
| 2007/0244571 A1 | | 10/2007 | Wilson | |
| 2008/0109677 A1 | | 5/2008 | Rasmussen | |
| 2008/0120191 A1 | | 5/2008 | Long | |
| 2008/0130890 A1 | | 6/2008 | Rigler | |
| 2010/0068464 A1 | | 3/2010 | Meyer | |
| 2011/0066598 A1 | | 3/2011 | Wilson | |
| 2011/0173060 A1 | | 7/2011 | Gallagher | |
| 2011/0178863 A1 | | 7/2011 | Daigle | |
| 2011/0187493 A1 | | 8/2011 | Elfstrom et al. | |
| 2011/0202163 A1 | | 8/2011 | Kim et al. | |
| 2011/0302504 A1 | | 12/2011 | Khare et al. | |
| 2011/0313580 A1 | * | 12/2011 | Bakhmach | G05B 9/03 |
| | | | | 700/79 |
| 2012/0009868 A1 | | 1/2012 | Williams | |
| 2012/0108216 A1 | | 5/2012 | Wohlwend et al. | |
| 2012/0147868 A1 | | 6/2012 | Williams | |
| 2013/0282641 A1 | | 10/2013 | Martin | |
| 2013/0304578 A1 | | 11/2013 | Kannan et al. | |
| 2014/0169514 A1 | | 6/2014 | Lemm et al. | |
| 2014/0366354 A1 | * | 12/2014 | Snuggerud | G21C 17/10 |
| | | | | 29/402.03 |
| 2015/0040660 A1 | * | 2/2015 | Nishimura | G01F 23/243 |
| | | | | 73/295 |
| 2015/0325318 A1 | | 11/2015 | Singh | |
| 2016/0118026 A1 | * | 4/2016 | Loo | G09G 3/3283 |
| | | | | 345/83 |
| 2018/0190395 A1 | * | 7/2018 | Clarkson | G05B 9/03 |
| 2020/0343009 A1 | * | 10/2020 | Clarkson | G05B 9/03 |

FOREIGN PATENT DOCUMENTS

| | | | | |
|---|---|---|---|---|
| CN | 1226732 A | | 8/1999 | |
| CN | 1285594 A | | 2/2001 | |
| CN | 100999065 A | | 7/2007 | |
| CN | 101001188 A | | 7/2007 | |
| CN | 101042070 A | | 9/2007 | |
| CN | 101164507 A | | 4/2008 | |
| CN | 101633318 A | | 1/2010 | |
| CN | 1755660 B | | 9/2010 | |
| CN | 1542578 B | | 3/2012 | |
| CN | 102411361 A | | 4/2012 | |
| CN | 102426863 A | | 4/2012 | |
| CN | 102525470 A | | 7/2012 | |
| CN | 202453705 U | | 9/2012 | |
| CN | 101615211 B | | 10/2012 | |
| CN | 102023957 B | | 10/2012 | |
| CN | 102157213 B | | 10/2013 | |
| CN | 102298980 B | | 2/2015 | |
| CN | 104347131 A | | 2/2015 | |
| CN | 204965751 U | | 1/2016 | |
| CN | 102546963 B | | 11/2016 | |
| CN | 106165020 A | | 11/2016 | |
| CN | 104408312 B | | 12/2017 | |
| CN | 114596971 A | * | 6/2022 | G21C 7/36 |
| EP | 781451 B1 | | 12/2001 | |
| JP | S63290989 A | | 11/1988 | |
| JP | H07174890 A | | 7/1995 | |
| JP | H0944203 A | | 2/1997 | |
| JP | H09178880 A | | 7/1997 | |
| JP | H10104385 A | | 4/1998 | |
| JP | H10506476 A | | 6/1998 | |
| JP | H10268086 A | | 10/1998 | |
| JP | H1194987 A | | 4/1999 | |
| JP | 2001296383 A | | 10/2001 | |
| JP | 2004529353 A | | 9/2004 | |
| JP | 2007003399 A | | 1/2007 | |
| JP | 2007163207 A | | 6/2007 | |
| JP | 2008275354 A | | 11/2008 | |
| JP | 2010249559 A | | 11/2010 | |
| JP | 2012037393 A | | 2/2012 | |
| JP | 2015049205 A | | 3/2015 | |
| JP | 6139341 B2 | | 5/2017 | |
| JP | 2020514700 A | | 5/2020 | |
| KR | 20010013661 A | | 2/2001 | |
| KR | 1020080013153 A | | 2/2008 | |
| KR | 100848881 B1 | * | 7/2008 | |
| KR | 1020090054837 A | | 6/2009 | |

(56) References Cited

FOREIGN PATENT DOCUMENTS

| | | | | | |
|---|---|---|---|---|---|
| KR | 100926013 | B1 | 11/2009 | | |
| KR | 1020100044544 | A | 4/2010 | | |
| KR | 101022606 | B1 | 3/2011 | | |
| KR | 20110113830 | A | 10/2011 | | |
| KR | 101244015 | B1 | 3/2013 | | |
| WO | WO-9106960 | A1 * | 5/1991 | .............. | G21C 7/36 |
| WO | 9318464 | W | 9/1993 | | |
| WO | 2011158120 | A2 | 12/2011 | | |
| WO | WO-2015112304 | A2 * | 7/2015 | .............. | G05B 9/03 |

OTHER PUBLICATIONS

ISA, International Preliminary Report on Patentability for PCT/US2018/012089. Mail Date: Jul. 11, 2019. 10 pages.

ISA, International Search Report and Written Opinion for International Application No. PCT/US2014/072224. Mail Date: Sep. 14, 2015. 11 pages.

ISA, International Search Report and Written Opinion for PCT/US2018/012089. Mail Date: Jun. 22, 2018. 5 pages.

Nath et al. "RFID Technology and Applications" IEEE Pervasive Computing, Jan. 2006, vol. 5, No. 1, pp. 22-24.

Chinese Office Action mailed Dec. 29, 2023 for Chinese Application No. 20188005583.3, a foreign counterpart to U.S. Pat. No. 11,069,450, 34 pages.

Office Action for Japanese Application No. 2024-019542, dated Nov. 26, 2024, 8 pages.

Office Action for Korean Application No. 10-2024-7006458, dated Dec. 9, 2024, 7 pages.

\* cited by examiner

| TRANSIENT EVENT | SAFETY FUNCTION | PROCESS PARAMETER | SEPARATION GROUP | | | | TRIP/NO TRIP DETERMINATION |
|---|---|---|---|---|---|---|---|
| | | | A | B | C | D | |
| LOSS OF FEEDWATER | A1 | HIGH TEMPERATURE | ✓ | ✓ | ✓ | ✓ | TRIP |
| | A2 | HIGH PRESSURE | ✓ | ✓ | ✓ | ✓ | TRIP |

| TRANSIENT EVENT | SAFETY FUNCTION | PROCESS PARAMETER | SEPARATION GROUP | | | | TRIP/NO TRIP DETERMINATION |
|---|---|---|---|---|---|---|---|
| | | | A | B | C | D | |
| LOSS OF FEEDWATER | A1 | HIGH TEMPERATURE | CCF | ✓ | CCF | ✓ | TRIP |
| | A2 | HIGH PRESSURE | ✓ | ✓ | ✓ | ✓ | TRIP |

1100

Table 1: Reactor Trip Functions

| Parameter | Analytical Limit | Number of Channels | Logic |
|---|---|---|---|
| High Power Range Linear Power | High-1 = 25% RTP<br>High-2 = 120% RTP | 4 | 2/4↑ |
| High Intermediate Range Log Power Rate | 3 dpm | 4 | 2/4↑ |
| High Power Range Positive and Negative Rate | +/- 15% RTP/minute | 4 | 2/4↕ |
| High Source Range Count Rate | $5 \times 10^5$ cps | 4 | 2/4↑ |
| High Source Range Log Power Rate | 3 dpm | 4 | 2/4↑ |
| High Narrow Range RCS Hot Temperature (NR RCS T$_{hot}$) | 610°F | 4 | 2/4↑ |
| High Narrow Range Containment Pressure | 9.5 psia | 4 | 2/4↑ |
| High Pressurizer Pressure | 2000 psia | 4 | 2/4↑ |
| Low Pressurizer Pressure | 1720 psia | 4 | 2/4↓ |
| Low Low Pressurizer Pressure | 1600 psia | 4 | 2/4↓ |
| High Pressurizer Level | 80% | 4 | 2/4↑ |
| Low Pressurizer Level | 35% | 4 | 2/4↓ |
| High Main Steam Pressure | 800 psia | 4 | 2/4↑ |
| Low Main Steam Pressure | 300 psia | 4 | 2/4↓ |
| Low Low Main Steam Pressure | 100 psia | 4 | 2/4↓ |
| High Steam Superheat (MS Temperature and Pressure) | 150°F | 4 | 2/4↑ |
| Low Steam Superheat (MS Temperature and Pressure) | 0.0°F | 4 | 2/4↓ |
| Low Low RCS Flow | 0.0 ft$^3$/S | 4 | 2/4↓ |
| Low AC Voltage to Battery Chargers | Actuation Delay of 60 seconds (Note 1) | 4 | 2/4↓ |
| High Under-the-Bioshield Temperature | 250°F | 4 | 2/4↑ |

FIG. 27

Table 2: Engineered Safety Feature Actuation System Functions

| ESF Function | Parameter | Analytical Limit | Number of Channels | Logic | System Automated Function |
|---|---|---|---|---|---|
| Emergency Core Cooling System (ECCS) | High Containment Water Level | 260' - 220' (elevation) | 4 | 2/4↑ | Removes Electrical Power to the trip solenoids of the reactor vent valves. |
| | Low RPV Riser Level | 390' - 350' (elevation) | 4 | 2/4↓ | |
| | Low ELVS voltage 24-hour Timer | 24 hours | 3 | 2/3 | Removes electrical power to the trip solenoids of the reactor recirculation valves |
| Decay Heat Removal System (DHRS) | High Pressurizer Pressure | 2000 psia | 4 | 2/4↑ | Removes electrical power to the trip solenoids of the decay heat removal valves |
| | High Narrow Range RCS Hot Temperature (NR RCS Thot) | 610°F | 4 | 2/4↑ | Removes electrical power to the trip solenoids of the following valves in the containment system: |
| | Low Main Steam Pressure | 300 psia | 4 | 2/4↓ | • main steam isolation valves |
| | Low Low Main Steam Pressure | 100 psia | 4 | 2/4↓ | • main steam isolation bypass valves |
| | High Main Steam Pressure | 800 psia | 4 | 2/4↑ | • secondary main steam isolation valves |
| | Low Steam Superheat (MS Temperature and Pressure) | 0.0°F | 4 | 2/4↓ | • secondary main steam isolation bypass valve bypass valves |
| | High Steam Superheat (MS Temperature and Pressure) | 150°F | 4 | 2/4↑ | • feedwater isolation valves |
| | High Narrow Range Containment Pressure | 9.5 psia | 4 | 2/4↑ | • feedwater regulation valves |
| | Low Pressurizer Pressure | 1720 psia | 4 | 2/4↓ | |
| | Low Low Pressurizer Pressure | 1600 psia | 4 | 2/4↓ | |
| | Low Low Pressurizer Level | 20% | 4 | 2/4↓ | |
| | Low AC Voltage to Battery Chargers | Actuation Delay of 60 second (See Note 1)s | 4 | 2/4↓ | |
| | High Under-the-Bioshield Temperature | 250°F | 4 | 2/4↑ | |

FIG. 28A

Table 2: Engineered Safety Feature Actuation System Functions
(continued)

| ESF Function | Parameter | Analytical Limit | Number of Channels | Logic | System Automated Function |
|---|---|---|---|---|---|
| Containment System Isolation (CSI) Signal | High Narrow Range Containment Pressure | 9.5 psia | 4 | 2/4↑ | Removes electrical power to the trip solenoids of the following valves: |
| | Low Low Pressurizer Level | 20% | 4 | 2/4↓ | ▪ RCS injection valves |
| | Low AC Voltage to Battery Chargers | Actuation Delay of 60 seconds (See Note 1) | 4 | 2/4↓ | ▪ RCS discharge valves<br>▪ PZR spray valves |
| | High Under-the-Bioshield Temperature | 250°F | 4 | 2/4↑ | ▪ RPV high point degasification line valves<br>▪ feedwater isolation valves<br>▪ feedwater regulation valves<br>▪ main steam isolation valves<br>▪ main steam isolation bypass valves<br>▪ secondary main steam isolation valves<br>▪ secondary main steam isolation bypass valve bypass valves<br>▪ containment evacuation system valves<br>▪ reactor component cooling water system supply and return valves<br>▪ containment flooding and drain system valves |
| Demineralized Water System Isolation (DWSI) | High Power Range Linear Power | High-1 = 25% RTP<br>High-2 = 120% RTP | 4 | 2/4↑ | Removes electrical power to the trip solenoids of the demineralized water supply valves |
| | High Intermediate Range Log Power Rate | 3 dpm | 4 | 2/4↑ | |
| | High Power Range Positive and Negative Rate | +/- 15% RTP/minute | 4 | 2/4↕ | |
| | High Source Range Count Rate | $5 \times 10^5$ cps | 4 | 2/4↑ | |
| | High Source Range Log Power Rate | 3 dpm | 4 | 2/4↑ | |
| | High Narrow Range RCS Hot Temperature (NR RCS Thot) | 610°F | 4 | 2/4↑ | |
| | High Narrow Range Containment Pressure | 9.5 psia | 4 | 2/4↑ | |
| | High Pressurizer Pressure | 2000 psia | 4 | 2/4↑ | |
| | Low Pressurizer Pressure | 1720 psia | 4 | 2/4↓ | |

FIG. 28B

Table 2: Engineered Safety Feature Actuation System Functions
(continued)

| ESF Function | Parameter | Analytical Limit | Number of Channels | Logic | System Automated Function |
|---|---|---|---|---|---|
| Demineralized Water System Isolation (DWSI) (continued) | Low Low Pressurizer Pressure | 1600 psi | 4 | 2/4↓ | |
| | High Pressurizer Pressure | 80% | 4 | 2/4↑ | |
| | Low Pressurizer Level | 35% | 4 | 2/4↓ | |
| | High Main Steam Pressure | 800 psia | 4 | 2/4↑ | |
| | Low Main Steam Pressure | 300 psia | 4 | 2/4↓ | |
| | Low Low Main Steam Pressure | 100 psia | 4 | 2/4↓ | |
| | High Steam Superheat (MS Temperature and Pressure) | 150°F | 4 | 2/4↑ | |
| | Low Steam Superheat (MS Temperature and Pressure) | 0.0°F | 4 | 2/4↓ | |
| | Low RCS Flow | 1.7 ft$^3$/s | 4 | 2/4↓ | |
| | Low Low RCS Flow | 0.0 ft$^3$/s | 4 | 2/4↓ | |
| | Low AC Voltage to Battery Chargers | Actuation Delay of 60 seconds (Note 1) | 4 | 2/4↓ | |
| | High Under-the-Bioshield Temperature | 250°F | 4 | 2/4↑ | |
| | High Subcritical Multiplication (SCM) | 3.2 | 4 | 2/4↑ | |
| Chemical and Volume Control System Isolation (CVCSI) | High Pressurizer Level | 80% | 4 | 2/4↑ | Removes electrical power to the trip solenoids of the following valves:<br>▪ RCS injection valves<br>▪ RCS discharge valves<br>▪ PZR spray valves<br>▪ RCS high point degasification valves |
| | High Narrow Range Containment Pressure | 9.5 psia | 4 | 2/4↑ | |
| | Low Pressurizer Pressure | 1720 psia | 4 | 2/4↓ | |
| | Low Low Pressurizer Pressure | 1600 psia | 4 | 2/4↓ | |
| | Low Low Pressurizer Level | 20% | 4 | 2/4↓ | |
| | Low Low RCS Flow | 0.0 ft$^3$/s | 4 | 2/4↓ | |
| Pressurizer Heater Trip | Low Pressurizer Level | 35% | 4 | 2/4↓ | Removes electrical power to the PZR heaters |
| | Any DHRS Actuation – See DHRS Actuation Parameters | See DHRS Actuation Analytical Limits | 4 | 2/4 | |
| Low Temperature Overpressure Protection (LTOP) | Low Temperature Interlock with High Pressure (WR RCS cold temperature and WR RCS Pressure) | Variable based on WR RCS cold temperature and WR RCS Pressure | 4 | 2/4↑ | Removes electrical power to the trip solenoids of the reactor vent valves |

FIG. 28C

Table 3: Variables Monitored by Plant Protection System

| Variable | Range |
|---|---|
| ELVS Voltage 1 (Note 1) | 0-600 VAC |
| ELVS Voltage 2 (Note 2) | 0-600 VAC |
| ELVS Voltage 3 (Note 2) | 0-600 VAC |
| ELVS Voltage 4 (Note 1) | 0-600 VAC |
| CRVS Post Filter Air Radiation Sensor | Particulate:<br>3E-10 to 1E-6 µCi/cc<br><br>Iodine:<br>3E-10 to 5E-8 µCi/cc<br><br>Noble Gas:<br>3E-7 to 1E-2 µCi/cc |
| [[Outside Air Toxic Gas Sensor | Provided by COL applicant based on plant location]] |
| Outside Air Smoke Detector N/A | N/A |
| CRE Air Delivery Line Flow Sensor 1 | 0-150 SCFM |
| CRE Air Delivery Line Flow Sensor 2 | 0-1000 SCFM |
| CRE Differential Pressure Sensor | 0-2 in water column |
| Emergency Pressurized Air Pressure | 3000-4000 psig |
| Reactor/Refueling Pool Level Indication | 0-69 ft |
| Spent Fuel Pool Level Indication | 0-69 ft |
| EDSS-C Bus Voltage | 0-150 VDC |
| CRHS Air Supply Isolation Valve Position | Open, Closed |
| CRHS Pressure Relief Isolation Valve Position | Open, Closed |
| CRVS Supply Air Damper Position | Open, Closed |
| CRVS Smoke Purge Exhaust Damper Position | Open, Closed |
| CRVS General Exhaust Damper Position | Open, Closed |
| CRVS Return Air Damper Position | Open, Closed |
| CRVS Outside Air Isolation Damper Position | Open, Closed |

FIG. 29

Table 4: Module Protection System
Interlocks, Permissives, and Overrides

| Interlock/ Permissive/ Override | Condition for Interlock/Permissive/ Override | Function |
|---|---|---|
| N-1 Permissive | Intermediate Range Log Power Permissive:<br><br>Permissive established when at least 3 of 4 Intermediate Range Log Power channels > approximately 1 decade above the channel lower range limit. | Allows the operator to manually establish an operating bypass of the following:<br>• Reactor Trip on High Source Range Count Rate<br>• Reactor Trip on High Source Range Log Power Rate<br>• Demineralized Water System Isolation actuation on High Source Range Count Rate<br>• Demineralized Water System Isolation actuation on High Source Range Log Power Rate<br><br>Operating bypasses are automatically removed when permissive condition is no longer satisfied. |
| N-1 Interlock | Intermediate Range Log Power Interlock:<br><br>Interlock established when at least 3 of 4 Intermediate Range Log Power channels > approximately 1 decade above the channel lower range limit. | Automatically establishes an operating bypass of the Demineralized Water System Isolation on High Subcritical Multiplication.<br><br>Operating bypass is automatically removed when interlock condition is no longer satisfied. |
| N-2L Permissive | Power Range Linear Power Permissive:<br><br>Permissive established when at least 3 of 4 Power Range Linear Power Channels > 15% RTP | Allows the operator to manually establish an operating bypass of the following:<br>• Reactor Trip on High-1 Power Range Linear Power. This increases the High Power Range High Linear Power trip to the High-2 trip setpoint)<br>• Demineralized Water System Isolation actuation on High-1 Power Range Linear Power<br><br>Operating bypasses are automatically removed when permissive condition is no longer satisfied. |
| N-2L Interlock | Power Range Linear Power Interlock:<br><br>Interlock established when at least 3 of 4 Power Range Linear Power Channels > 15% RTP | Automatically establishes an operating bypass of the following:<br>• Reactor Trip on High Intermediate Range Log Power Rate<br>• Demineralized Water System Isolation actuation on High Intermediate Range Log Power Rate<br><br>Operating bypasses are automatically removed when interlock condition is no longer satisfied. |

FIG. 30A

Table 4: Module Protection System Interlocks, Permissives, and Overrides

| Interlock/ Permissive/ Override | Condition for Interlock/Permissive/ Override | Function |
|---|---|---|
| N-2H Interlock | Power Range Linear Power Interlock:<br><br>Interlock established when at least 3 of 4 Power Range Linear Power Channels < 15% RTP | Automatically establishes an operating bypass of the following:<br>■ Reactor Trip on High Power Range Positive Rate<br>■ Reactor Trip on High Power Range Negative Rate<br>■ Demineralized Water System Isolation actuation on High Power Range Positive Rate<br>■ Demineralized Water System Isolation actuation on High Power Range Negative Rate<br>■ Reactor Trip on Low Main Steam Pressure<br>■ DHRS actuation on Low Main Steam Pressure<br>■ Demineralized Water System Isolation actuation on Low Main Steam Pressure<br><br>Operating bypasses are automatically removed when interlock condition is no longer satisfied. |
| RT-1 Interlock | Reactor Tripped Interlock:<br><br>Interlock is established when both divisional reactor trip (RT) breakers indicate open | The RT-1 Interlock is used in conjunction with the F-1, T-2 and L-1 interlocks, and the override function O-1. |
| T-1 Interlock | Wide Range RCS Cold Temperature Interlock:<br><br>Interlock established when at least 3 of 4 Wide Range RCS Cold Temperature channels > 325°F | Automatically establishes an operating bypass of the following:<br>■ Low Temperature Overpressure Protection actuation on High WR RCS Pressure<br><br>Operating bypass is automatically removed when interlock condition is no longer satisfied. |
| T-2 Interlock | The Wide Range RCS Hot Temperature Interlock:<br><br>Interlock established when at least 3 of 4 Wide Range RCS Hot Temperature channels < 200°F, AND the RT-1 interlock is active. | Automatically establishes an operating bypass of the following:<br>■ DHRS actuation on Low Low Pressurizer Level<br>■ CVCS Isolation actuation on Low Low Pressurizer Level<br>■ Containment System Isolation actuation on Low Low Pressurizer Level<br><br>Operating bypasses are automatically removed when interlock condition is no longer satisfied. |
| T-3 Interlock | The Wide Range RCS Hot Temperature Interlock:<br><br>Interlock established when at least 3 of 4 Wide Range RCS Hot Temperature channels < 350°F | Automatically establishes an operating bypass of the following:<br>■ ECCS actuation on High Containment Water Level<br>■ DHRS actuation on High Narrow Range Containment Pressure<br>■ Containment System Isolation actuation on High Narrow Range Containment Pressure<br>■ CVCS Isolation actuation on High Narrow Range Containment Pressure trip<br>■ DHRS actuation on Low Low Pressurizer Pressure<br>■ CVCS Isolation actuation on Low Low Pressurizer Pressure<br><br>Operating bypasses are automatically removed when interlock condition is no longer satisfied. |

FIG. 30B

Table 4: Module Protection System Interlocks, Permissives, and Overrides

| Interlock/ Permissive/ Override | Condition for Interlock/Permissive/ Override | Function |
|---|---|---|
| T-4 Interlock | The Narrow Range RCS Hot Temperature Interlock:<br><br>Interlock established when at least 3 of 4 RCS Narrow Range RCS Hot Temperature channels <600°F | Automatically establishes an operating bypass of the following:<br>• Reactor Trip on Low Pressurizer Pressure<br>• CVCS Isolation actuation on Low Pressurizer Pressure<br>• DHRS actuation on Low Pressurizer Pressure<br>• Demineralized Water System Isolation of Low Pressurizer Pressure<br><br>Operating bypasses are automatically removed when interlock condition is no longer satisfied. |
| L-1 Interlock | Containment Water Level Interlock:<br><br>Interlock established when at least 3 of 4 Containment Level Channels > 45' AND RT-1 is active | Automatically establishes operating bypass of the following trip signals for DHRS actuation:<br>• High Pressurizer Pressure<br>• Low Low Pressurizer Pressure<br>• Low Low Pressurizer Level<br>• High Narrow Range RCS Hot Temperature<br>• Low Low Main Steam Pressure<br>• High Main Steam Pressure<br>• Low Steam Superheat<br>• High Steam Superheat<br>• High Narrow Range Containment Pressure<br><br>Operating bypasses are automatically removed when interlock condition is no longer satisfied. |
| F-1 Interlock | RCS Flow Interlock:<br><br>Interlock established after a set time delay when at least 3 of 4 RCS Flow Channels $\leq 0.0$ ft$^3$/sec and RT-1 has been established | Automatically establishes operating bypass of CVCS isolation on Low Low RCS Flow.<br><br>Operating bypasses are automatically removed when interlock condition is no longer satisfied. |
| O-1 Override | Containment System Isolation Override Function<br><br>Override established when manual override switch is active and RT-1 permissive is established | Override will allow manual control of the containment flood and drain and CVCS isolation valves from the module control system with an active automatic containment system isolation OR automatic CVCS isolation signal.<br><br>The Override switch must be manually taken out of Override when the Override, O-1, is no longer needed. |

FIG. 30C

NUCLEAR REACTOR PROTECTION SYSTEMS AND METHODS

CROSS-REFERENCE TO RELATED APPLICATION(S)

This application is a continuation of U.S. Non-Provisional application Ser. No. 17/189,038, filed on Mar. 1, 2021, which is a continuation of U.S. Non-Provisional application Ser. No. 15/860,434, filed on Jan. 2, 2018, which claims priority under 35 U.S.C. § 119 to U.S. Provisional Patent Application No. 62/440,989, filed Dec. 30, 2016, the entire disclosure of each of these applications is incorporated herein by reference.

TECHNICAL FIELD

This disclosure describes a nuclear reactor protection system and associated methods thereof.

BACKGROUND

Nuclear reactor protection systems and, generally, nuclear reactor instrumentation and control (I&C) systems provide automatic initiating signals, automatic and manual control signals, and monitoring displays to mitigate the consequences of fault conditions. For example, I&C systems provide protection against unsafe reactor operation during steady state and transient power operation. During normal operation I&C systems measure various parameters and transmit the signals to control systems. During abnormal operation and accident conditions, the I&C systems transmit signals to the reactor protection system and, in some cases a reactor trip system (RTS) and engineered safety features actuation system (ESFAS) of the reactor protection system, to initiate protective actions based on predetermined set points.

SUMMARY

In a general implementation, a nuclear reactor protection system includes a plurality of functionally independent modules, each of the modules configured to receive a plurality of inputs from a nuclear reactor safety system, and logically determine a safety action based at least in part on the plurality of inputs, each of the functionally independent modules including a digital module or a combination digital and analog module, an analog module electrically coupled to one or more of the functionally independent modules, and one or more nuclear reactor safety actuators communicably coupled to the plurality of functionally independent modules to receive the safety action determination based at least in part on the plurality of inputs.

In a first aspect combinable with the general implementation, activation of an input to the analog module overrides one or more operations of at least one of the functionally independent modules.

In a second aspect combinable with any of the previous aspects, the analog module includes only analog circuit components.

In a third aspect combinable with any of the previous aspects, at least one input to the analog module is a manual override input and the analog module is configured to override a digital operation of at least one of the functionally independent modules upon activation of the manual override input.

In a fourth aspect combinable with any of the previous aspects, at least one input to the analog module is a manual bypass input and the analog module is configured to bypass a digital operation of at least one of the functionally independent modules upon activation of the manual bypass input.

In a fifth aspect combinable with any of the previous aspects, at least one input to the analog module is a manual actuation input and the analog module is configured to actuate a digital operation of at least one of the functionally independent modules upon activation of the manual actuation input.

In a sixth aspect combinable with any of the previous aspects, one or more outputs from the analog module are supplied as input to a plurality of the functionally independent modules through a backplane of the reactor protection system.

In a seventh aspect combinable with any of the previous aspects, the analog module is a first analog module, and where the nuclear reactor protection system includes a second analog module, an engineered safety features actuation system (ESFAS), wherein a first subset of the plurality of functionally independent modules receive a plurality of ESFAS inputs and logically determine an ESFAS component actuation based at least in part on the ESFAS inputs, and wherein the first analog module is electrically coupled to the functionally independent modules of the first subset of the plurality of functionally independent modules, and a reactor trip system (RTS), wherein a second subset of the plurality of functionally independent modules receive a plurality of RTS inputs and logically determine an RTS component actuation based at least in part on the RTS inputs, and wherein the second analog module is electrically coupled to the functionally independent modules of the second subset of the plurality of functionally independent modules.

In an eighth aspect combinable with any of the previous aspects, each of the plurality of functionally independent modules provides protection against a single failure propagation to any other of the plurality of functionally independent modules.

In a ninth aspect combinable with any of the previous aspects, the nuclear reactor safety system includes an engineered safety features actuation system (ESFAS), and the plurality of functionally independent modules receive a plurality of ESFAS inputs and logically determine an ESFAS component actuation based at least in part on the ESFAS inputs.

In a tenth aspect combinable with any of the previous aspects, the plurality of functionally independent modules provide for redundant ESFAS voting divisions.

In a eleventh aspect combinable with any of the previous aspects, the nuclear reactor safety system includes a reactor trip system (RTS), and the plurality of functionally independent modules receive a plurality of RTS inputs and logically determine an RTS component actuation based at least in part on the RTS inputs.

In a twelfth aspect combinable with any of the previous aspects, the plurality of functionally independent modules provide for redundant RTS voting divisions.

In a thirteenth aspect combinable with any of the previous aspects, the analog module electrically isolates non-safety related signals from safety related systems by converting non-safety related signals to an analog voltage level and passing the analog voltage level to an associated functional module through a chassis backplane.

In a fourteenth aspect combinable with any of the previous aspects, at least one of the functionally independent modules includes an equipment interface module (EIM) that includes at least one hardwired analog input signal from the analog module.

In a fifteenth aspect combinable with any of the previous aspects, the EIM includes actuation and priority logic (APL) circuitry that prioritizes the at least one hardwired analog input signal with respect to at least one digital input signal.

In a sixteenth aspect combinable with any of the previous aspects, the at least one digital signal is a safety related signal and the APL circuitry prioritizes the digital signal over the hardwired analog signal.

In a seventeenth aspect combinable with any of the previous aspects, the at least one hardwired analog input signal is a safety related signal from a manual actuation switch and the APL circuitry prioritizes the hardwired analog input signal over the digital signal.

In a eighteenth aspect combinable with any of the previous aspects, wherein the at least one hardwired analog input signal is a reactor trip signal.

In a nineteenth aspect combinable with any of the previous aspects, the at least one hardwired analog input signal is from a manual actuation switch is a non-safety related control signal and the APL circuitry prioritizes the digital signal over the hardwired analog input signal.

In another general implementation according to the present disclosure, a nuclear reactor protection system includes a plurality of functionally independent modules, each of the modules configured to receive a plurality of inputs from a nuclear reactor safety system, and logically determine a safety action based at least in part on the plurality of inputs, wherein the plurality of functionally independent modules logically determine the safety action in a two-tier voting scheme, the first voting tier of the two-tier voting scheme including a non-majority voting scheme and the second voting tier of the two-tier voting scheme including a majority voting scheme, and one or more nuclear reactor safety actuators communicably coupled to the plurality of functionally independent modules to receive the safety action determination based at least in part on the plurality of inputs.

In a first aspect combinable with the general implementation, the first voting tier evaluates trip signals from a plurality of redundant signal channels, each trip signal associated with a reactor parameter, and the second tier evaluates voting results from a plurality of redundant first tier channels.

In a second aspect combinable with any of the previous aspects, the first voting tier evaluates trip signals from a reactor trip system (RTS).

In a third aspect combinable with any of the previous aspects, the first voting tier evaluates trip signals from an engineered safety features actuation system (ESFAS).

In a fourth aspect combinable with any of the previous aspects, the first voting tier includes a two out of four vote scheme.

In a fifth aspect combinable with any of the previous aspects, the second voting tier includes a two out of three vote scheme.

In a sixth aspect combinable with any of the previous aspects, the nuclear reactor safety system includes an engineered safety features actuation system (ESFAS), and the plurality of functionally independent modules receive a plurality of ESFAS inputs and logically determine an ESFAS component actuation based at least in part on the ESFAS inputs.

In a seventh aspect combinable with any of the previous aspects, the plurality of functionally independent modules provide for redundant ESFAS voting divisions.

In an eighth aspect combinable with any of the previous aspects, the nuclear reactor safety system includes a reactor trip system (RTS), and the plurality of functionally independent modules receive a plurality of RTS inputs and logically determine an RTS component actuation based at least in part on the RTS inputs.

In a ninth aspect combinable with any of the previous aspects, the plurality of functionally independent modules provide for redundant RTS voting divisions.

In a tenth aspect combinable with any of the previous aspects, the nuclear reactor safety system includes class 1E components to provide isolation and power monitoring from the non-safety-related highly reliable DC power system (EDSS) power supply to at least one of the functionally independent modules.

In yet another general implementation according to the present disclosure, a method for determining a nuclear reactor trip includes receiving, from one of an engineered safety features actuation system (ESFAS) or a reactor trip system (RTS), a plurality of inputs at a plurality of functionally independent modules of a nuclear reactor protection system, logically determining, with the plurality of functionally independent modules, one of an ESFAS safety action or reactor trip condition, by a two tier voting system, determining by a first tier of the two tier voting system that at least half of a number of inputs to the first tier indicate the ESFAS safety action or reactor trip condition, determining by a second tier of the two tier voting system that at least a majority of a number of inputs to the second tier indicate the ESFAS safety action or reactor trip condition, and based on the logical determination, activating one of an ESFAS component actuator or a reactor trip breaker communicably coupled to the plurality of functionally independent modules.

In a first aspect combinable with the general implementation, the first voting tier evaluates trip signals from a plurality of redundant signal channels, each trip signal associated with a reactor parameter, and the second tier evaluates voting results from a plurality of redundant first tier channels.

In a second aspect combinable with any of the previous aspects, the first voting tier includes a two out of four vote scheme.

In a third aspect combinable with any of the previous aspects, the second voting tier includes a two out of three vote scheme.

In a fourth aspect combinable with any of the previous aspects, the method further includes limiting, with one of the plurality of functionally independent modules, a single failure propagation to any other of the plurality of functionally independent modules.

In a fifth aspect combinable with any of the previous aspects, the single failure includes at least one of: a single hardware failure, a single software failure, or a single software developed logic failure.

In a sixth aspect combinable with any of the previous aspects, logically determining, with the plurality of functionally independent modules, one of an ESFAS safety action or reactor trip determination, based at least in part on the inputs includes logically determining, with the plurality of functionally independent modules, the ESFAS safety action or reactor trip determination through a triple redundancy signal path.

In a seventh aspect combinable with any of the previous aspects, logically determining, with the plurality of functionally independent modules, one of an ESFAS safety action or reactor trip determination, based at least in part on the inputs includes logically determining, with the plurality of functionally independent modules, the ESFAS safety action or reactor trip determination through independent trip voting modules per reactor trip component.

In an eighth aspect combinable with any of the previous aspects, the plurality of functionally independent modules include a plurality of safety function modules, a plurality of communication modules, and a plurality of equipment interface modules.

In another general implementation of the present disclosure, a nuclear reactor protection system display system includes a digital display panel, a display interface module coupled to the digital display panel, the display interface module configured to: receive input data from a nuclear reactor module protection system (MPS), generate a graphical representation of the input data, and drive individual pixels of the digital display panel to display the graphical representation. The display system further includes a first power supply coupled to both the digital display panel and the display interface module, and a second power supply coupled to both the digital display panel and the display interface module, the second power supply being independent from the first power supply.

In a first aspect combinable with the general implementation, the display system of includes a second digital display panel and a second display interface module coupled to the second digital display panel, the second display interface module configured to: receive input data from the same nuclear reactor MPS, generate a graphical representation of the input data, and drive individual pixels of the second digital display panel to display the graphical representation.

In a second aspect combinable with any of the previous aspects, the display interface module includes a field programmable logic array (FPGA).

In a third aspect combinable with any of the previous aspects, the display interface module includes a first field programmable logic array (FPGA), and the second display interface module includes a second FPGA, the second FPGA being a different type of FPGA from first FPGA to provide design diversity.

In a fourth aspect combinable with any of the previous aspects, the display interface module and the second display interface module are functionally independent.

In another general implementation of the present disclosure, a nuclear reactor protection system display system includes a first pair of display arrangements, each display arrangement in the first pair of display arrangements includes: a digital display panel, and a display interface module coupled to the digital display panel. The display interface module is configured to: receive first input data from a nuclear reactor module protection system (MPS) associated with a nuclear reactor module, generate a graphical representation of the first input data, and drive individual pixels of the digital display panel to display the graphical representation. The nuclear reactor protection system display system includes a second pair of display arrangements, each display arrangement in the second pair of display arrangements including: a digital display panel, and a display interface module coupled to the digital display panel. The display interface module is configured to: receive second input data from a nuclear reactor module protection system MPS associated with a nuclear reactor module, generate a graphical representation of the first input data, and drive individual pixels of the digital display panel to display the graphical representation.

In a first aspect combinable with the general implementation, each of the display arrangements in the first pair of display arrangements is a different type of field programmable gate array (FPGA) to provide design diversity.

In a second aspect combinable with any of the previous aspects, the display interface modules of the first pair of display arrangements are functionally independent from one another.

In a third aspect combinable with any of the previous aspects, the display interface module each of the display arrangements in the first pair of display arrangements includes a different type of field programmable gate array (FPGA) to provide design diversity within the first pair, and the display interface module in each of the display arrangements in the second pair of display arrangements includes a different type of FPGA to provide design diversity within the second pair.

In a fourth aspect combinable with any of the previous aspects, the display interface modules of the first pair of display arrangements are functionally independent from one another, and the display interface modules of the second pair of display arrangements are functionally independent form one another.

In a fifth aspect combinable with any of the previous aspects, the display interface module of each of the display arrangements in the first pair of display arrangements is coupled to a module protection system (MPS) gateway of the first nuclear reactor module to receive the first input data, and the display interface module of each of the display arrangements in the second pair of display arrangements is coupled to a MPS gateway of the second nuclear reactor module to receive the second input data.

In another general implementation, a method for presenting nuclear reactor protection system data includes receiving, at a display arrangement, data associated with a nuclear reactor power module from a nuclear reactor module protection system (MPS), the display arrangement including a digital display panel and a display interface module coupled to the digital display panel; generating a graphical representation of the data associated with the nuclear reactor power module, and driving individual pixels of the digital display panel to display the graphical representation of the data associated with the nuclear reactor power module.

A first aspect combinable with the general implementation further includes providing electrical power to the digital display panel and the display interface module through a first power supply.

A second aspect combinable with any one of the previous aspects further includes providing electrical power to the digital display panel and the display interface module through a second power supply that is independent from the first power supply.

In a third aspect combinable with any one of the previous aspects, the second power supply is electrically independent of the first power supply.

In a fourth aspect combinable with any one of the previous aspects, the display interface module includes a field programmable logic array (FPGA).

In a fifth aspect combinable with any one of the previous aspects, the display arrangement is a first display arrangement, the display interface module is a first display interface module, and the digital display panel is a first digital display module.

A sixth aspect combinable with any one of the previous aspects further includes receiving, at a second display arrangement, the data associated with the nuclear reactor power module from the nuclear reactor module protection system (MPS), the second display arrangement including a second digital display panel and a second display interface module coupled to the second digital display panel; generating a second graphical representation of the data associated with the nuclear reactor power module, and driving individual pixels of the second digital display panel to display the second graphical representation of the data associated with the nuclear reactor power module.

In a seventh aspect combinable with any one of the previous aspects, the first and second display arrangements are functionally independent.

In an eighth aspect combinable with any one of the previous aspects, the first display interface module includes a first FPGA of a first FPGA-type, and the second display interface module includes a second FPGA of a second FPGA-type.

In a ninth aspect combinable with any one of the previous aspects, the first FPGA-type and the second FPGA-type are different.

Various implementations of a nuclear reactor protection system according to the present disclosure may include one, some, or all of the following features. For example, the reactor protection system may mitigate common-cause failures (CCF) caused by software or software-developed logic errors that could defeat and/or disable a safety function in the system. As another example, the reactor protection system may incorporate key attributes including independence, redundancy, determinism, multi-layered diversity, testability, and diagnostics. The reactor protection system may ensure that the nuclear reactor is maintained in a safe condition. As another example, the reactor protection system may have increased simplicity through a symmetrical architecture with the functionality implemented in individual logic engines dedicated to a particular function. As yet another example, the reactor protection system may facilitate communications within the architecture based on simple deterministic protocols and communicated via redundant paths. As another example, the reactor protection system may employ hardwired analog signaling to override digital protective systems and permit manually controlled protective actions.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4A-4B illustrate example charts that illustrate a multi-layered diversity strategy that mitigates software- or software-logic based common-cause failures within an MPS ensuring the I&C system can perform its intended safety function(s).

FIG. 27 illustrates a table of exemplary nuclear power system reactor trip functions.

FIGS. 28A-28C illustrate a table of exemplary ESFAS functions.

FIG. 29 illustrates a table of exemplary variables monitored by an example PPS.

FIGS. 30A-30C illustrate a table of exemplary MPS interlocks, permissives, and overrides.

DETAILED DESCRIPTION

Figure 1:
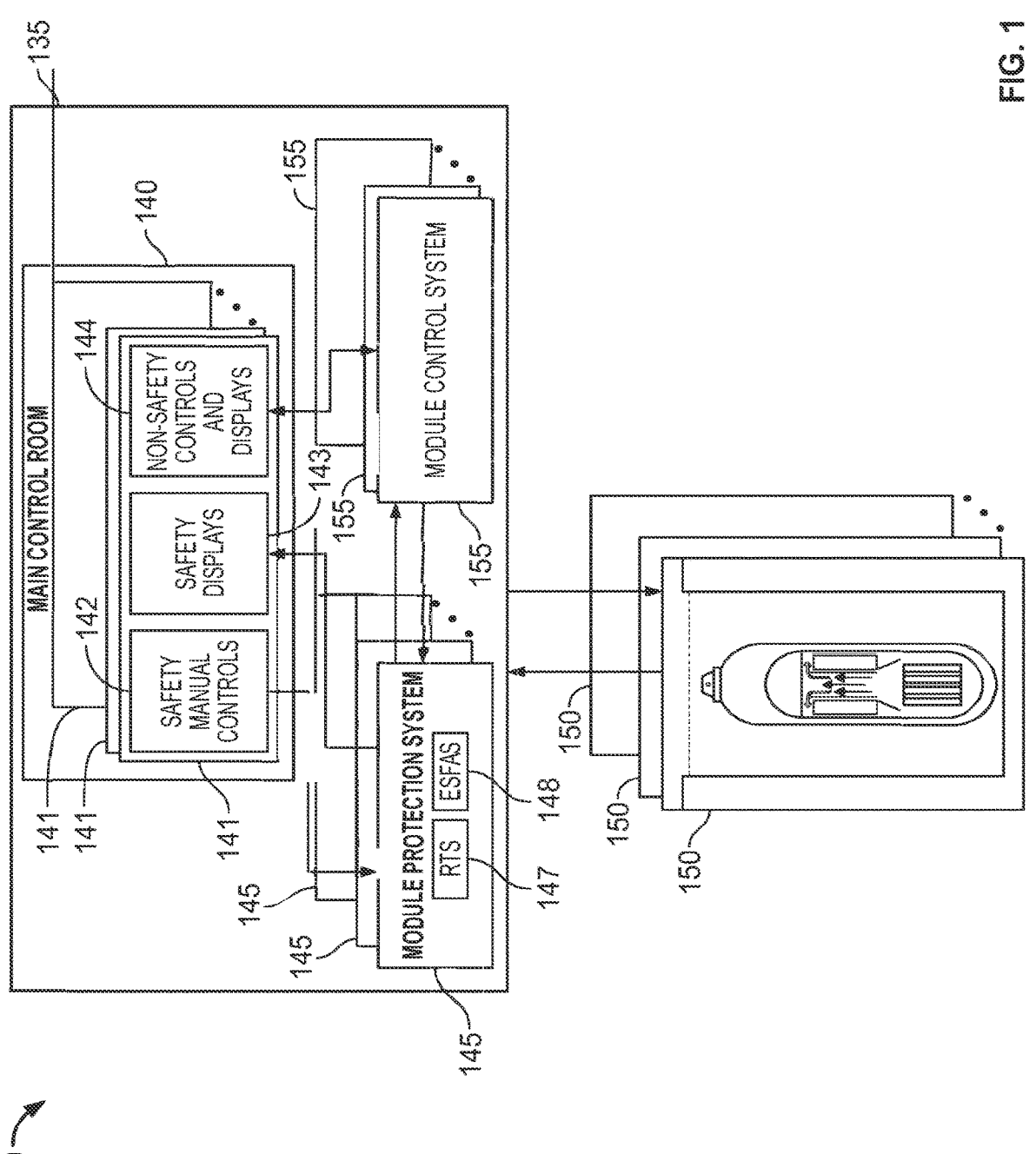
FIG. 1 illustrates a block diagram of an example implementation of a system that includes multiple nuclear power systems and an instrumentation & control (I&C) system.

FIG. 1 illustrates an example implementation of a system 100 that includes multiple nuclear power systems 150 and a nuclear instrumentation and control (I&C) system 135. Generally, the I&C system 135 provides automatic initiating signals, automatic and manual control signals, and monitoring and indication displays to prevent or mitigate the consequences of fault conditions in the system 100. The I&C system 135 provides normal reactor controls and protection against unsafe reactor operation of the nuclear power systems 150 during steady state and transient power operation. During normal operation, instrumentation measures various process parameters and transmits the signals to the control systems of I&C system 135. During abnormal operation and accident conditions, the instrumentation transmits signals to portions of the I&C system 135 (e.g., a reactor trip system (RTS) 147 and engineered safety features actuation system (ESFAS) 148 (e.g., for mitigating the effects of an accident) that are part of a module protection system (MPS) 145) to initiate protective actions based on predetermined set points.

In FIG. 1, the system 100 includes multiple nuclear power systems 150 that are electrically coupled to I&C system 135. Although only three nuclear power systems 150 are shown in this example, there may be fewer or more systems 150 that are included within or coupled to the system 100 (e.g., 6, 9, 12, or otherwise). In one preferred implementation, there may be twelve nuclear power systems 150 included within system 100, with one or more of the nuclear power systems 150 including a modular, light-water reactor as further described below.

With respect to each nuclear power system 150 and although not shown explicitly, a nuclear reactor core may provide heat, which is utilized to boil water either in a primary coolant loop (e.g., as in a boiling water reactor) or in a secondary cooling loop (e.g., as in a pressurized water reactor). Vaporized coolant, such as steam, may be used to drive one or more turbines that convert the thermal potential energy into electrical energy. After condensing, coolant is then returned to again remove more heat energy from the nuclear reactor core. Nuclear power system 150 is one example of any system which requires monitoring and protection functions in order to minimize the hazards associated with failures within the system.

In a specific example implementation of each nuclear reactor system 150, a reactor core is positioned at a bottom portion of a cylinder-shaped or capsule-shaped reactor vessel. Reactor core includes a quantity of fissile material that produces a controlled reaction that may occur over a period of perhaps several years or longer. Although not shown explicitly in FIG. 1, control rods may be employed to control the rate of fission within reactor core. Control rods may include silver, indium, cadmium, boron, cobalt, hafnium, dysprosium, gadolinium, samarium, erbium, and europium, or their alloys and compounds. However, these are merely a few of many possible control rod materials. In nuclear reactors designed with passive operating systems, the laws of physics are employed to ensure that safe operation of the nuclear reactor is maintained during normal operation or even in an emergency condition without operator intervention or supervision, at least for some predefined period of time.

In implementations, a cylinder-shaped or capsule-shaped containment vessel surrounds reactor vessel and is partially or completely submerged in a reactor pool, such as below a waterline, within a reactor bay. The volume between reactor vessel and containment vessel may be partially or completely evacuated to reduce heat transfer from reactor vessel to the reactor pool. However, in other implementations, the volume between reactor vessel and containment vessel may be at least partially filled with a gas and/or a liquid that increases heat transfer between the reactor and containment vessels. Containment vessel may rest on a skirt at the base of reactor bay.

In a particular implementation, reactor core is submerged within a liquid, such as water, which may include boron or other additive, which rises into channel after making contact with a surface of the reactor core. The coolant travels over the top of heat exchangers and is drawn downward by way of convection along the inner walls of reactor vessel thus allowing the coolant to impart heat to heat exchangers. After reaching a bottom portion of the reactor vessel, contact with reactor core results in heating the coolant, which again rises through channel.

Heat exchangers within the reactor vessel may represent any number of helical coils that wrap around at least a portion of the channel. In another implementation, a different number of helical coils may wrap around channel in an opposite direction, in which, for example, a first helical coil wraps helically in a counterclockwise direction, while a second helical coil wraps helically in a clockwise direction. However, nothing prevents the use of differently-configured and/or differently-oriented heat exchangers and implementations are not limited in this regard.

In FIG. 1, normal operation of the nuclear reactor module proceeds in a manner wherein heated coolant rises through the channel and makes contact with heat exchangers. After contacting heat exchangers, the coolant sinks towards the bottom of the reactor vessel in a manner that induces a thermal siphoning process. In the example of FIG. 1, coolant within the reactor vessel remains at a pressure above atmospheric pressure, thus allowing the coolant to maintain a high temperature without vaporizing (e.g., boiling).

As coolant within heat exchangers increases in temperature, the coolant may begin to boil. As the coolant within heat exchangers begins to boil, vaporized coolant, such as steam, may be used to drive one or more turbines that convert the thermal potential energy of steam into electrical energy. After condensing, coolant is returned to locations near the base of the heat exchangers.

During normal operation of the nuclear power system 150 of FIG. 1, various performance parameters of the nuclear power system may be monitored by way of sensors, e.g., of the I&C system 135, positioned at various locations within the nuclear power system 150. Sensors within the nuclear power system may measure system temperatures, system pressures, primary and/or secondary coolant levels, and neutron flux. Signals that represent these measurements may be reported external to the nuclear power system by way of communication channels to an interface panel of the I&C system 135.

The illustrated I&C system 135, generally, includes a main control room 140, a module (or reactor) protection system (MPS) 145, and a non-safety module control system (MCS) 155. The main control room 140 includes a set of controls and indicators 141 for each nuclear power system 150. Each set of controls and indicators 141 includes manual 1E controls 142, 1E indicators 143, and non 1E controls and indicators 144. In some aspects, "1E," may refer to regulatory requirements such as those that define a 1E scheme under IEEE Std. 308-2001, section 3.7, endorsed by Nuclear Regulatory Commission Regulatory Guide 1.32, which defines a safety classification of the electric equipment and systems that are essential to emergency reactor shutdown, containment isolation, reactor core cooling, and containment and reactor heat removal, or that are otherwise essential in preventing significant release of radioactive material into the environment. Typically, certain controls and indicators may be "1E" qualified (e.g., the manual 1E controls 142 and 1E indicators 143) while other controls and indicators may not be "1E" qualified (e.g., the non-1E controls and indicators 144).

The non-1E controls and indicators 144 is in bi-directional communication with the MCS 155. The MCS 155 may provide control and monitoring of the non-safety portions of the nuclear power system 150. Generally, the MCS 155 constrains operational transients, to prevent unit trip, and re-establish steady state unit operation, among other operations.

The MPS 145 is in one-way communication each with the manual 1E controls 142 and the 1E indicators 143 as shown in FIG. 1. The MPS 145, generally, initiates safety actions to mitigate consequences of design basis events. The MPS 145, generally, includes all equipment (including hardware, software, and firmware) from sensors to the final actuation devices (power sources, sensors, signal conditioners, initiation circuits, logic, bypasses, control boards, interconnections, and actuation devices) required to initiate reactor shutdown.

The MPS 145 includes the RTS 147 and the ESFAS 148. The RTS 147, in some aspects, includes four independent separation groups (e.g., a physical grouping of process channels with the same Class-1E electrical channel designation (A, B, C, or D)), which is provided with separate and independent power feeds and process instrumentation transmitters, and each of which groups is physically and electrically independent of the other groups) with independent measurement channels to monitor plant parameters that can be utilized to generate a reactor trip. Each measurement channel trips when the parameter exceeds a predetermined set point. The coincident logic of the RTS 147 may be designed so that no single failure can prevent a reactor trip when required, and no failure in a single measurement channel can generate an unnecessary reactor trip.

The ESFAS 148, in some aspects, includes four independent separation groups with independent measurement channels, which monitor plant parameters, that can be utilized to activate the operation of the engineered safety features (ESF) equipment. Each measurement channel trips when the parameter exceeds a predetermined set point. The ESFAS 148's coincident logic may be designed so that no single failure can prevent a safeguards actuation when required, and no single failure in a single measurement channel can generate an unnecessary safeguards actuation.

System 100 may include four echelons of defense, e.g., specific applications of the principle of defense-in-depth to the arrangement of instrumentation and control systems attached to a nuclear reactor for the purpose of operating the reactor or shutting it down and cooling it, as defined in NUREG/CR-6303. Specifically, the four echelons are a control system, a reactor trip or scram system, an ESFAS, and a monitoring and indicator system (e.g., the slowest and the most flexible echelon of defense that includes both Class 1E and non-Class 1E manual controls, monitors, and indicators required to operate equipment nominally assigned to the other three echelons).

The control system echelon, typically, includes MCS 155 (e.g., non-Class 1E manual or automatic control equipment), which routinely prevents reactor excursions toward unsafe regimes of operation and is generally used to operate the reactor in the safe power production operating region. Indicators, annunciators, and alarms may be included in the control echelon. Reactor control systems typically contain some equipment to satisfy particular rules and/or requirements, e.g., the requirement for a remote shutdown panel. The reactor control functions performed by the control system echelon are included in the MCS 155. The MCS 155, for instance, includes functions to maintain the system 100 within operating limits to avoid the need for reactor trip or ESF actuation.

The reactor trip system echelon, typically, includes the RTS 147, e.g., safety equipment designed to reduce reactor core reactivity rapidly in response to an uncontrolled excursion. This echelon typically consists of instrumentation for detecting potential or actual excursions, equipment and processes for rapidly and completely inserting the reactor control rods, and may also include certain chemical neutron moderation systems (e.g., boron injection). As illustrated, automatic reactor trip functions performed by the reactor trip echelon are included in the MPS 145 (e.g., in the RTS 147).

The ESFAS echelon, typically, includes the ESFAS module 148 that is part of the MPS 145. The ESFAS echelon, as implemented in the ESFAS module 148, typically includes safety equipment which removes heat or otherwise assists in maintaining the integrity of the three physical barriers to radioactive material release (e.g., nuclear fuel rod cladding, reactor vessel, and reactor containment). This echelon detects the need for and performs such functions as emergency reactor cooling, pressure relief or depressurization, isolation, and control of various support systems (e.g., emergency generators) or devices (valves, motors, pumps) required for ESF equipment to operate.

The monitoring and indicator system echelon, typically, includes the main control room 140, and, in some aspects, is the slowest and also the most flexible echelon of defense. Like the other three echelons, human operators (e.g., of system 100) are dependent upon accurate sensor information to perform their tasks, but, given information, time, and means, can perform previously unspecified logical computations to react to unexpected events. The monitoring and indication echelon includes Class 1E and non-Class 1E manual controls, monitors, and indicators required to operate equipment nominally assigned to the other three echelons (e.g., through the manual 1E controls 142, 1E indicators 143, and non-1E controls and indicators 144). The functions required by the monitoring and indicator system echelons are provided by the manual controls, displays, and indicators in the main control room, which includes information from the MCS 155 and MPS 145. The safety monitoring, manual reactor trip, and manual ESF actuation functions are included in the MPS 145. The MCS 155 provides non-safety monitoring and manual controls to maintain operating limits during normal plant operation.

In addition to including the four echelons of defense, system 100 includes multiple levels of diversity. Specifically, I&C diversity is a principle of measuring variables or providing actuation means, using different technology, logic or algorithms, to provide diverse ways of responding to postulated plant conditions. Here, diversity is applied to the principle in instrumentation systems of sensing different parameters, using different technologies, logic or algorithms, or means of actuation to provide several ways of detecting and responding to a significant event. Diversity is complementary to the principle of defense-in-depth and increases the chances that defenses at a particular level or depth will be actuated when needed. Generally, there are six attributes of diversity: human diversity, design diversity, software diversity, functional diversity, signal diversity, and equipment diversity. As discussed in more depth in the present disclosure, the MPS 145 may incorporate the six attributes of diversity in order to mitigate the effects of a common-cause failure (e.g., a failure caused by software errors or software-developed logic that could defeat the redundancy achieved by hardware architecture) in the MPS 145.

Generally, human diversity relates to addressing human-induced faults throughout the system development life-cycle (e.g., mistakes, misinterpretations, errors, configuration failures) and is characterized by dissimilarity in the execution of life-cycle processes.

Generally, design diversity is the use of different approaches, including software and hardware, to solve the same or a similar problem. Software diversity is a special case of design diversity and is mentioned separately because of its potential importance and its potential defects. The rationale for design diversity is that different designs have different failure modes and are not be susceptible to the same common influences.

Generally, software diversity is the use of different software programs designed and implemented by different software development groups with different key personnel to accomplish the same safety goals, for example, using two separately designed programs to determine when a reactor should be tripped.

Generally, functional diversity refers to two systems (e.g., sub-systems within system 100) that perform different physical or logical functions though they may have overlapping safety effects.

Generally, signal diversity is the use of different process parameters to initiate protective action, in which any of the parameters may independently indicate an abnormal condition, even if the other parameters fail to be detected correctly.

Generally, equipment diversity is the use of different equipment to perform similar safety functions (e.g., one of the processes or conditions essential to maintain plant parameters within acceptable limits established for a design basis event, which may be achieved by the RTS or the ESF completing all required protective actions or the auxiliary supporting features completing all required protective actions, or both). In this case, "different" may mean sufficiently unlike as to significantly decrease vulnerability to common cause failure.

In some aspects, the MPS 145 may incorporate a combination of continuous (or partially continuous) self-testing and periodic surveillance testing. Such a test strategy may ensure that all detectable failures are identified and announced to the station personnel (e.g., through the main control room 140). Self-test features may provide a comprehensive diagnostic system ensuring that a system status is continually (or partially) monitored. All detectable failures may be announced to station personnel, and an indication of the impact of the failure may be provided to determine the overall status of the system. The self-test features maintain separation group and division independence. The self-test features ensure system integrity is maintained at all times.

In some aspects, each sub module within the MPS 145 (described in more detail below) may contain self-test features providing high fault detection coverage designed to detect single failures within the module. This may minimize the time required to detect faults, providing a benefit to safety and system availability. While the system is in normal operation, the self-tests run without affecting the performance of the safety function, such as response time.

The self-test features may be capable of detecting most faults in both active and inactive logic (e.g., logic that is activated only when a safety function is required to operate) to avoid having an undetected fault. Fault detection and indication occurs at the MPS sub module level, enabling plant personnel to easily identify the MPS sub module that needs to be replaced.

Periodic on-line surveillance testing capability may be incorporated to ensure all functional tests and checks, calibration verification, and time response measurements are validated. The periodic surveillance testing also verifies the continual self-testing functions.

The self-test and periodic surveillance testing features in the MPS 145 may be designed for in-service testability commensurate with the safety functions to be performed for all plant operating modes. The performance self-testing and surveillance testing does not require any makeshift test setups. The testing features may be inherent to the design of the system and add minimal complexity to the safety function logic and data structures. Continual indication of a bypass condition is made if: (1) a fault is detected by self-testing during normal operation of the plant, or (2) some part of a safety function is bypassed or deliberately rendered inoperable for testing. Once the bypass condition is removed, the indication of the bypass is removed. This may ensure that plant personnel can confirm that a bypassed safety function has been properly returned to service.

Diagnostics data for the MPS 145 are provided to a maintenance workstation (MWS) for each separation group and division. The MWS may be located close to the equipment to facilitate troubleshooting activities. The interface between the MPS and the MWS may be an optically-isolated, one-way diagnostic interface. All diagnostics data may be communicated via a physically separate communications path, ensuring that diagnostics functionality is independent of safety functionality. Additionally, the diagnostics data may be transmitted to a central historian for long-term storage. This provides a means of performing an historical analysis of the system operation.

The diagnostic system may maintain a list of installed modules. The lists may be continually compared to the installed modules that are active in the system to guard against a missing module or an incorrect module being installed.

All MPS safety data communications may be designed with error detection to enhance data integrity. The protocol features ensure communications are robust and reliable with the ability to detect transmission faults. Similar data integrity features may be used to transfer diagnostics data.

Figure 2A:
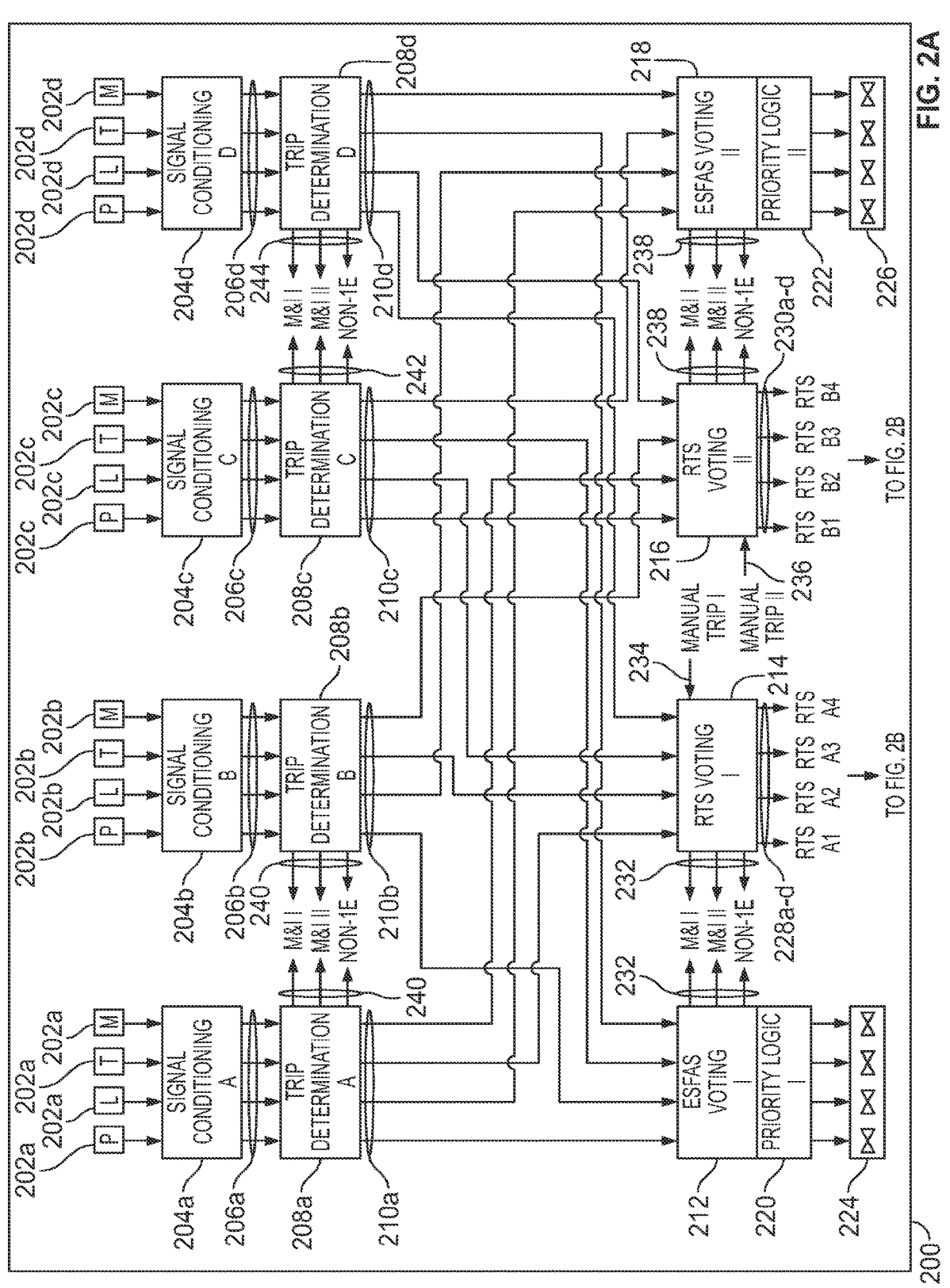
FIGS. 2A-2B illustrate a block diagram of module protection system (MPS) of an I&C system for a nuclear power system.
Figure 2B:
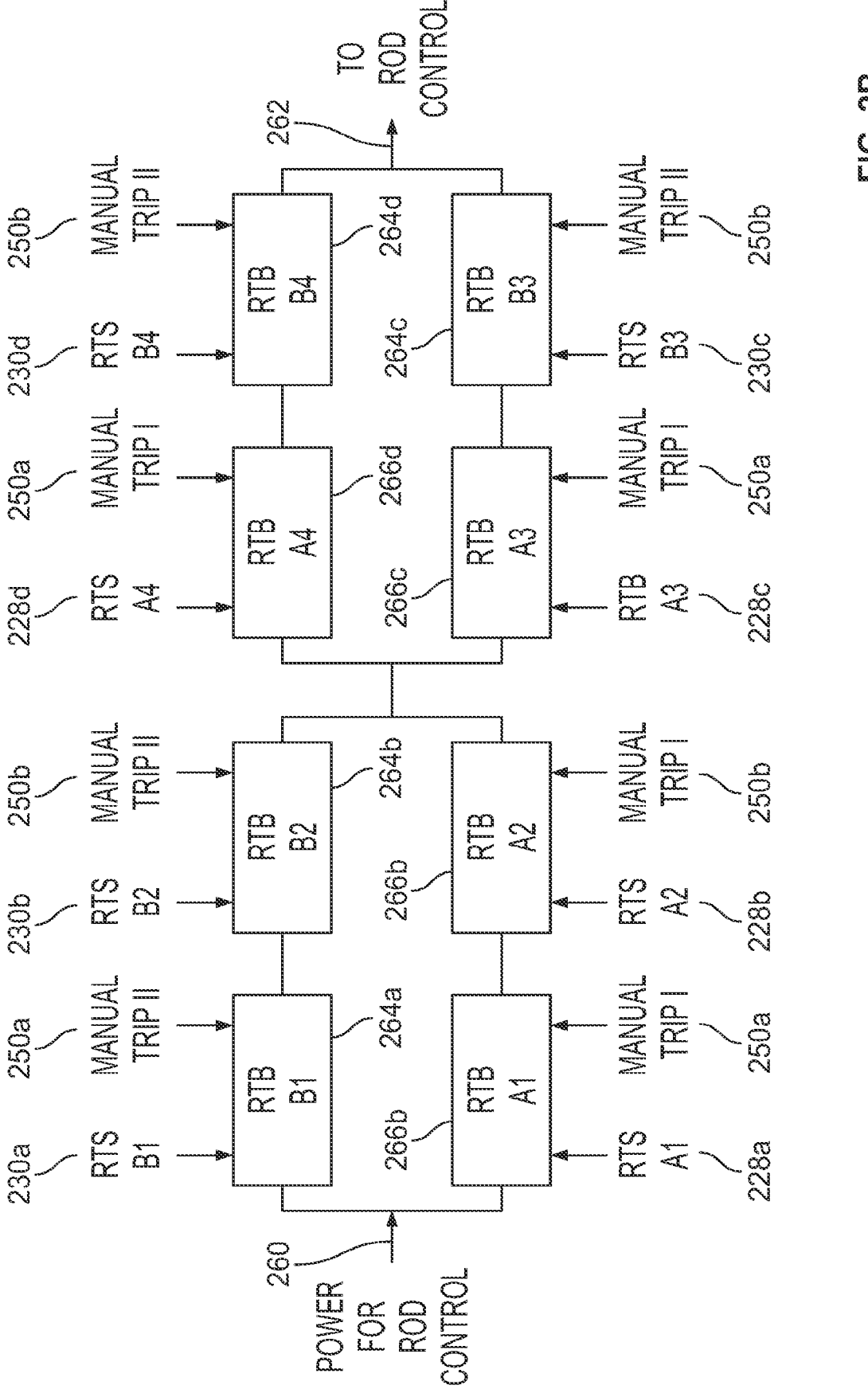

FIGS. 2A-2B illustrate a block diagram of module protection system (MPS) 200 of an I&C system for a nuclear power system 150. In some implementations, the MPS 200 may be similar or identical to the MPS 145 shown in FIG. 1. Generally, the illustrated MPS 200 includes four separation groups of sensors and detectors (e.g., sensors 202a-202d); four separation groups of signal conditioning and signal conditioners (e.g., signal conditioners 204a-204d); four separation groups of trip determination (e.g., trip determinations 208a-208d); two divisions of RTS voting and reactor trip breakers (e.g., division I RTS voting 214, and division II RTS voting 216); and two divisions of engineered safety features actuation system (ESFAS) voting and engineered safety features (ESF) equipment (e.g., division I ESFAS voting 212 and ESF equipment 224, and division II ESFAS voting 218 and ESF equipment 226).

Generally, the sensors 202a-202d include process sensors that are responsible for measuring different process parameters such as pressure, temperature, level, and neutron flux. Thus, each process parameter of the nuclear power system 150 is measured using different sensors, and is processed by different algorithms, which are executed by different logic engines. In some aspects, neutron flux sensors are responsible for measuring neutron flux from a reactor core from a shutdown condition up to 120 percent of full power. Three types of neutron flux detectors may be used in the MPS 200, including source range, intermediate range, and power range.

Generally, the signal conditioners 204a-204d receive the measurements from the sensors 202a-202d, process the measurements and provide outputs 206a-206d. In some aspects, the interconnections of the sensors 202a-202d to the signal conditioners 204a-204d may be dedicated copper wires or some other signal transmission method.

Figure 3A:
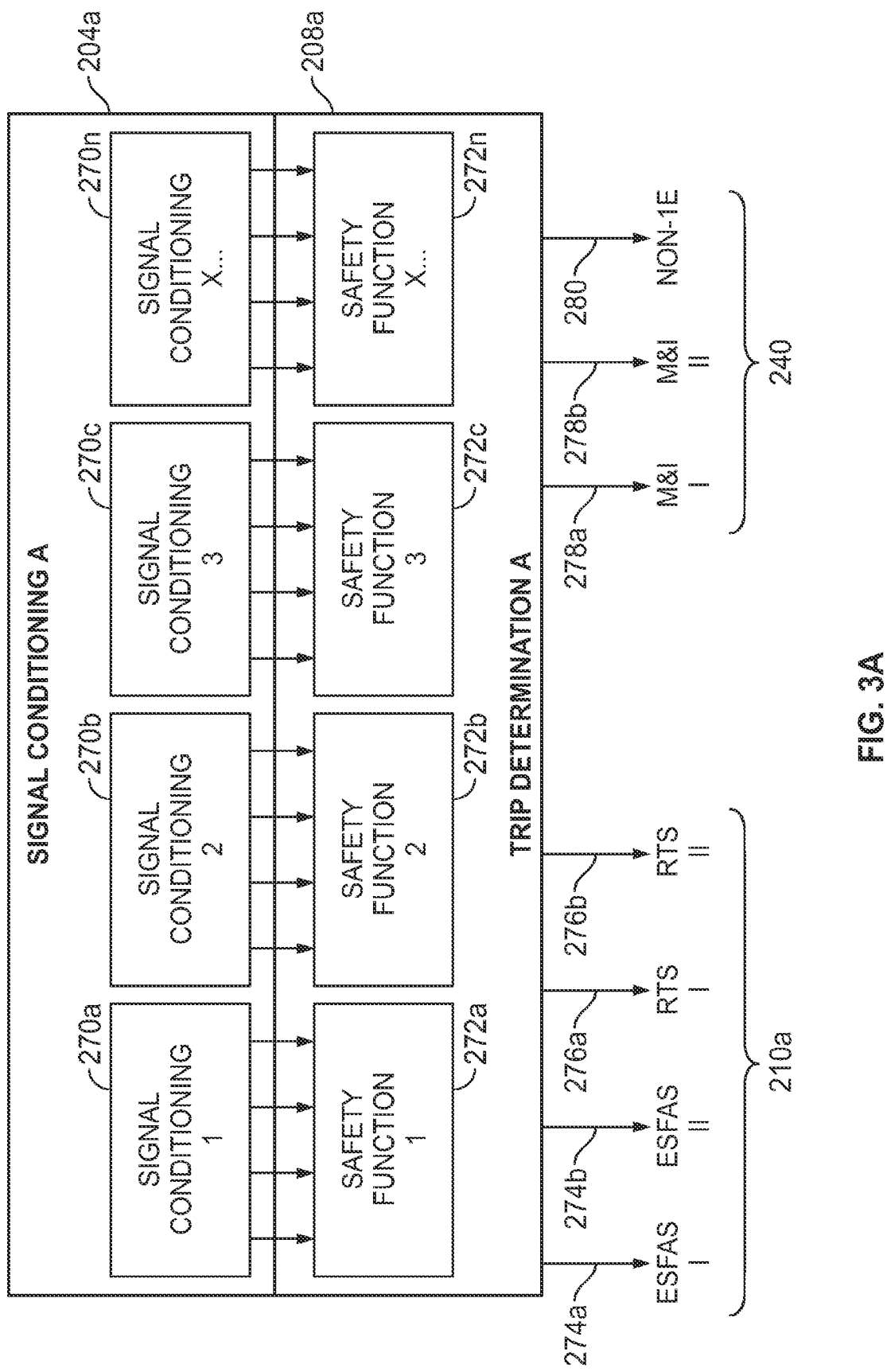
FIG. 3A illustrates a block diagram of a trip determination block of an MPS of an I&C system for a nuclear power system.

The signal conditioners 204a-204d each may be comprised of multiple input modules 270a-270n (e.g., indicating any number of modules depending on the number of sensor inputs), as shown in FIG. 3A, that are responsible for conditioning, measuring, filtering, and sampling field inputs from the sensors 202a-202d. Each input module 270a-270n may be dedicated to a specific input type, such as 24 V or 48 V digital inputs, 4-20 mA analog inputs, 0-10 V analog inputs, resistance thermal detector inputs, or thermo-couple inputs.

Each input module 270a-270n may be comprised of an analog circuit and a digital circuit. The analog circuit is responsible for converting analog voltages or currents into a digital representation. It is also referred to as signal conditioning circuitry. The digital portion of each input module 270a-270n may be located within a logic engine. The logic engine performs all input module control, sample and hold filtering, integrity checks, self-testing, and digital filtering functions. The digital representation of the sensor output is communicated from the signal conditioners 204a-204d to the trip determination 208a-208d through the outputs 206a-206d using, in some examples, a serial interface.

With reference to FIG. 3A as well, the trip determinations 208a-208d, generally, receive sensor input values in a digital format via a serial interface from the signal conditioners 204a-204d as described above. The trip determinations 208a-208d are each comprised of independent safety function modules (SFM) 272a-272n (described more fully with reference to FIG. 5), where a specific module implements one set of safety functions (e.g., a set may be a single safety function or multiple safety functions related to a particular process parameter). For example, a set of safety functions may consist of a group of functions related to a primary variable, such as a high and low trip from the same pressure input. Each SFM 272a-272n contains a unique logic engine dedicated to implementing one set of safety functions. This results in a gate level implementation of each set of safety functions being entirely different from all other sets of safety functions.

The sensor input values (e.g., outputs 206a-206d) may be communicated via a deterministic path and are provided to a specific SFM 272a-272n in each trip determination 208a-208d. These input values may then be converted to engineering units to determine what safety function, or a set of safety functions, is implemented on that specific SFM 272a-272n. The trip determinations 208a-208d provide these engineering unit values to the control system via, in some examples, an isolated, transmit only, fiber optic connection.

The SFMs in each trip determination 208a-208d make a reactor trip determination based, if required, on a predetermined set point, and provides a trip or no-trip demand signal to each RTS division (e.g., the RTS voting 214 and 216 in divisions I and II, respectively) via isolated, and in some cases triple-redundant, transmit only, serial connections. The SFMs also make an ESFAS actuation determination, if required, based on a predetermined set point, and provides an actuate or do-not-actuate demand signal to each ESFAS division (e.g., the ESFAS voting 212 and 218 in divisions I and II, respectively) via isolated, in some cases, triple-redundant, transmit only, serial connections.

Figure 3B:
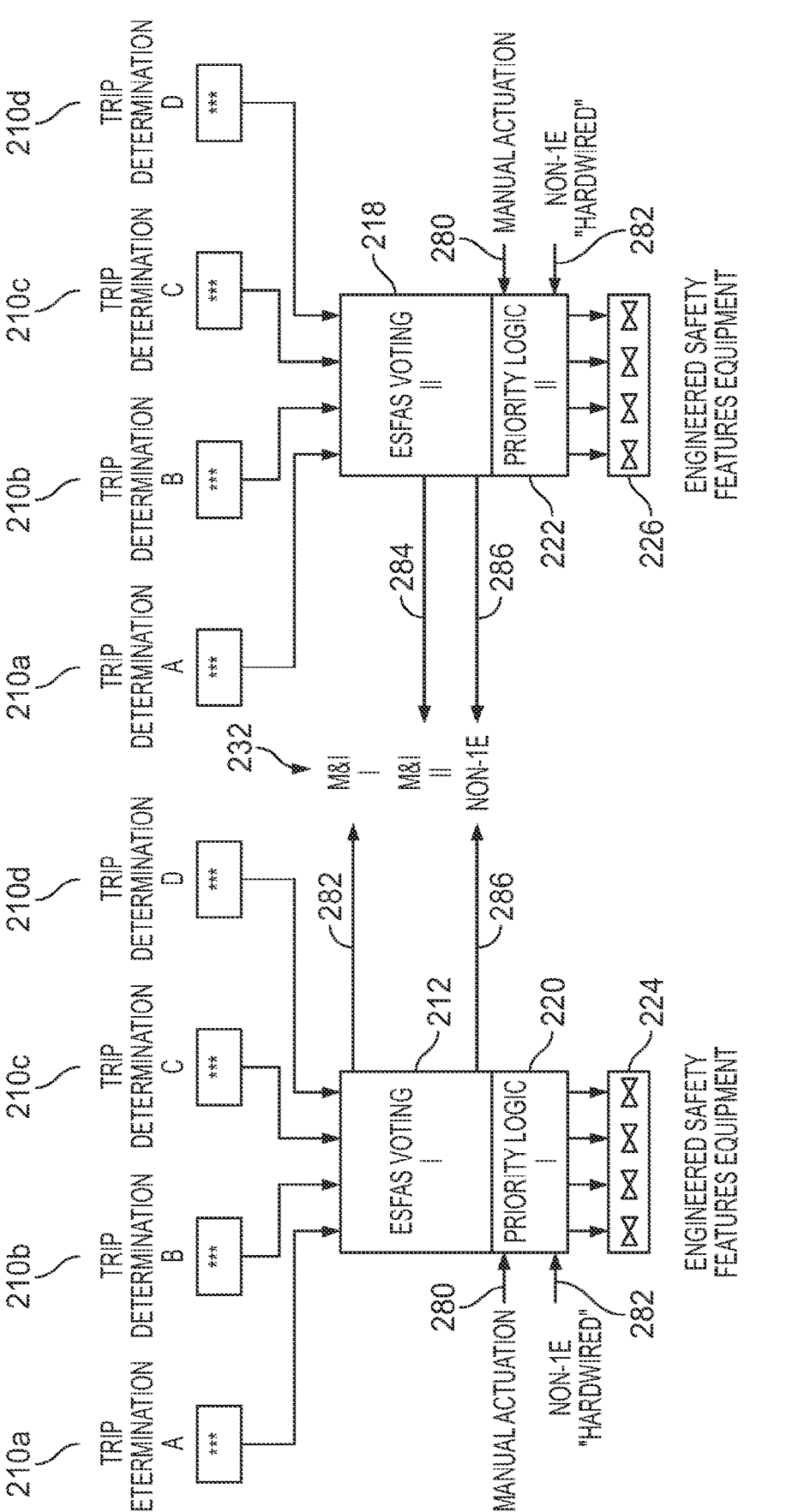
FIG. 3B illustrates a block diagram of an engineered safety features actuation system (ESFAS) of an MPS of an I&C system for a nuclear power system.

As shown in FIGS. 3A-3B, for instance, a particular trip determination 208a provides a trip or no-trip demand signal to ESFAS voting 212 through output 274a and to ESFAS voting 218 through output 274b. The trip determination 208a provides a trip or no-trip demand signal to RTS voting 214 through output 276a and to RTS voting 216 through output 276b. These outputs are also generally shown in FIG. 2A as outputs 210a-210d from the trip determinations 208a-208d, respectively.

As further shown in FIG. 3A, for instance, a particular trip determination 208a provides a trip or no-trip demand signal to monitoring & indication (M&I) outputs 278a and 278b (one per division), as well as to a non-1E output 280. Outputs 278a and 278b provide process information to the MCS for non-safety control functions. Output 280 provides process information and trip status information to the non-1E controls and indicators 144.

Returning to FIG. 2A, each RTS division (e.g., RTS voting 214 for division I and RTS voting 216 for division II) receives inputs from the trip determinations 208a-208d as described above via isolated, and in some aspects redundant (e.g., double, triple, or otherwise), receive only, serial connections 210a-210d. The trip inputs are combined in the RTS voting logic so that two or more reactor trip inputs from the trip determinations 208a-208d produce an automatic reactor trip output signal on outputs 228a-228d and 230a-230d (as appropriate for each division) that actuates the trip coils for four of the eight reactor trip breakers (RTB) (shown in FIG. 2B) associated with the respective division. In other words, the RTS voting logic, in this example implementation of the MPS 200, work on a "2 out of 4" logic, meaning that if at least two of the four trip determinations 208a-208d indicate that a reactor "trip" is necessary, then a trip signal is sent to the each of the RTB 264a-264d and 266a-266d. This breaker configuration permits safe and simple on-line testing of the MPS 200.

A manual trip 250a provides a direct trip of the RTB 266a-266d (for division I) and manual trip 250b provides a direct trip of the RTB 264a-264d (for division II) as well as input to the automatic actuation, manual trip 234 (for division I) and manual trip 236 (for division II) to ensure the sequence is maintained.

As further illustrated, each RTB 264a-264d and each RTB 266a-266d includes, as an input, a manual trip 250a or 250b. Thus, if both manual trips 250a and 250b are initiated (e.g., each manual trip for divisions I and II), then power input 260 will not be transmitted to power output 262 regardless of the status (e.g., trip or no-trip) of the inputs 230a-230d and inputs 228a-228d).

ESFAS voting and logic are arranged, in the example implementation, so that no single failure can prevent a safeguards actuation when required, and no single failure in a trip determination signal (e.g., 210a-210d) can generate an unnecessary safeguards actuation. The ESFAS system may provide both automatic and manual initiation of critical systems, such as the emergency core cooling system and the decay heat removal system.

Each ESFAS voting 212/218 receives inputs 210a-210d from the trip determinations 208a-208d via isolated, triple-redundant, receipt only, fiber optic (or other communication technique) connections. Actuation logic and voting occur within the ESFAS voting 212/218. When the ESFAS voting 212/218 determine an actuation is required, the ESFAS voting 212/218 sends an actuation demand signal to ESFAS priority logic 220/222, respectively, which actuates appropriate ESF equipment 224 and 226.

The illustrated implementation of the MPS 200 in FIGS. 2A-2B and 3A-3B ensures a high level of independence between the key elements. This includes independence between the four separation groups of sensors and detectors 202a-202d, the four separation groups of trip determination (labeled "a" through "d"), the two divisions of RTS 214/216 (division I and division II as described), the two divisions of the ESFAS circuitry 212/218 (division I and division II as described), and the two divisions of the ESF equipment 224/226 (division I and division II as described). Based on inputs to an SFM (e.g., in the trip determinations 208a-208d), the MPS 200 implements a set of safety functions independently within each of the four separation groups. Safety function independence is maintained from the sensors 202a-202d to the trip determination output 210a-210d. This configuration, in some aspects, limits SFM failures to those based on that module's inputs. This strategy may help limit the effects of a common-cause failure and enhance signal diversity. This method of independence may also ensure a failure within independent safety functions does not propagate to any of the other safety functions modules. Further, on-line replacement of a failed SFM ensures that the failure can be corrected with minimal, if any, impact to other modules.

Communication of safety function data within the illustrated MPS 200 is transmitted or received via triple module, redundant, independent, optically isolated, one-way communication paths. This communication scheme may ensure that, apart from interdivisional voting, a safety function is not dependent on any information or resource originating outside its division to accomplish its safety function. Fault propagation between Class 1E divisions (e.g., divisions I and II) is prevented by one-way isolation (e.g., optical isolation or otherwise) of the divisional trip signals.

The illustrated implementation of the MPS 200 in FIGS. 2A-2B and 3A-3B further incorporates redundancy in multiple areas of the illustrated architecture. The redundancy within the MPS 200 includes four separation groups of sensors and detectors (labeled "a" through "d"), trip determination (labeled "a" through "d"), and two divisions of RTS and ESFAS circuitry (division I and division II as described). The MPS 200 also uses two-out-of-four voting so that a single failure of an initiation signal will not prevent a reactor trip or ESF equipment actuation from occurring when required. Additionally, a single failure of an initiation signal will not cause spurious or inadvertent reactor trips or ESF equipment actuations when they are not required.

The MPS 200 also incorporates functional independence by implementing each set of safety functions, which is used to mitigate a particular transient event on an independent SFM with a unique logic engine for that particular set of safety functions.

In some aspects, the MPS 200 implements design techniques to realize a simple, highly reliable, and safe design for a nuclear reactor system. For example, the MPS 200 may be based on a symmetrical architecture of four separation groups and two divisions. Each of the four separation groups may be functionally equivalent to the others, and each of the two divisions may be functionally equivalent. As described above, two-out-of-four voting may be the only voting strategy in the illustrated implementation. As another example, logic of the MPS 200 may be implemented in finite-state machines (e.g., a collection of digital logic circuits that can be in one of a finite number of states, and is in only one state at a time, called the current state, but may change from one state to another when initiated by a triggering event or set of conditions, such as a state transition) dedicated to a particular safety function or group of safety functions. Thus, no kernel or operating system is required. As another example, communications within the MPS 200 may be based on deterministic protocols, and all safety data are communicated via redundant communication paths. As another example, diversity attributes of the MPS 200 may be designed to be inherent to the architecture without the additional complexities of additional systems based on completely different platforms.

For instance, FIGS. 4A-4B illustrate example charts 400 and 450, respectively, that illustrate how the multi-layered diversity strategy implemented within MPS 200 mitigates software- or software-logic based common-cause failures. Charts 400 and 450 illustrate how a multi-layered diversity strategy implemented within MPS 200 can eliminate a concern for software-based or software logic-based CCF within the MPS (e.g., MPS 200). In these examples, the transient event is a loss of feedwater for a nuclear power system. As illustrated, two different process parameters, A1 and A2, are measured (e.g., through sensors 202a-202d). A1, as illustrated, is a temperature parameter while A2, as illustrated, is a pressure.

The different process measurements, A1 and A2, are input into two different safety function algorithms: (A1) High Temperature and (A2) High Pressure, as illustrated. Each of the two safety function algorithms are located on a separate and independent SFM within a separation group. The safety function algorithms may be implemented using two different sets of programmable digital hardware (A/C and B/D) divided into four separation groups (A, B, C, D) and two divisions, as is shown with MPS 200. For example, here, the two safety functions comprise a single set of safety functions. Each set (e.g., of two safety function algorithms) may be based on different technology.

Design diversity is also incorporated by process as each set of programmable digital hardware may be designed by different design teams using different sets of design tools. As one example, the safety function(s) may be implemented in a microprocessor. In this example, the safety function(s) may be evaluated in a sequential manner that, in some aspects, may introduce a dependency of one safety function (A2 for instance) on another safety function (A1 for instance) due to the sequential operation of the processing loop. As another example, the safety functions may be implemented in a state-based field programmable gate array (FPGA). In this example, each safety function may be evaluated independently of every other safety function. This latter example may ensure an increased independence by removing any dependence of the processing of one safety function on another safety function.

The multi-layered diversity for the loss of feedwater transient event example provides protection against a CCF defeating the protective action by limiting the software CCF to one set (NC) of a particular safety function (A1). In some aspects, the software CCF is limited to a particular safety function based on the functional independence between the two safety functions and the process measurements that the safety function algorithms use as inputs. In some aspects, the software CCF is limited to one set of a particular safety function by incorporating different programmable hardware, design teams, and design tools for each set. With the CCF limited to one set of a particular safety function, the transient event is mitigated by the other set (B/D) of that safety function (A1) or both sets (A/C and B/D) of the second safety function (A2).

For example, as shown in FIG. 4A, an output of the safety function for A1 that indicates that protective action needs to be taken by all four separation groups (A, B, C, D) (e.g., shown by the check marks) results in an initiation of protective action (e.g., as shown by the "Trip"). As shown in FIG. 4B, if there is a CCF in two separation groups (A and C), even two groups in a single division, for safety function A1, positive indications of a protective action in the other separation groups (B and D) still provide for sufficient votes (in a two-out-of-four scheme as described above) to initiate the protective action. Further, the CCFs in groups A and C for safety function A1 do not propagate to safety function A2 because of the independent evaluation on each SFM.

Figure 5:
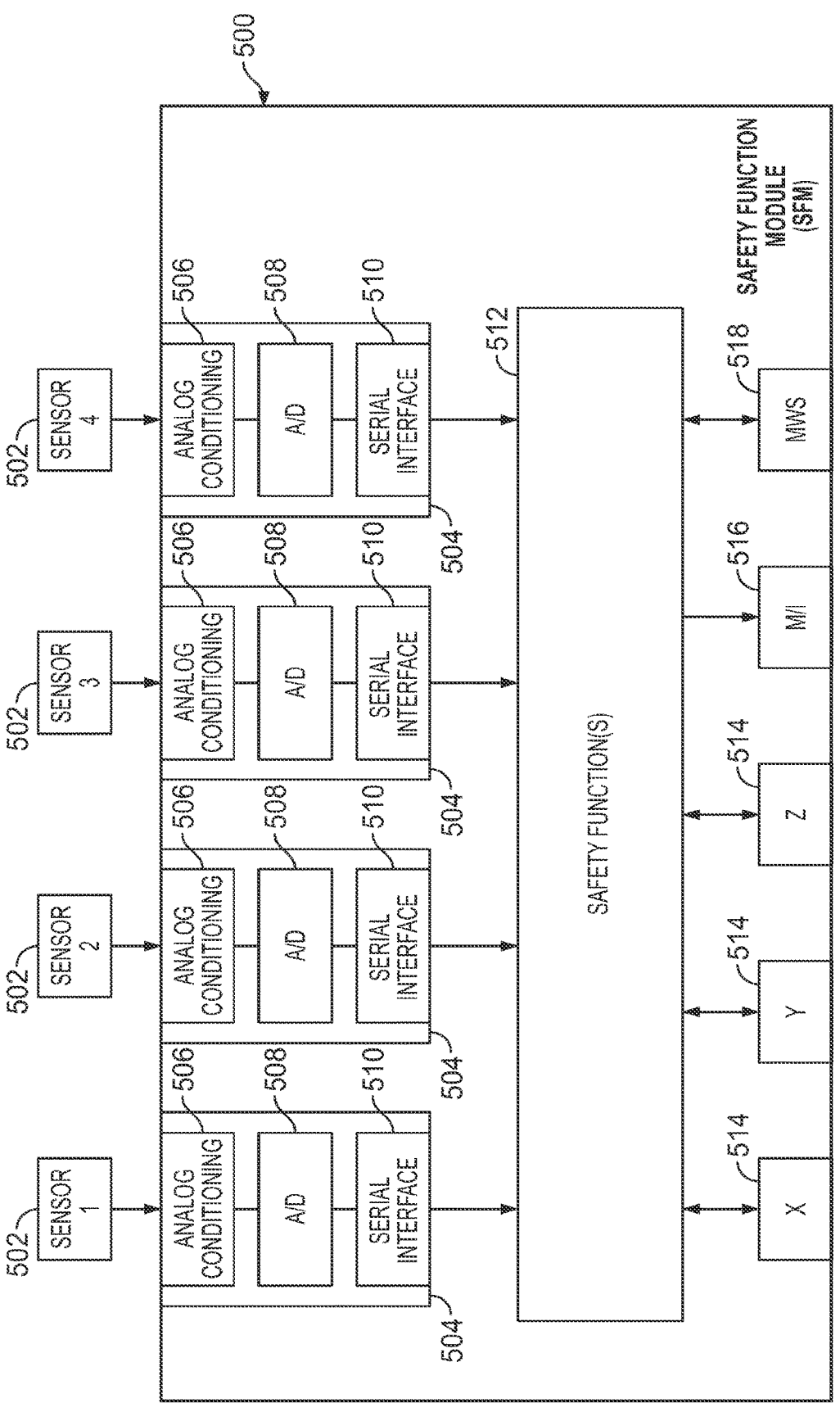
FIG. 5 illustrates a block diagram of a safety function module (SFM) of an MPS of an I&C system for a nuclear power system.
Figure 6:
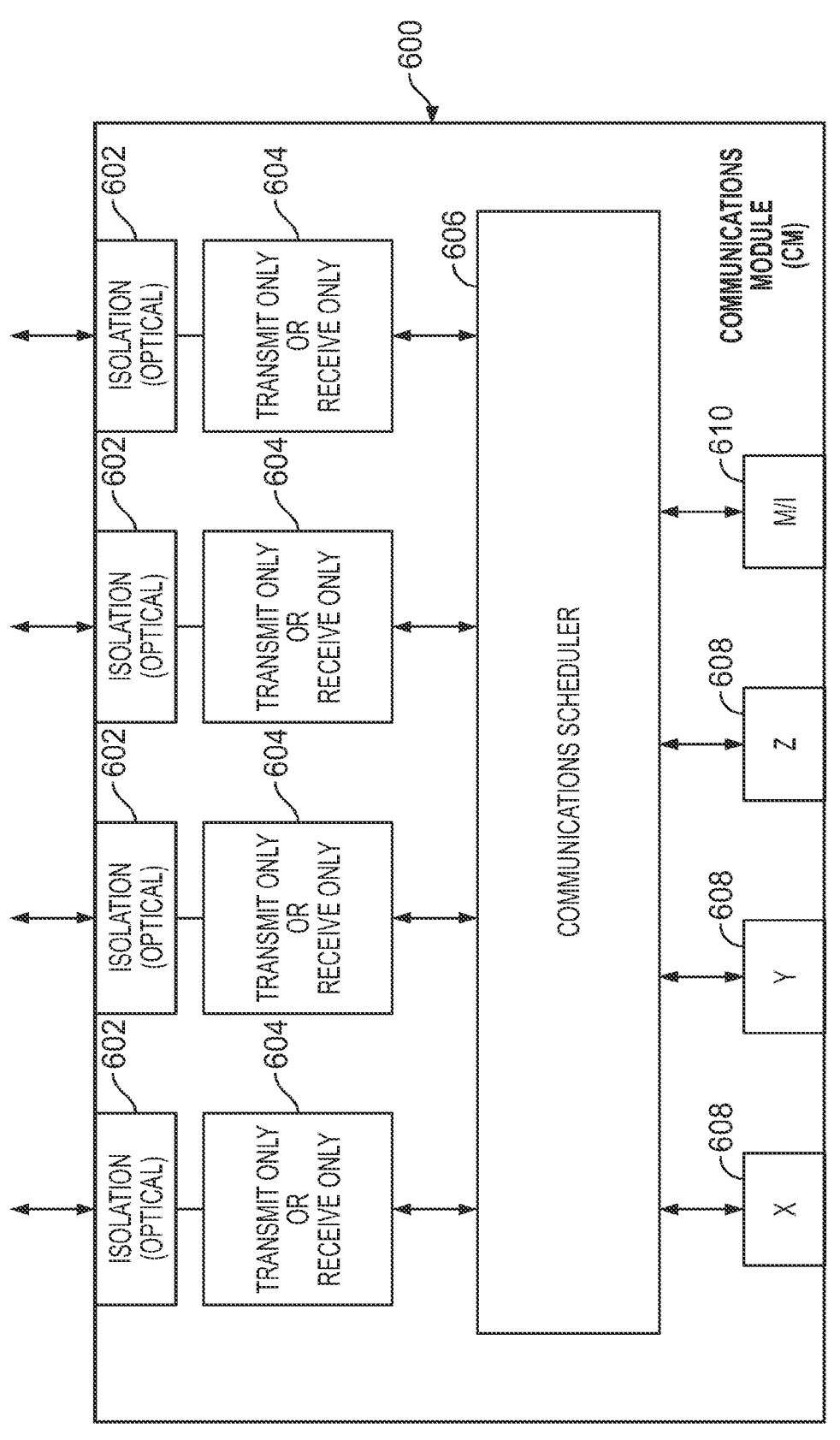
FIG. 6 illustrates a block diagram of a communications module (CM) of an MPS of an I&C system for a nuclear power system.
Figure 7:
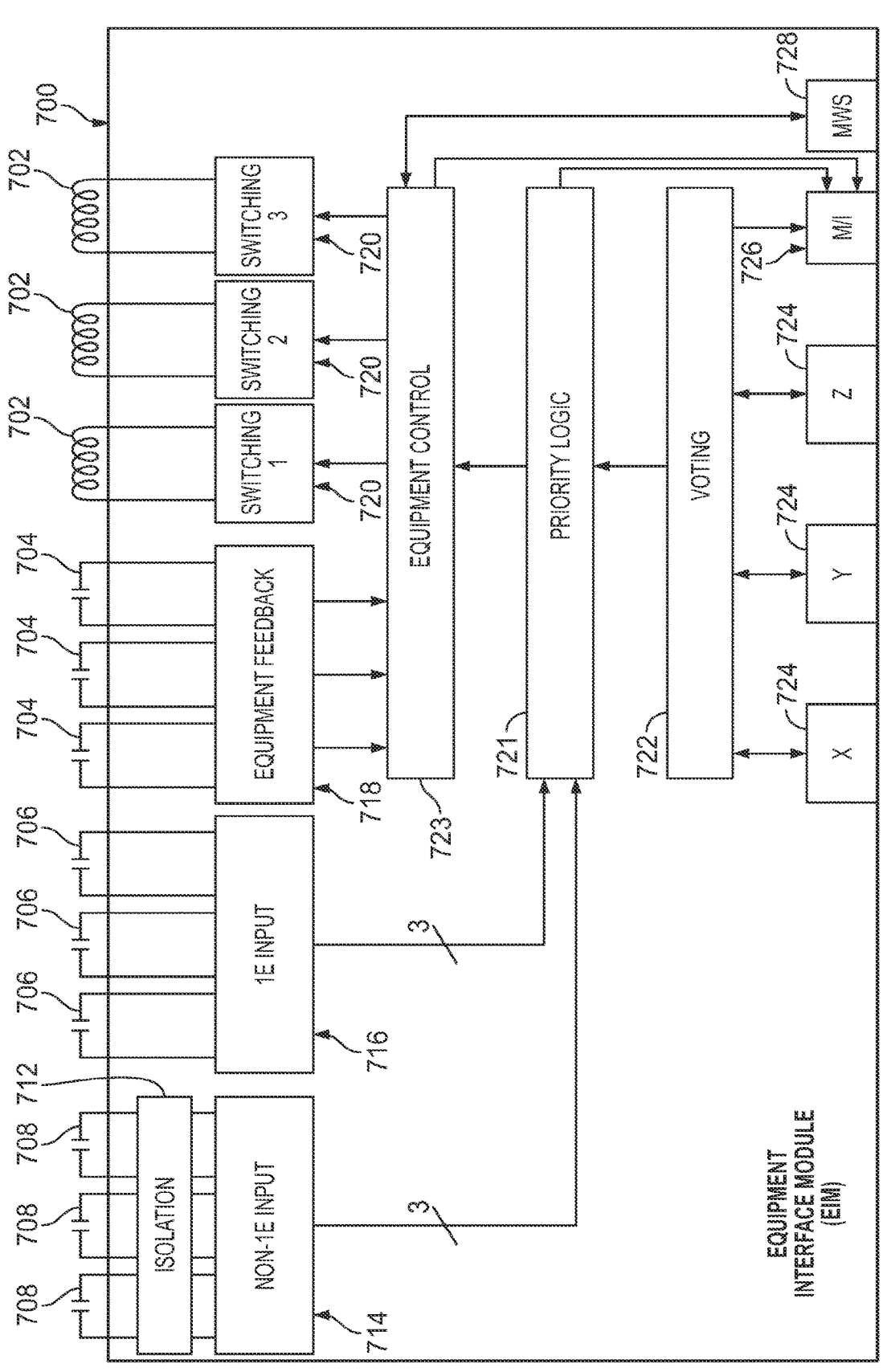
FIG. 7 illustrates a block diagram of an equipment interface module (EIM) of an MPS of an I&C system for a nuclear power system.
Figure 8:
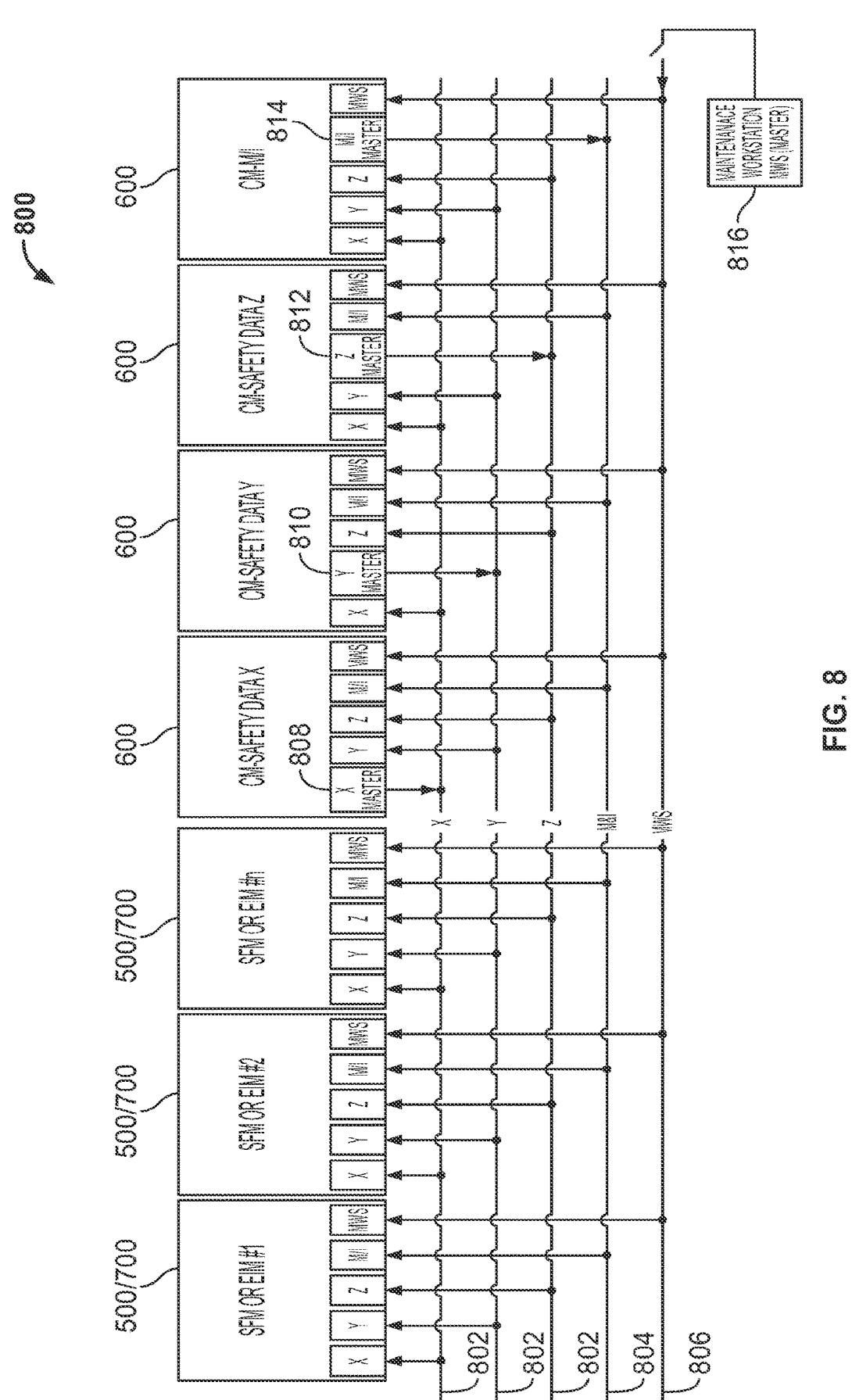
FIG. 8 illustrates an example embodiment of a chassis of a reactor protection system that communicably couple one or more SFM, EIM, and CM.

FIG. 5 illustrates a block diagram of a safety function module (SFM) 500 of an MPS of an I&C system for a nuclear power system. FIG. 6 illustrates a block diagram of a communications module (CM) 600 of an MPS of an I&C system for a nuclear power system. FIG. 7 illustrates a block diagram of an equipment interface module (EIM) 700 of an MPS of an I&C system for a nuclear power system. FIG. 8 (discussed below) illustrates the communications paths within a chassis (e.g., a mechanical structure that interconnects one or more SFM 500, CM 600, and EIM 700). Generally, the illustrated modules 500, 600, and 700, interconnected within a chassis (as illustrated with chassis 800 and as described below), implement the safety functions of the MPS 200 and make up the separation group level modules (e.g., signal conditioners 204a-204d, trip determinations 208a-208d), the RTS level modules (e.g., RTS voting 214/216), and the ESFAS level modules (e.g., ESFAS voting 212/218). In some aspects, having three types of modules (500, 600, and 700) may minimize the number of line replaceable units, thereby minimizing obsolescence. Further, these modules (500, 600, and 700) may be functionally independent so that a single failure in any individual module (500, 600, and 700) does not propagate to other modules or other safety functions. Further, the combinations of modules (500, 600, and 700) as implemented in FIG. 8 may provide for discrete, deterministic safety signal paths.

In some aspects, the modules (500, 600, and 700) may have one or more characteristics that defines, at least in part, their functional independence. For example, each of the modules may be fully autonomous relative to each other module in an overall system/architecture (e.g., in the MPS 200). As another example, each of the modules may perform a particular, intended safety function autonomously relative to each other module in the overall system/architecture. As yet another example, each of the modules may include dedicated logic, which is specific to the particular, intended safety function of the module. Each functionally independent module may not, therefore, be dependent on logic or functionality from any other module to complete the particular, intended safety function.

Turning to FIG. 5, the SFM 500, as illustrated, processes sensor inputs or data from other SFMs to make reactor trip and/or ESF actuation determinations for the separation group to which the particular SFM is assigned (e.g., separation group A, B, C, or D). An SFM 500 can be used in two separate configurations: (1) sensor signal conditioning with safety data bus communication, and reactor trip and/or ESF actuation; and (2) safety data bus communication with reactor trip determination and/or ESF actuation determination.

As illustrated, the SFM 500 generally includes an input block 504, a functional logic block 512, and communication blocks 514, 516 and 518. Each input block 504 (four shown in FIG. 5) consists of a signal conditioning circuit 506, analog-to-digital (ND) converter 508, and a serial interface 510. Each input block 504 is communicably coupled to a sensor 502 (e.g., that may be the same or similar to the sensors 202a-202d). As shown, an individual SFM 500 can handle up to four input blocks 504 (in the illustrated example embodiment). The input type can be any combination of analog and digital (e.g. 4-20 mA, 10-50 mA, 0-10 V) that the SFM 500 would need to make a trip or ESF actuation determination, including the generation of permissives and interlocks.

The functional logic block 512 is a programmable portion of the SFM 500 that converts an output from the serial interface 510 of an input block 504 (if used) into engineering units. The functional logic block 512 may also makes a trip and/or ESF actuation determination based on the output of the input block 504 (e.g., based on sensor measurement from sensor 502) and/or information from safety data buses. The functional logic block 512 may also generate permissives and control interlocks. As illustrated, the functional logic block 512 includes multiple deterministic logic engines that utilize the input blocks 504 and/or information obtained from safety data buses to make a trip or ESF actuation determination.

Setpoint and other tunable information utilized by the functional logic block 512 may be stored in non-volatile memory (e.g., on the SFM 500). This may allow for changes without modifying underlying logic. Further, to implement functional, signal and software diversity, a primary and backup function used to mitigate an AOO or PA may not be on the same SFM 500. Thus, by using a dedicated SFM 500 for a function or group of functions and by ensuring primary and backup functions are on separate modules 500, the effect of a software CCF is limited due to the unique logic and algorithm on each module 500.

The communication blocks 514/516/518 consists of five separate communication ports (e.g., three safety data ports labeled 514, one port labeled 516, and one port labeled 518). Each port may be functionally independent and is designated as either a Monitoring and Indication (M/I) Bus (e.g., block 516), Maintenance Workstation (MWS) Bus (e.g., block 518), or a Safety Bus (e.g., blocks 514). Although each safety data bus 514 may communicate the same data, each communication port is asynchronous and the port packages and transmits data differently by using different independent and unique communications engines. For example, one safety data bus 514 may transmit, for example, 10 packets of data in sequential order (e.g., 1, 2, . . . , 10) while another safety bus 514 transmits the same 10 packets in reverse order (e.g., 10, 9, . . . , 1) and a third safety bus 514 transmits even packets first followed by odd packets (e.g., 2, 4, . . . 10, 1, 3, . . . , 9). This triple module redundancy and diversity not only allows for communication error detection but limits a communication CCF to a particular bus without affecting the ability of RTS or ESFAS to make a correct trip and/or actuation determination.

Turning to FIG. 6, the CM 600 provides independent and redundant communication between other modules of the MPS, such as SFMs 500 and EIMs 700, within separation group-level interconnects, RTS-level interconnects, and ESFAS-level interconnects of an MPS of an I&C system for a nuclear power system (e.g., MPS 200). For example, the CM 600 may be a pipeline for data to be passed within the MPS, as well as a scheduler of such passage of data. The CM 600, in any particular channel, may control the operations/passage of data within that channel. In the illustrated implementation of the CM 600, there are three types of blocks: restricted communication blocks (RCB) 604, a communication scheduler 606, and communication blocks 608/610.

An RCB 604, as illustrated, consists of four communication ports. In some aspects, each port can be configured to a different unidirectional path (e.g., receive only or transmit only). In some implementations, as in the illustrated CM 600, information received or sent from a particular RCB 604 is passed through an optic isolator 602. In some cases, the optic isolator 602 may help ensure that data from any particular trip determination is isolated from the data of the other trip determinations, thereby ensuring independent redundancy.

The communication scheduler 606 is responsible for moving data from/to the communication blocks 608/610 to/from the RCB 604. In some aspects, the communications engine 606 consists of programmable logic, such as an FPGA, a microprocessor, or other discrete logic programmed to schedule communication amongst the described interconnects.

The communication blocks 608/610 consist of four separate communication ports (e.g., three safety data ports labeled 608 and one port labeled 610). Each port may be functionally independent and is designated as a Monitoring and Indication (M/I) Bus (e.g., block 610) or a Safety Data Bus (e.g., blocks 608). In some aspects, an M/I bus 610 may gather information from all modules in the MPS (e.g., modules 500, 600, and 700), including a condition of each of such modules, and sends that information to a "historian" station (e.g., dedicated computing system for historical data of the MPS).

Although each safety data bus 608 may communicate the same data, each communication port packages and transmits data differently, as described above with reference to busses 514. Depending on the application of the communications module, the four communication blocks 608/610 can be configured in any combination of uni- and bidirectional paths.

Turning to FIG. 7, the EIM 700, generally, provides an interface to each component within the nuclear power system within the RTS and/or ESFAS level systems, in order for trip determinations to be voted on and component-level actuations and manipulations to be made. As illustrated, the EIM 700 includes output blocks 720, an equipment feedback block 718, a 1E manual input 716, a non-1E manual input 714, a voting engine 722, a priority logic block 721, an equipment control block 723, and communication blocks 724/726/728. Generally, the EIM 700 may perform voting, and in some cases double voting (e.g., two out of three voting for communication and two out of four voting for trip signals), based on trip signals to ensure that failures of a single component do not propagate within channel-level interconnects, RTS-level interconnects, and ESFAS-level interconnects of an MPS of an I&C system for a nuclear power system (e.g., MPS 200). The EIM 700 may perform a priority assignment for the automatic signal from the voting 722, manual actuation/1E input 716, and non-1E input 714.

The output blocks 720, include, as illustrated, up to three independent output switches, or more in some examples, that can be used in external circuits and are coupled to electrical loads 702 (e.g., actuators). In some aspects, this allows for the EIM 700 to control a single component directly or provide an initiation signal for multiple components. For example, an output block 720 energizes a relay that starts various pumps and opens multiple valves. Each output block 720 may also include the capability to self-test and perform load continuity checks.

The equipment feedback block 718, as shown, may consist of multiple (e.g., up to three or more in some examples) feedback inputs 704 from equipment. The feedback inputs 704 can include, for example, valve position (e.g., fully open, fully-closed), breaker status (e.g., closed/open), or other feedback from other components. The equipment feedback 704 may be utilized in the voting equipment control block 723 discussed below.

The 1E manual input block 716 may provide multiple (e.g., up to two or more in some examples) manual input signals 706. This portion of the EIM 700 may be dedicated to manual inputs and is utilized in the priority logic block 721.

The multiple input signals 708 are coupled to the non-1E input block 714 via an isolation interface 712. This electrical isolation interface 712 allows the use of non-1E signals for input to the priority logic block 721.

The voting engine 722 receives the trip determination inputs from the communications blocks 724. The result of the voting provides an actuation or no actuation signal to the priority logic block 721 for an automatic actuation signal. In some aspects, the voting engine 722 may implement a voting scheme, and in some cases, a double voting scheme, to ensure that failures of a single component within the MPS do not propagate. For example, in some aspects, the voting engine 722 receives trip determinations at the communications blocks 724. Each communication block 724 may receive a trip determination (e.g., trip or no trip) from four channels or separation groups (e.g., channels A-D described above). Within the voting engine 722, in some aspects, there may be three "A" trip determinations, three "B" trip determinations, three "C" trip determinations, and three "D" trip determinations. The voting engine 722 may thus perform a two out of three determination on each of the four channels or separation groups. If at least two of three "A" channels provide a valid communication of a trip (e.g., indicate that communication of a trip determination is valid), for example, then the voting engine 722 may communicate, at least initially, that there is a trip on channel "A," while if only one of the three "A" channels indicate a trip, then the voting engine 722 may determine that there is no trip on channel "A."

The voting engine 722, as noted above, may implement a double voting scheme to further ensure that failures are not propagated throughout the MPS structure. For example, subsequent to the two out of three communication determination described above, the voting engine 722 may also perform a two out of four trip determination in order to determine whether a trip has actually occurred (e.g., as opposed to a failure indicating a false trip). For example, outputs of the four voting blocks (e.g., two of three voting logical gates) in the voting engine 722 that perform the two of three determination may be fed to another voting block (e.g., two of four voting logical gate) that makes the two of four determination. If at least two of the four outputs from the first tier voting blocks (e.g., the two of three blocks) indicate a trip, then the voting engine 722 may determine that a trip has occurred (and EFS equipment such as loads 702 should be actuated); otherwise, the voting engine 722 may determine that no actual trip has occurred.

The priority logic block receives inputs from the voting block 722, 1E manual input block 716, and non-1E manual input block 714. The priority logic block 721 then makes a determination, based on all inputs, what to command the equipment control module to perform.

The equipment control block receives a command from the priority logic module and performs the appropriate actuation or manipulation on the component via the output block 720. The equipment control block receives feedback from the equipment via the equipment feedback block 718 for equipment control purposes.

The equipment control block 722, priority logic block 721, and voting block 722 each provide status information to the Maintenance Workstation (MWS) Bus (e.g., block 728). The communication blocks 724/726/728 consist of five separate communication ports (e.g., three safety data ports labeled 724, one port labeled 726, and one port labeled 728)). Each port may be functionally independent and is designated as either a Monitoring and Indication (M/I) Bus (e.g., block 726), Maintenance Workstation (MWS) Bus (e.g., block 728), or a Safety Data Bus (e.g., blocks 724).

FIG. 8 illustrates an example embodiment of a chassis 800 of a reactor protection system (e.g., MPS 145) that communicably couples one or more SFM 500, EIM 700, and CM 600. This figure provides an example of three SFM 500 or EIM 700 connected to four CM 600 in a chassis 800. In this example, there are five data bus paths shown. For example, there are three safety data ports 802 labeled X, Y, and Z, respectively. There is one data bus path 804 labeled M/I. There is one data bus path 804 labeled MWS. Each data bus path 802/804, in this example, may be functionally and electrically independent of every other data bus path 802/804 in the chassis 800.

In this illustrated embodiment, each of the CM 600 may include a master of one of the data bus paths 802/804. As illustrated, the master 808 of the X data bus path 802 is part of the CM 600 for safety data X. The master 810 of the Y data path 802 is the CM 600 for safety data Y. The master 812 of the Z data path 802 is the CM 600 for safety data Z. Finally, as shown in this example, the master 814 for the M/I data path 804 is the CM 600 for M/I. In this example as well, there is an MWS master 816 that is the master of the MWS data path 806, which is separately connected (e.g., as a Maintenance Workstation). The Maintenance Workstation (MWS master) 816 may be disconnected for normal operation of the equipment by a hardwired switch.

Figure 9A:
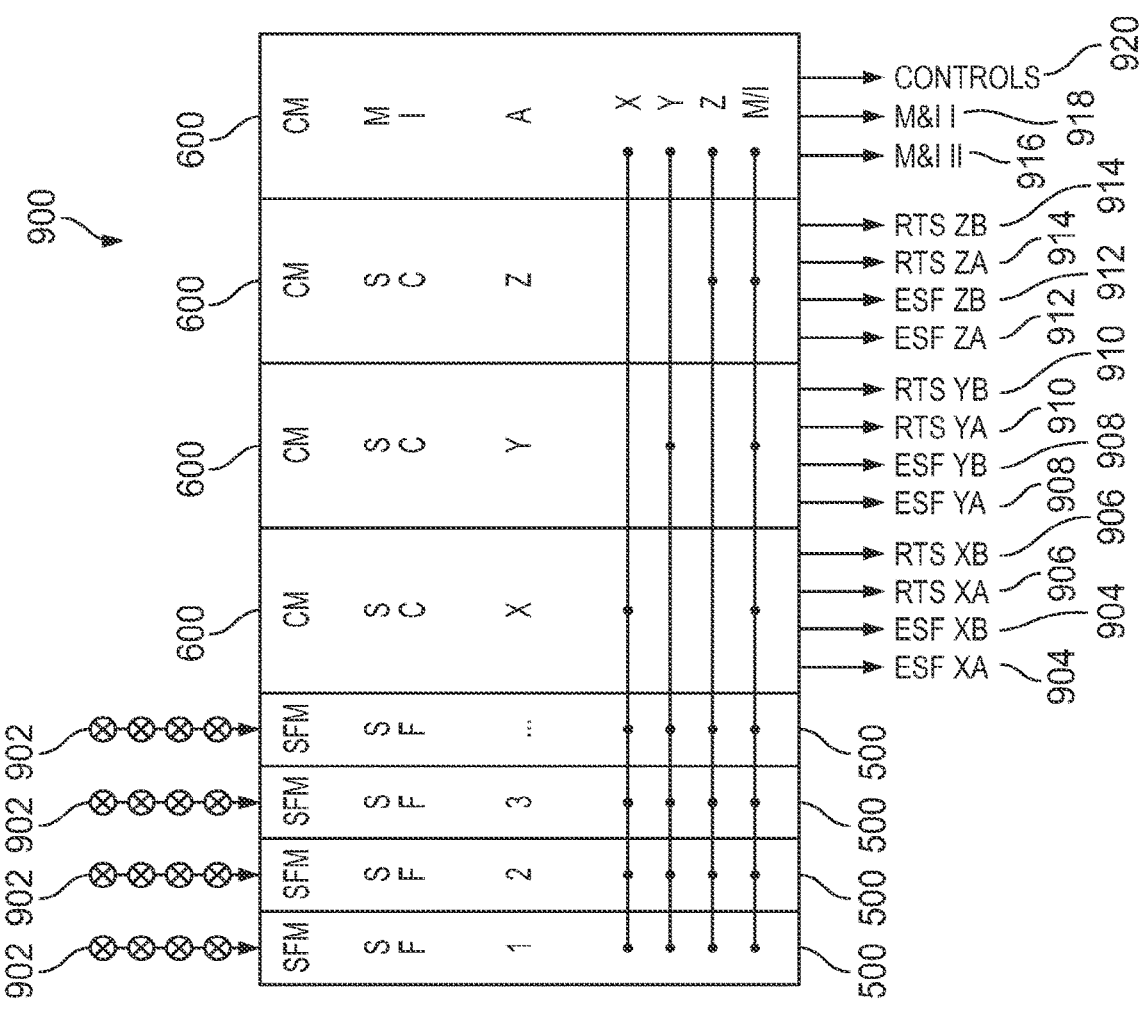
FIGS. 9A-9C illustrate block diagrams of trip determination-, RTS-, and ESFAS-level interconnects that utilize one or more of the SFM, CM, and EIM.
Figure 9B:
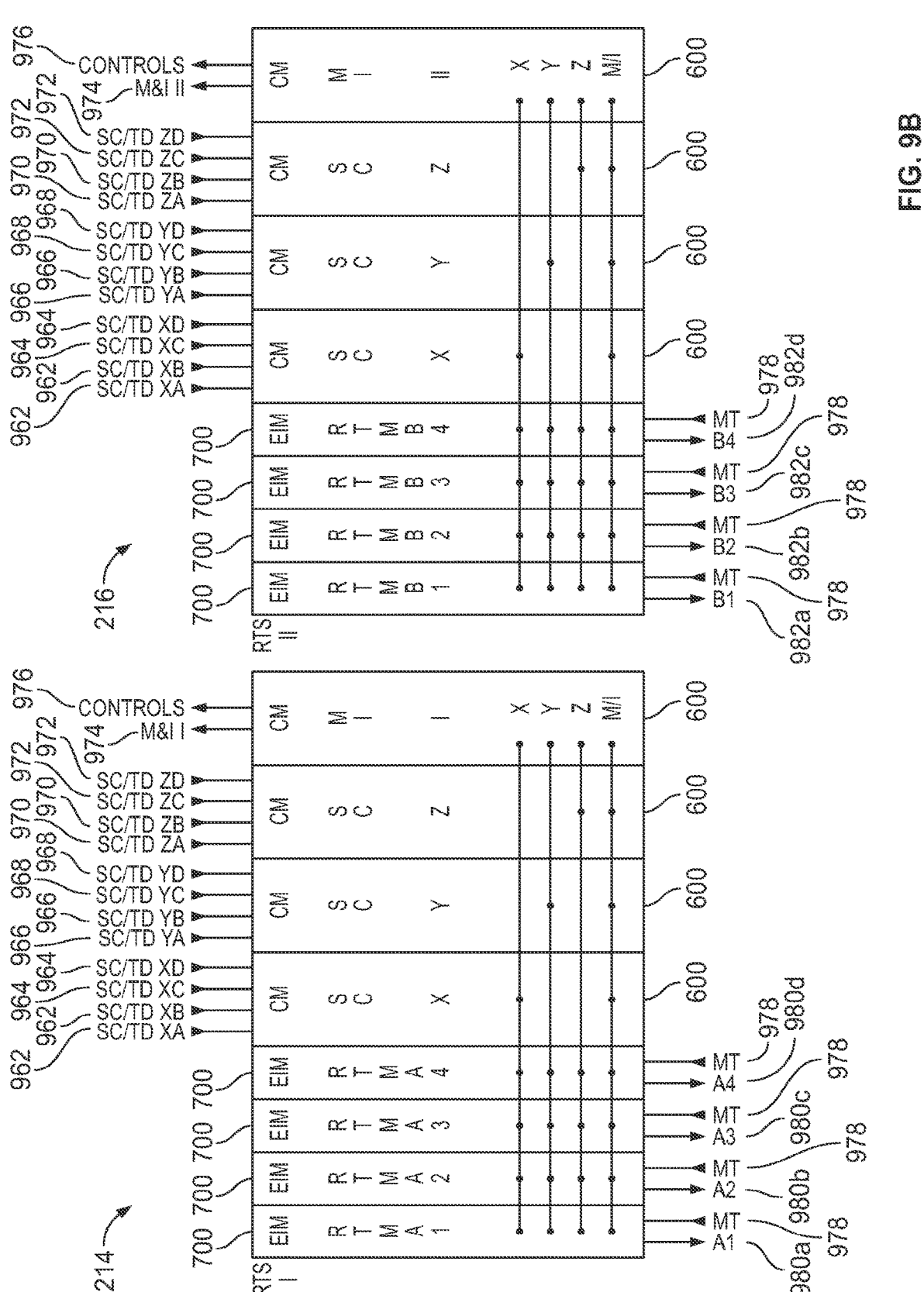
Figure 9C:
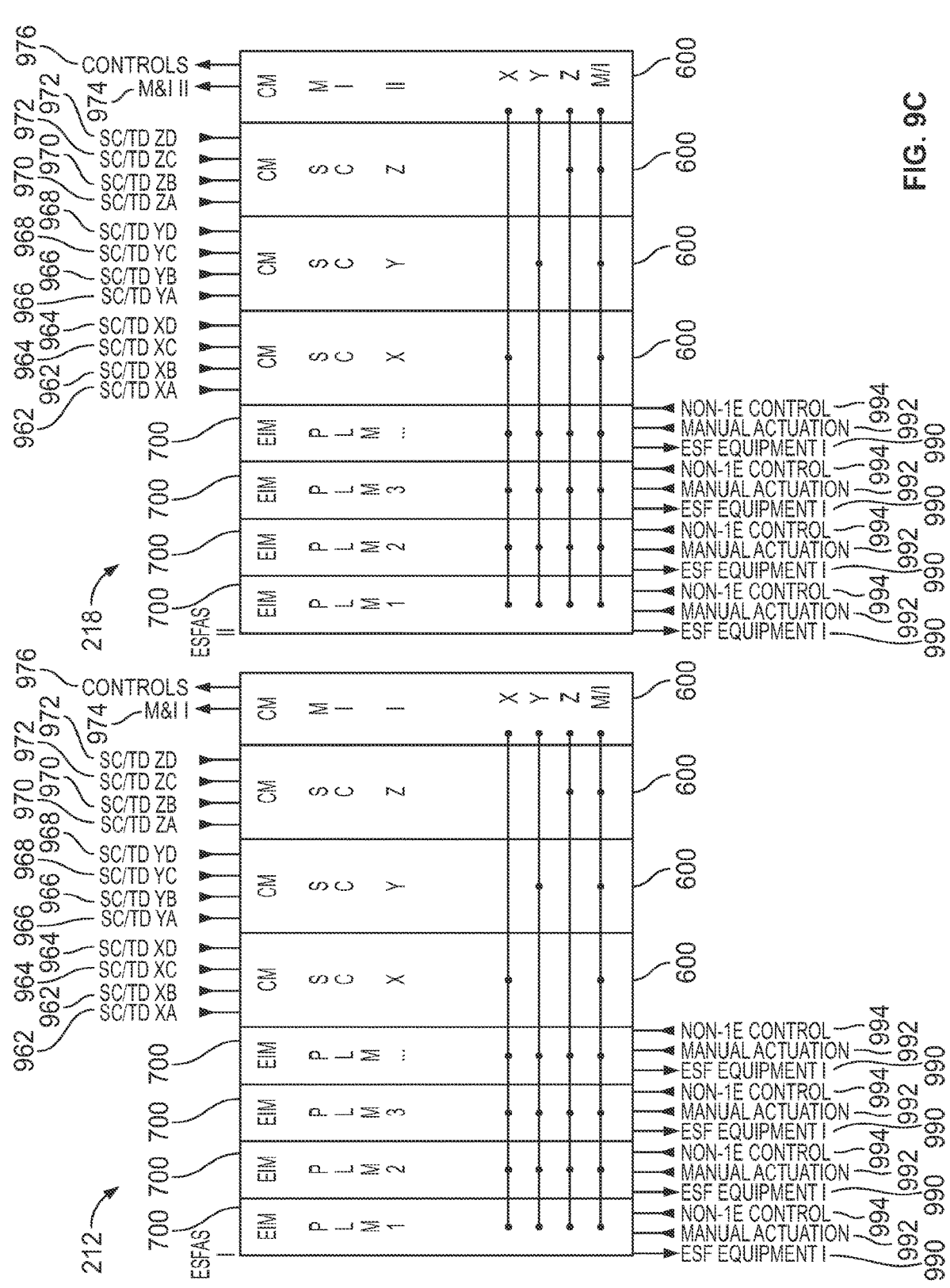

FIGS. 9A-9C illustrate block diagrams of separation group-, RTS-, and ESFAS-level interconnects that utilize one or more of the SFM 500, CM 600, and EIM 700. Generally, the modules SFM 500, CM 600, and EIM 700 may be arranged within the MPS 200, for example, as functionally independent modules (e.g., an assembly of interconnected components that constitutes an identifiable device, instrument, or piece of equipment, and can be disconnected, removed as a unit, and replaced with a spare, with definable performance characteristics that permit it to be tested as a unit) that provide for protection against a single failure (e.g., hardware, software, or otherwise) from propagating to adjacent or other safety functions. The modules may provide for up to triple redundancy, in some implementations, for trip sensing and determination. The modules may also be arranged to provide for redundant RTS and ESFAS voting divisions, as described above. In some implementations, the modules may provide for independent trip voting modules per trip component (e.g., breaker, sensor, or otherwise).

In some cases, the modules provide for RTS voting while in other cases, the modules provide for ESFAS voting. With respect to the independence of each module, each module may make a determination for a particular trip component, separately from every other module dedicated to the particular trip component, to activate or not activate an RTS/ESFAS trip. In some implementations, determination of a valid communication of a trip determination may be made by majority (e.g., two out of three). In some implementations, the determinations may be made in a double voting scheme, in which a communication of a trip determination is validated by majority decision (e.g., two of three) and a secondary trip determination vote is by less than a majority vote (e.g., two of four).

Turning to FIG. 9A, an example separation group-level interconnect 900 is illustrated. The illustrated channel-level interconnect 900 includes: channel sensor inputs 902, SFMs 500 that receive the inputs 902, and CMs 600 that communicate outputs 904 through 920. As shown, to implement a single function or single set of functions, each SFM 500 in the channel-level interconnect 900 can contain four inputs 902, or more in some instances, in any combination of analog and digital. Each input 902 may be unique to a particular SFM 500 (e.g., a Channel A pressurizer pressure signal is a direct input to only one SFM 500). Input data along with status information (e.g., alarms, logic determination, module status) may be available on all four data buses.

The safety buses may be functionally independent and each use a master-slave protocol where the master is the CM 600. Although the blocks within a SFM operate synchronously, communication between modules may be asynchronous. When a CM 600 for a bus requests information from a particular SFM 500, the SFM 500 may respond with a broadcast to the bus. The benefit of the broadcast is that if, for example, the SFM 500 labeled "1" has information needed by the SFM 500 labeled "2" (e.g., permissive signal, sensor input value), then the SFM 500 "2" can listen and obtain the needed information.

In addition to the three safety data buses (e.g., labeled "X," "Y", and "Z"), there is a fourth illustrated communication bus for the Monitoring and Indication (M/I). The master of M/I bus may be the CM 600 dedicated to providing M/I data to safety gateways and non-safety control systems. Unlike the CM 600 for the three safety data buses (e.g., busses X, Y, and Z), the M/I CM 600 may be able to listen to broadcast information on all three safety buses.

In some implementations, a restricted communication block (RCB) of a CM 600 can have various point-to-point configurations. At the separation group-level interconnect 900, all four communication ports on the RCB may be configured for transmit only. Data from each safety data bus CM 600 (e.g., CMs 600 labeled X, Y, and Z) may be sent to each division of an RTS and ESFAS (e.g., divisions I and II). Data (e.g., outputs 916-920) from the M/I CM 600 may be sent to safety gateways and to non-safety control systems.

The outputs 904-914 may be provided, for example, to RTS- and ESFAS level interconnects (described below). For example, as illustrated, outputs 904, 908, and 912 may be provided to ESFAS-level interconnects, while outputs 906, 910, and 914 may be provided to RTS-level interconnects. Although only one separation group-level interconnect 900 is shown in FIG. 9A, there may be multiple interconnects 900 within an MPS structure.

Turning to FIG. 9B, an example RTS-level interconnect, split by division, is shown. RTS-level interconnects, as shown, include Division I and II of RTS (e.g., RTS voting 214 and 216). Each illustrated Division (214 and 216) includes four CM 600 and four EIM 700. For each Division, each of the three safety data buses (labeled X, Y, and Z) may receive a trip or no trip determination from all four separation groups, shown as inputs 962-972 (e.g., with separation groups labeled with the same numeral, i.e., A1 and B1). A fourth CM 600 may be provided, as shown, to transmit data (as outputs 974-976) to non-safety control systems and a safety gateway.

Each communication port on the RCB for each safety bus CM 600 may be configured for "Receive Only" and optically isolated (as described above). The M/I CM 600 may have all ports in the RCB configured to "Transmit Only."

In some implementations, trip determination for each safety data bus from all separation groups is available to each of the four EIMs 700. The EIMs 700 may use all three safety buses (labeled X, Y, and Z) to ensure there is no spurious actuation of breakers due to communication errors. When at least two of the four separation groups (inputs 962-972) indicate a trip condition, reactor trip breakers are opened. Each EIM 700 may be dedicated, for example, to a reactor trip breaker's undervoltage relay and shunt trip coil. In addition to automatic actuation, the EIM 600 will have input for a manual division-level reactor trip 978, breaker feedback, and ESFAS feedback.

The EIM 600 outputs (labeled 980a-980d for Division I and 982a-982d for Division II) may be coupled to inputs for trip coils for reactor trip breakers (RTB) (shown in FIG. 2B) associated with a particular division.

Turning to FIG. 9C, an example ESFAS-level interconnect, split by division, is shown. ESFAS-level interconnects, as shown, include Division I and II of ESFAS (e.g., ESFAS voting 212 and 218). Each illustrated Division (212 and 218) includes four CM 600 and four EIM 700. For each Division, each of the three safety data buses (labeled X, Y, and Z) receives ESF actuation determination from all separation groups (four in this example, labeled-D), which are labeled as inputs 962-972.

Each communication port in the RCB for each safety data bus CM 600 (labeled X, Y, and Z) may be configured for "Receive Only" and optically isolated (as described above). The M/I CM 600 may have all ports in the RCB configured for "Transmit Only" and optically isolated as well.

In some implementations, ESF actuation determination from all separation groups is available to the EIMs 700 on all three safety data buses (labeled X, Y, and Z). For example, the EIMs 700 may use all three safety data buses to ensure there is no spurious actuation of equipment caused by communication errors. When at least two of the four separation groups indicate a need for ESF actuation (e.g., on inputs 962-972) the safety function(s) may be initiated through outputs 990 (which are coupled to ESF equipment 224 and 226, based on division, as shown in FIG. 3B). In some aspects, each EIM 700 can be dedicated to an individual component (e.g., a single ESF component).

Aside from automatic initiation, each EIM 700 can use manual inputs 992 to control the component. Further, each EIM 700 may also receive a non-1E control input 994. The non-1E control input 994 (shown also as input 282 in FIG. 3B) may be provided to the EIM 700 for a non-1E to control the 1E safety ESF component on the outputs of the EIM. Component feedback (e.g., limit switches), voting determination, and other available information (e.g., alarms) may be transmitted from an M/I CM 600 as outputs 974-976.

Figure 10:
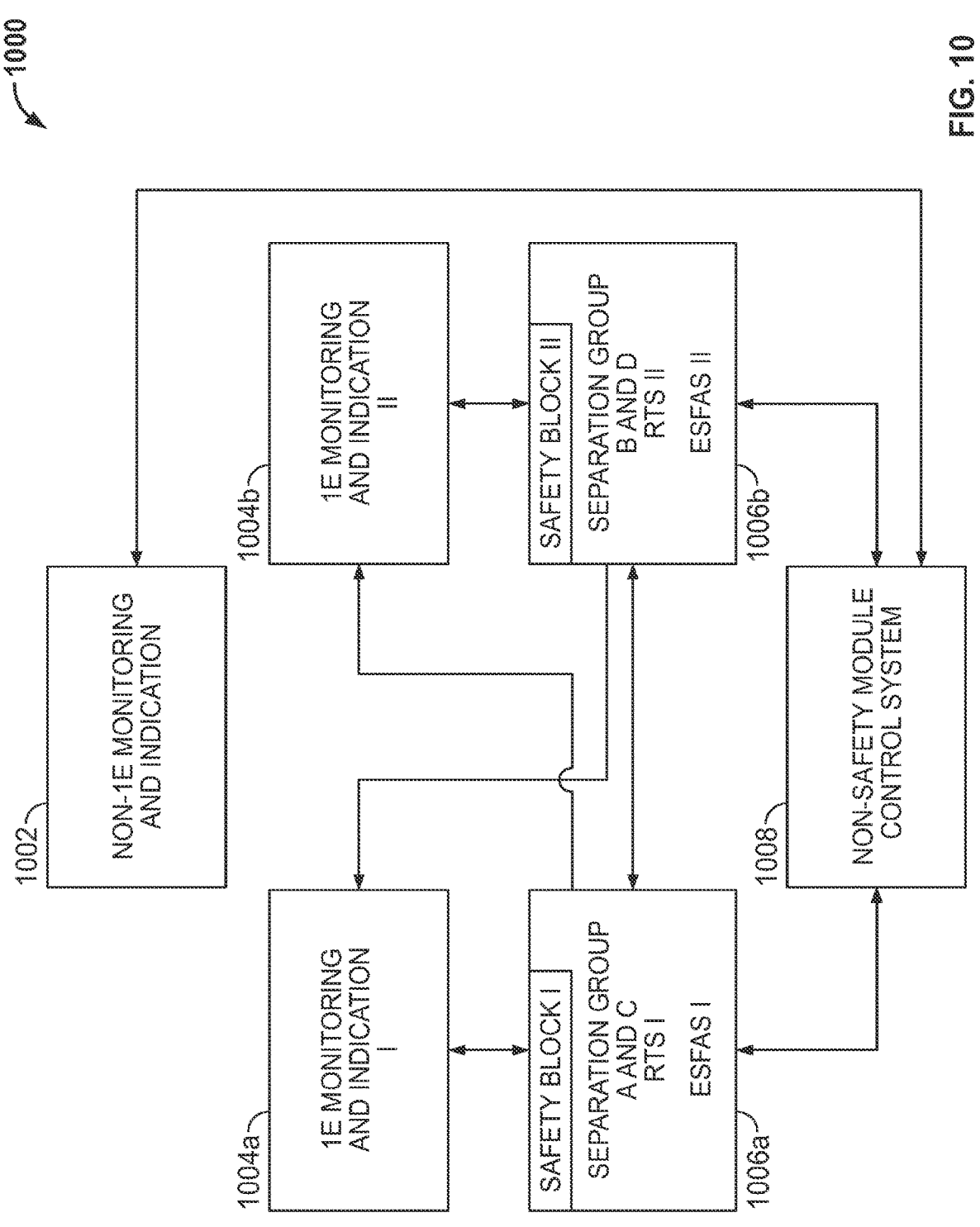
FIG. 10 illustrates a diversity analysis diagram for an MPS of an I&C system for a nuclear power system.

FIG. 10 illustrates a diversity analysis diagram for an I&C system 135 for a nuclear power system. For the purpose of a diversity analysis, the blocks identified in FIG. 10 represent a level of detail that simplifies system examination. Blocks have been selected to represent a physical subset of equipment and software whose internal failures can be assumed not to propagate to other blocks based on their attributes.

As illustrated, blocks in the diagram of FIG. 10 illustrate an I&C system in this example, I&C system 135. Block 1002 represents the non-1E monitoring and indication equipment, block 1004a/b represent 1E monitoring and indication I and II, respectively, blocks 1006a/b represent Safety Blocks I and II, respectively. Block 1006a includes Separation Groups A and C, RTS I, and ESFAS I, while block 1006b includes Separation Groups B and D, RTS II, and ESFAS II. Block 1008 represents the MCS. As illustrated, connection lines with arrows indicate communication between blocks.

One of the purposes for the four echelons is Diversity. For example, the MPS may meet a single failure criterion, which may require the MPS to perform all safety functions required for a design basis event in the presence of: (1) any single detectable failure within the safety systems concurrent with all identifiable but non-detectable failures; (2) all failures caused by the single failure; and (3) all failures and spurious system actions that cause or are caused by a design basis event requiring the safety functions. This requirement may provide increased reliability, but does not preclude the system from being vulnerable to common-cause failures (CCFs). For any design, dependence (e.g., coupling factors) may exist, which distinguish CCFs from multiple independent failures. This leads to two basic forms of preventing common cause failures in a system: either the causal influences are reduced or the system's ability to resist those influences is increased.

Implementation of these two forms can be implemented in six attributes as described above: Design Diversity, Equipment Diversity, Functional Diversity, Human Diversity, Signal Diversity, and Software Diversity. Application of these attributes is examined with respect to each block illustrated in FIG. 10, as well as the attributes between blocks shown in FIG. 10.

Attributes within a Block

As illustrated and also described with reference to earlier figures, separation groups A, B, C, and D, and the two divisions of RTS and ESFAS, are grouped in accordance to the programmable technology on which they are based. Safety Block I and II, together, make up the Module Protection System (MPS) (e.g., MPS 200).

Regarding signal diversity, for a given transient event there may exist at least two safety functions where each is based on measured variable(s) of different physical effects (e.g., pressure, level, temperature, neutron flux). Loss of one safety function does not prevent a block from identifying the need for a protective action.

Regarding software diversity, based on its inputs, each safety function module (SFM 500) is dedicated to a safety function or a group of safety functions. As a result, each SFM has a unique algorithm/logic. Each communication module (CM 600) transmits the same packets of information in a different order, which may require that each communication engine (608/610) in the CM have a different algorithm. Each equipment interface module (EIM 700) may be dedicated to a single component and may result in unique algorithm/logic.

1 E monitoring and indication may be accomplished using two divisions of video display units (VDUs) and physical switches. Each division of 1E monitoring and indication (M/I) may be a block 1004a/b. With respect to design diversity, each division of M/I may provide plant status information on digital displays to the operator and has manual switches to manually initiate, at the division level, any protective action. With respect to signal diversity, the operator may have all measured variables utilized by the MPS to determine if a trip and/or ESF actuation is needed. Although not as fast, the operator may have multiple measured variables of different physical effects to make the same determination as the MPS.

Diversity Attributes Between Blocks

Regarding human diversity, the software of Safety Block I and 1E M/I I may be designed by one design team, with Safety Block II and 1E M/1 II may be designed by a different design team. Additionally, independent verification and validation teams may review the work of each design team to ensure design correctness. The above mentioned design teams are also different from those assigned to the Module Control System (MCS) and the non-1E M/I.

Design diversity is the use of different approaches including both software and hardware to solve the same or similar problem. To limit the potential and the consequences of a CCF, Safety Block I 1004a and 1E M/I I block 1006a may use a different programmable technology than Safety Block II and 1E M/I II. MCS and Non-1E M/I may also have a different programmable technology. Along with other attributes discussed below, different hardware designs may have different failure modes and, thus, reduce the possibility of a CCF affecting more than one block. For example, except for M/I blocks, blocks may be physically separated into different rooms. This is intended to further reduce coupling factors that could create the condition for multiple components to be involved in a CCF event.

Software diversity is a subset of design diversity and may include the use of different programs designed and implemented by different development groups with different key personnel to accomplish the same safety goals. Due to the design diversity discussed above, the different design teams may use different design tools and, thus, the tools may not introduce the same failure modes.

Functional diversity may be introduced by having different purposes and functions between blocks. Safety Block I and II form the MPS. These blocks may initiate a reactor trip if operating limits are exceeded and initiate ESF to mitigate a postulated accident. The Mu blocks may allow for an operator to monitor and control both safety and non-safety systems. The operator can maintain a plant within operating limits or initiate necessary protective actions. MCS provides automatic control of systems to maintain the plant within operating limits including constraining certain operational transients.

Between blocks, signal diversity may be provided by having automatic and manual means of actuation equipment and protective actions. The MCS and Non-1E Mu provide control at the equipment level while the 1E M/I blocks provide control at the division level.

Equipment diversity is the use of different equipment to perform similar safety functions. Initiation of protective actions can be done by operator actions using switches or performed automatically by Safety Block I or II. Between Safety Block I and II, different programmable technology may be used, which may require different internal subcomponents and different manufacturing methods.

Another analysis guideline of the four echelons is System Failure types. Type 1 failures are those where protective actions fail to occur for plant transients initiated by control systems errors because of interactions between echelons of defense. Typically, this is associated with failure of a common sensor or signal source. Several of the plant parameters monitored by the MPS are provided to the MCS for normal plant control. As described above, instead of providing one signal source, all four separation groups and both divisions of ESFAS and RTS provide information through isolated one-way communications. This may allow for MCS to use different methods (e.g., median signal select) of selecting which redundant and independent signal source to use.

Type 2 failures may not directly cause a transient and are those where protective equipment may not respond to a plant transient because of an undetected failure. Using the attributes within and between Safety Block I and II, sufficient diversity may exist to prevent an undetected failure or a CCF from affecting more than one block. With only one of two blocks needed to automatically initiate the protective action, Type 2 failures may be mitigated by the MPS (Safety Block I and II) without any additional systems.

Type 3 failures are those where primary sensors relied on to detect design basis events produce anomalous readings. Signal diversity may exist within safety blocks by providing at least two safety functions, each based on different measured parameters, for any transient event. If all four separation groups of sensors for a given safety function provide anomalous readings, there may be two possible adverse scenarios for a Type 3 failure: 1) anomalous readings indicate that no trip or ESF actuation is needed when limits have actually been exceeded; and 2) anomalous readings indicate that a trip or ESF actuation is needed even though limits have not been exceeded (e.g., spurious trip or ESF actuation). In the first scenario, a Type 3 failure concurrent with a CCF within the safety blocks may not prevent initiation of the necessary protective action(s). As mentioned before, signal diversity may allow for a separate safety function to be available for mitigating a transient event. A CCF within MPS is limited to one of the two safety blocks and is assumed to either prevent initiation of protection action or prevent initiation with false indication. For example, as discussed above, a two out of four coincident logic may be used for all trip and ESF actuation, which means that two out of the four separation groups, for the unaffected safety function on the unaffected safety block, indicate a need for trip or ESF actuation and provide positive indication to the operator of action performed.

In the second scenario, the Type 3 failure concurrent with a CCF within the safety blocks, results in a spurious trip or ESF actuation with 1E M/I blocks indicating either one positive and one false indication of a successful actuation or one positive and one with no indication of actuation. In either case, it may take an operator longer to evaluate and correct the spurious actuation, but ability to re-align components as necessary is provided by both 1E and non-1E controls that would not be affected by the same CCF. A spurious ESF actuation may be considered the most limiting event in this scenario.

Figure 11:
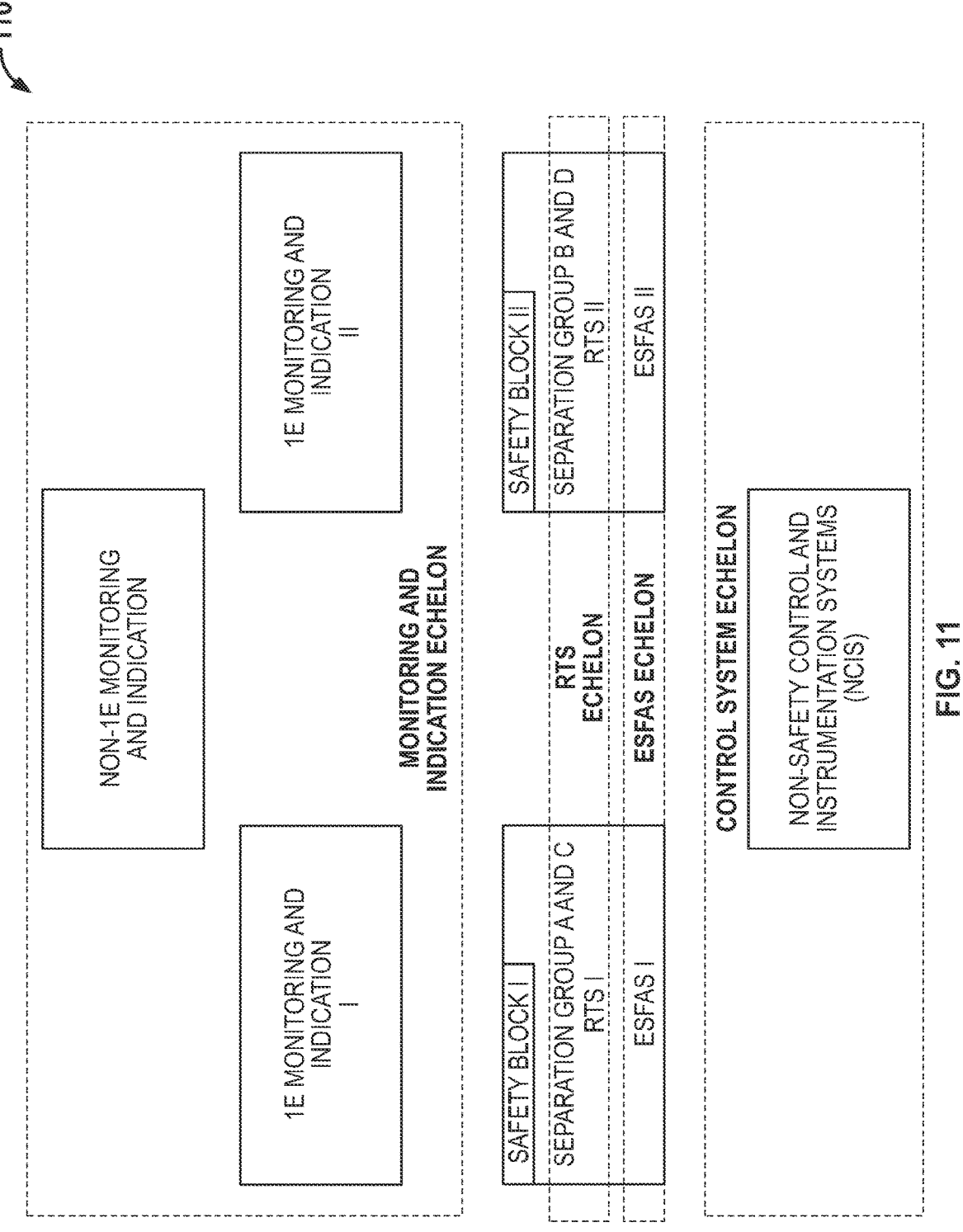
FIG. 11 illustrates a block diagram of an example separation of MPS blocks into the four echelons of defense.

Another analysis guideline is the Echelon Requirement. In order to provide blocks representing a level of detail that simplifies system examination, the four conceptual echelons of defense are not only combined (e.g., RTS and ESFAS) in some blocks but are also divided into separate blocks (e.g., Safety Block I and II, 1E M/I I and II). In some aspects, separation groups, RTS, and ESFAS are grouped into safety blocks according to the programmable technology on which they are based. For example, each half of MPS (e.g., two of four separation groups, one of two divisions of ESFAS, and one of two divisions of RTS) or one safety block may have sufficient diversity attributes. Different design teams (human diversity) utilizing different programmable digital hardware based on different programmable technology (design and equipment diversity) which requires the use of different design tools (software diversity). The Mu echelons may also be split into separate blocks. The 1E M/I blocks may be split to identify that they have similar diversity attributes as safety blocks. How the chosen blocks fall into the four echelons of defense is illustrated FIG. 11, which shows diagram 1100.

Another analysis guideline is the Method of Evaluation. Blocks chosen in should be considered as "black boxes," so that any credible failure required to be postulated produces the most detrimental consequence when analyzed in accordance with the Output Signals guideline (discussed below). In some aspects, the failure of a system to actuate might not be the worst case failure, particularly when analyzing the time required to identifying and responding to conditions resulting from a CCF in an automated safety system. Blocks will be evaluated based on a hardware CCF and software CCF. For each CCF, the block may be evaluated to have three possible outputs which may produce the most detrimental consequences: 1) fail-as-is with false indication or no action when required, 2) spurious initiation of function(s) with indication of successful actuation, and 3) spurious initiation of function(s) without indication of successful actuation. The EIMs within any of the safety blocks may not be considered to be vulnerable to software CCFs. For example, the EIM may be a priority logic module dedicated to a single ESF component or reactor trip breaker and interfaces with manual and automatic controls. Use of finite-state machines may allow for exhaustive testing of the functionality; including all possible inputs, device states, and outputs of the state machine. Based on its testability, EIM diversity attributes, and being dedicated to a single component, the EIM may be sufficiently simple that consideration of software based or software logic based CCF is not required.

Another analysis guideline is the Postulated Common-Cause Failure of Blocks. The 1E M/I blocks involve a combination of video display units (digital hardware) and manual controls (non-digital hardware). The VDUs may be designed for indication only and do not have the capability to control equipment. The manual controls in each 1 E M/I block 1004a/b provide the operator the ability to initiate, at the division level, any protective action that is automatically performed by Safety Block I or II. With the indication and manual control being, in some examples, different hardware (e.g., digital vs. open/close contact switches), a CCF can be assumed to affect one or the other, but not both. For both a software and hardware CCF, a fail-as-is condition results in one division of operator displays indicating false safe operating conditions or failure of one division of manual switches. The VDUs may have little or no control capabilities so they may not provide spurious actuation; however, with a software CCF the VDUs may provide false indication of a successful actuation or provide incorrect plant conditions requiring an operator to initiate spurious protective actions.

For the exception of the EIM, modules within a safety block are postulated to have a software CCF. Due to the diversity attributes within a safety block, a software CCF may be limited to a CM or function(s) on an SFM. A software CCF within a safety block that prevents a SFM from making a proper trip determination may be mitigated by equipment, signal, and software diversity within that block. For each transient event, the primary and backup safety functions required to mitigate the event may be implemented on separate safety functions using different logic/algorithm based on measured parameters of different physical effects. With the implementation of triple module redundancy and each data bus transmitting the same information in a different manner, a CM with software CCF may not spuriously initiate or prevent initiation of a protective action. As a result, the most detrimental scenario may be a software CCF in an SFM that results in spurious actuation of an ESFAS function.

A hardware CCF within a safety block may be postulated to be a complete failure of the block to detect and initiate the necessary protective actions. A hardware CCF that results in spurious actuation of ESF functions may have the same affects as a spurious actuation due to software CCF and, thus, may not be considered again for hardware CCF.

Non-1E M/I includes controls for safety and non-safety equipment. The VDUs for non-1E are diverse from those used by 1E M/I. Since non-1E M/I is used for normal day-to-day operations, any spurious actuations induced by a software or hardware CCF within non-1E M/I subsystem (e.g., turbine controls, feedwater control) may be immediately identifiable and, if exceeding operating limits, may be mitigated by the MPS (Safety Blocks I and II). The postulated failures for non-1E are failing in an as-is condition with 1) spurious actuation of a subsystem's components with and without indication of successful actuation and 2) indication of successful actuation when no equipment was actually actuated.

MCS encompasses the non-safety systems relied on to maintain day-to-day plant operations within operating limits including constraining certain operational transients. As such, any failures of subsystems (e.g., rod control) may be immediately detected by an operator. Similar to non-1E M/I, the postulated software and hardware CCF for MCS results in a fail as-is condition with 1) spurious actuation of a subsystem's components with and without indication of successful actuation and 2) providing indication of successful actuation when no equipment was actually actuated.

Another analysis guideline is the Use of Identical Hardware and Software Modules. Here, the diversity between blocks provides the basis for not considering blocks to be identical. Based on this, a postulated CCF may be limited to a single block.

Another analysis guideline is the Effect of Other Blocks. All blocks are assumed to function correctly in response to inputs that are correct or incorrect. Each block is considered to be independent and unaffected by a postulated CCF in another block.

Another analysis guideline is Output Signals. In some aspects, the I&C architecture may prevent errors from propagating backwards into the output of a previous block. All information from Safety Block I and II to 1E M/I may be sent through optically-isolated transmit-only communication engines (as shown in CM 600). Signals from 1E M/I to safety blocks may be open/close contacts from manual switches whose position or contact state cannot be changed by a CCF in safety blocks. The communication between safety blocks may be data sent from separation group A and C to Division II of ESFAS and RTS, and separation group B and D to Division I of ESFAS and RTS. The four separation groups are independent and redundant; however, for illustrative purposes of FIG. 10, the separation groups are grouped into safety blocks according to the programmable technology it uses. Similar to communication between safety blocks and 1E M/I, communication from separation groups to any division of RTS and ESFAS may be through optically isolated transmit-only communication engines. Non-safety inputs to safety blocks may be to the ESFAS EIMs, which may be limited to isolated open/close contacts.

All inputs from safety blocks may be from optically isolated transmit-only communication engines. This may prevent any error in 1E M/I from propagating backwards to the safety blocks.

Another analysis guideline is Diversity for Anticipated Operational Occurrences. A single CCF or a Type 2 failure in conjunction with a transient event may not prevent the MPS from performing its safety function. Safety Block I and II, which together make up the MPS, may be chosen to limit a CCF to one block. Traditionally, nuclear plants have relied on a Diverse Actuation System (DAS) or Anticipated Transient without Scram (ATWS) System to provide a diverse method of initiating functions if the MPS was disabled by a CCF. But in the illustrated MPS design, sufficient diversity may exist within the system to initiate safety functions even with a single CCF. Here, the MPS is split into Safety Block I and II (e.g., 1006a/b). A postulated software or hardware CCF would be limited to one safety block. Each block uses different design teams (human diversity) utilizing different programmable digital hardware based on different programmable technology (design and equipment diversity), which may require the use of different design tools (software diversity). Within either block, there may exist at least two safety functions based on measured variable(s) of different physical effects that are implemented on separate SFMs. All logic may be implemented in finite-state machines and all safety data may be communicated in a deterministic manner. Due to these attributes, even a Type 3 failure in conjunction with a CCF may not prevent the MPS from initiating the necessary protective action.

Another analysis guideline is Diversity for Accidents. Similar to AOO, postulated accidents in conjunction with a CCF error within MPS may not prevent MPS from performing its safety function.

Another analysis guideline is Manual Operator Action. Manual division-level actuations of protective actions performed by the MPS may be provided to the operator. Manual component-level controls are provided to the operator using non-1E M/I if permitted by 1E M/I.

Figure 12:
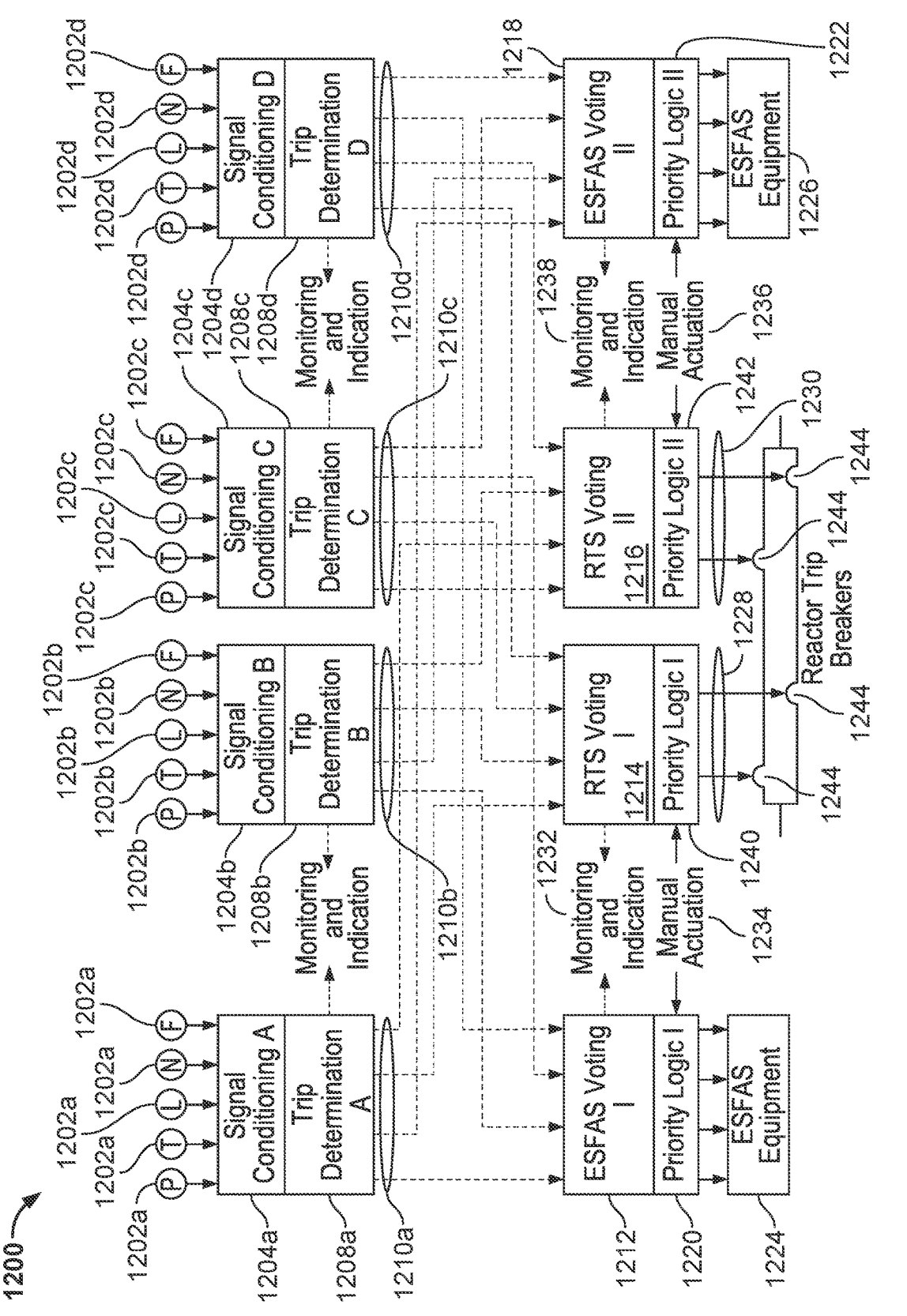
FIG. 12 illustrates a schematic of another example implementation of an MPS safety architecture of a nuclear power system.

FIG. 12 illustrates a schematic of another example implementation of an MPS 1200 safety architecture of a nuclear power system. In some implementations, the MPS 1200 may be similar or identical to the MPS 200 shown in FIGS. 2A and 2B. Generally, the illustrated MPS 1200 includes four separation groups of sensors and detectors (e.g., sensors 1202a-1202d); four separation groups of signal conditioning and signal conditioners (e.g., signal conditioners 1204a-1204d); four separation groups of trip determination (e.g., trip determinations 1208a-1208d); two divisions of RTS voting and reactor trip breakers (e.g., division I RTS voting 1214, and division II RTS voting 1216); and two divisions of engineered safety features actuation system (ESFAS) voting and engineered safety features (ESF) equipment (e.g., division I ESFAS voting 1212 and ESF equipment 1224, and division II ESFAS voting 1218 and ESF equipment 1226).

Generally, the sensors 1202a-1202d include process sensors that are responsible for measuring different process parameters such as pressure, temperature, level, fluid flow rate, and neutron flux. Thus, each process parameter of the nuclear power system 150 is measured using different sensors, and is processed by different algorithms, which are executed by different logic engines. In some aspects, neutron flux sensors are responsible for measuring neutron flux from a reactor core from a shutdown condition up to 120 percent of full power. Three types of neutron flux detectors may be used in the MPS 1200, including source range, intermediate range, and power range.

Generally, the signal conditioners 1204a-1204d receive the measurements from the sensors 1202a-1202d, process the measurements and provide outputs. In some aspects, the interconnections of the sensors 1202a-1202d to the signal conditioners 1204a-1204d may be dedicated copper wires or some other signal transmission method.

Figure 21:
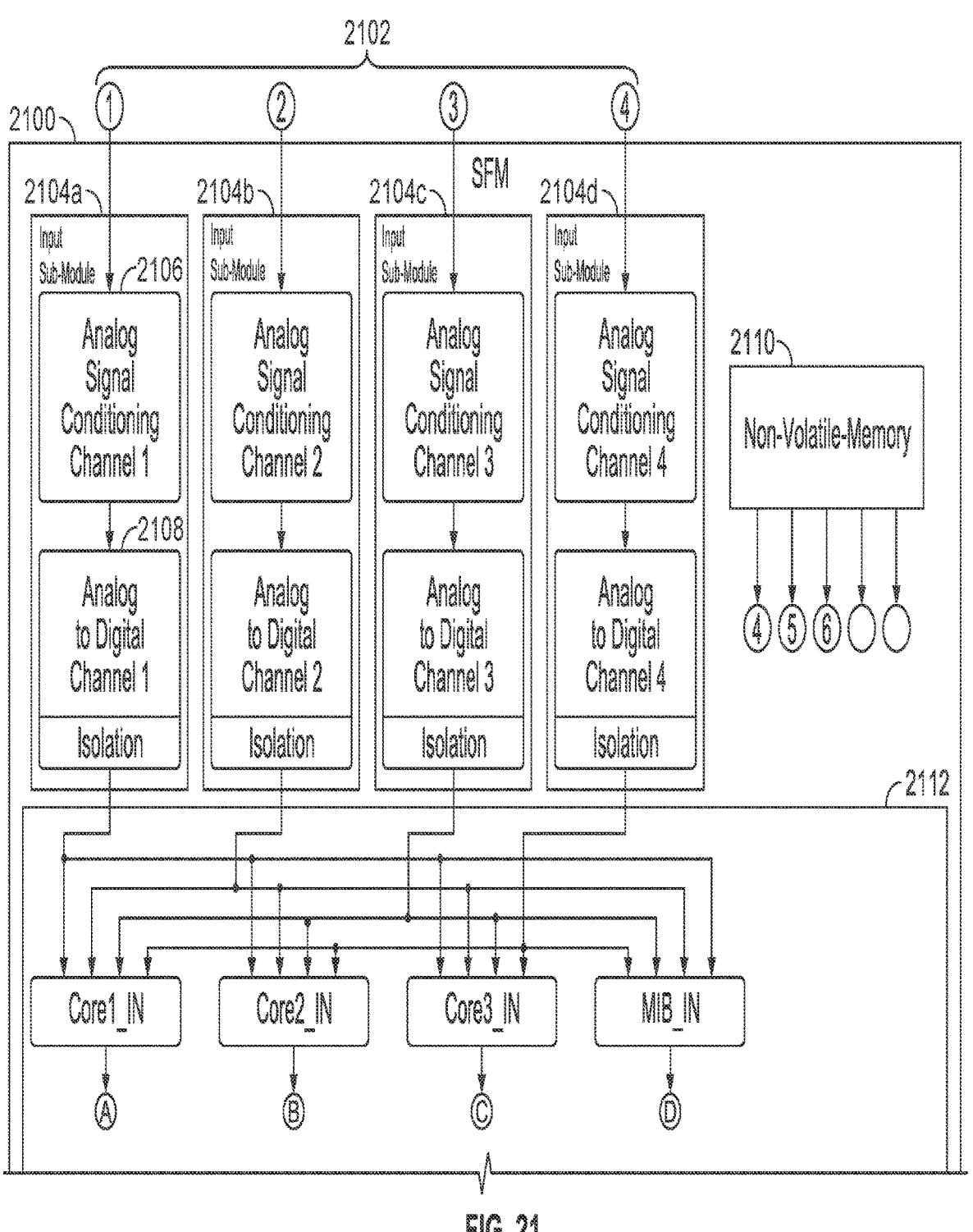
FIG. 21 illustrates a schematic of another example implementation of an SFM.
Figure 21:
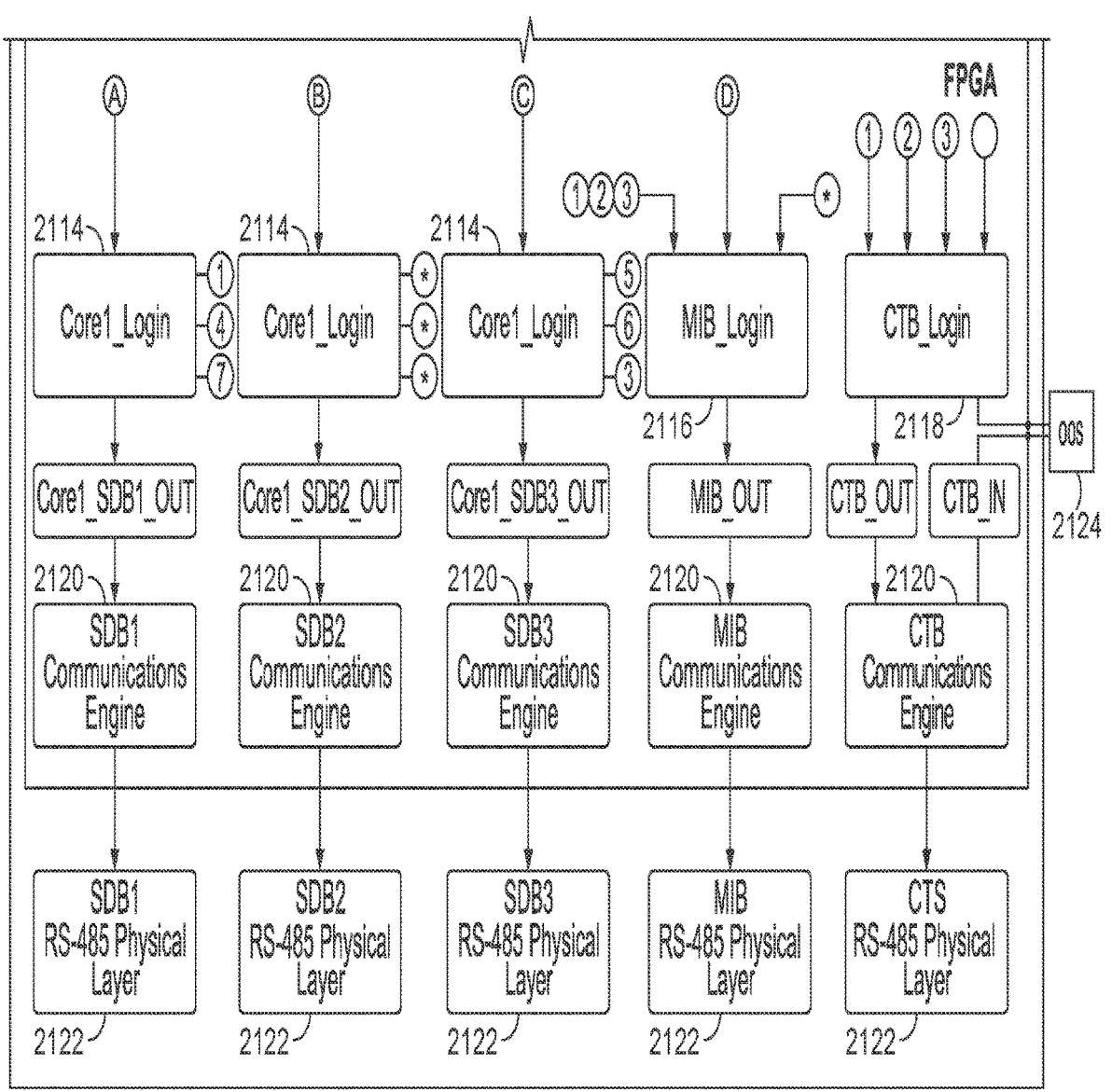
Figure 22:
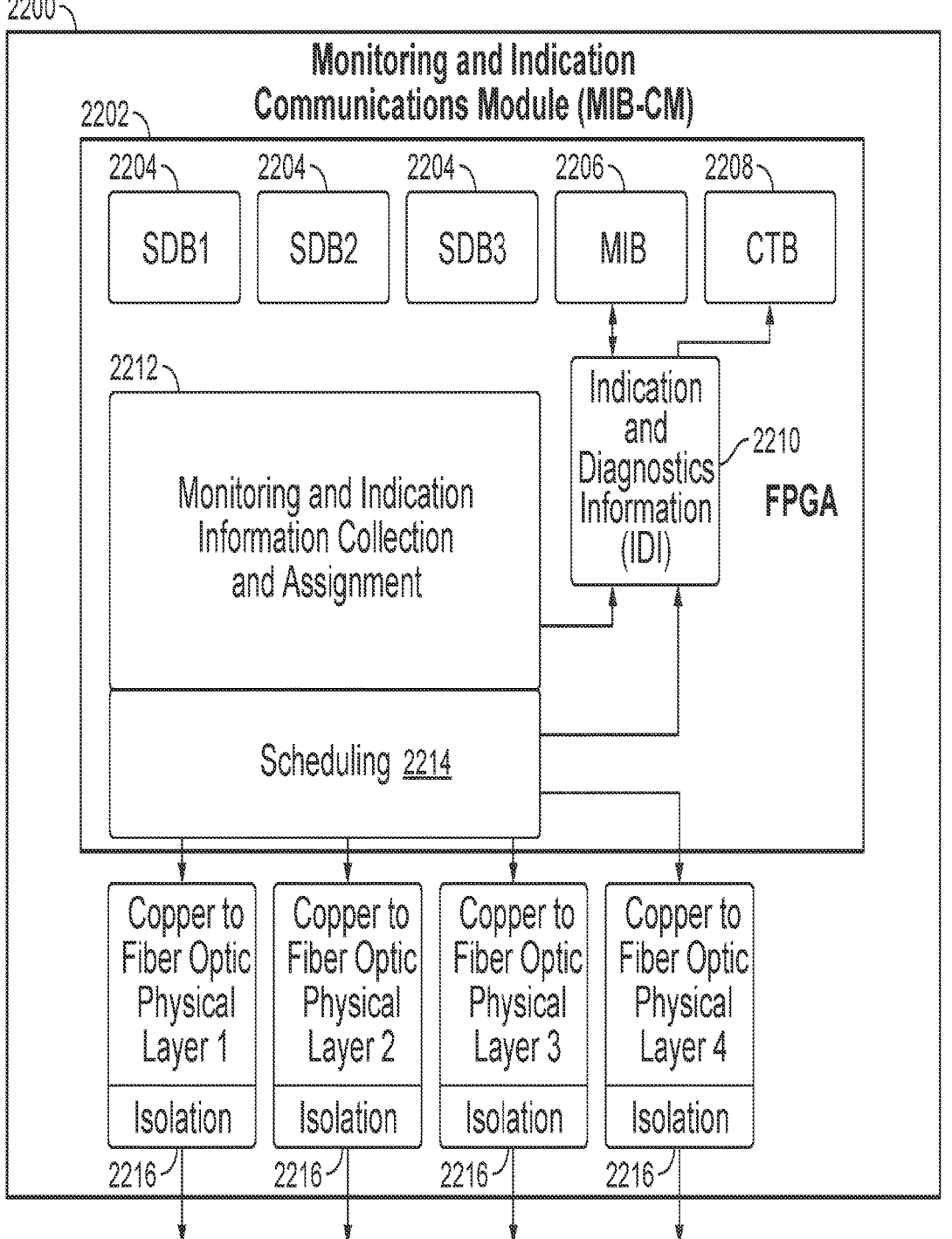
FIG. 22 illustrates a schematic of an example implementation of a monitoring and indication (MIB) communication module of an MPS.
Figure 23:
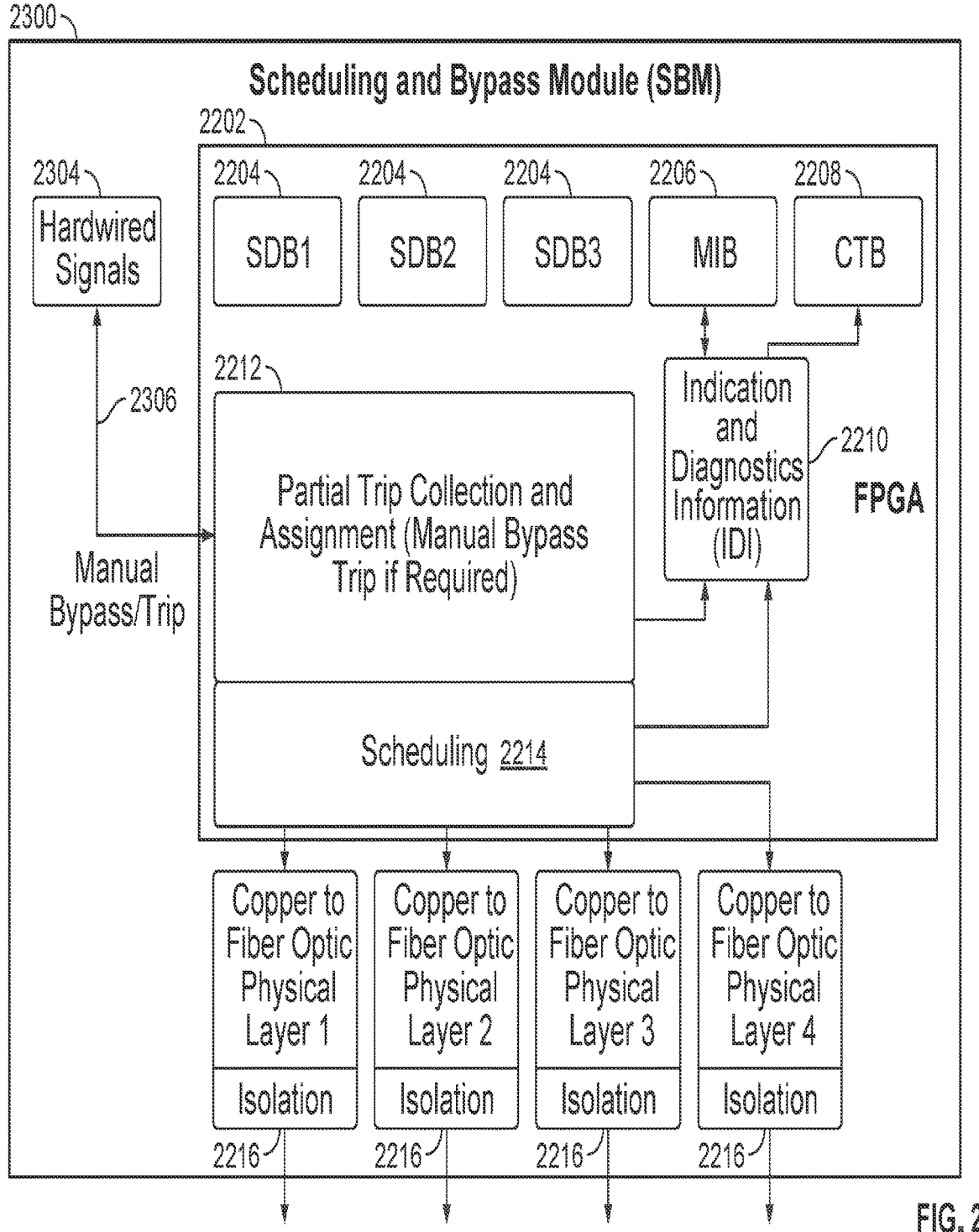
FIG. 23 illustrates a schematic of an example implementation of a scheduling and bypass module (SBM) of an MPS.
Figure 24:
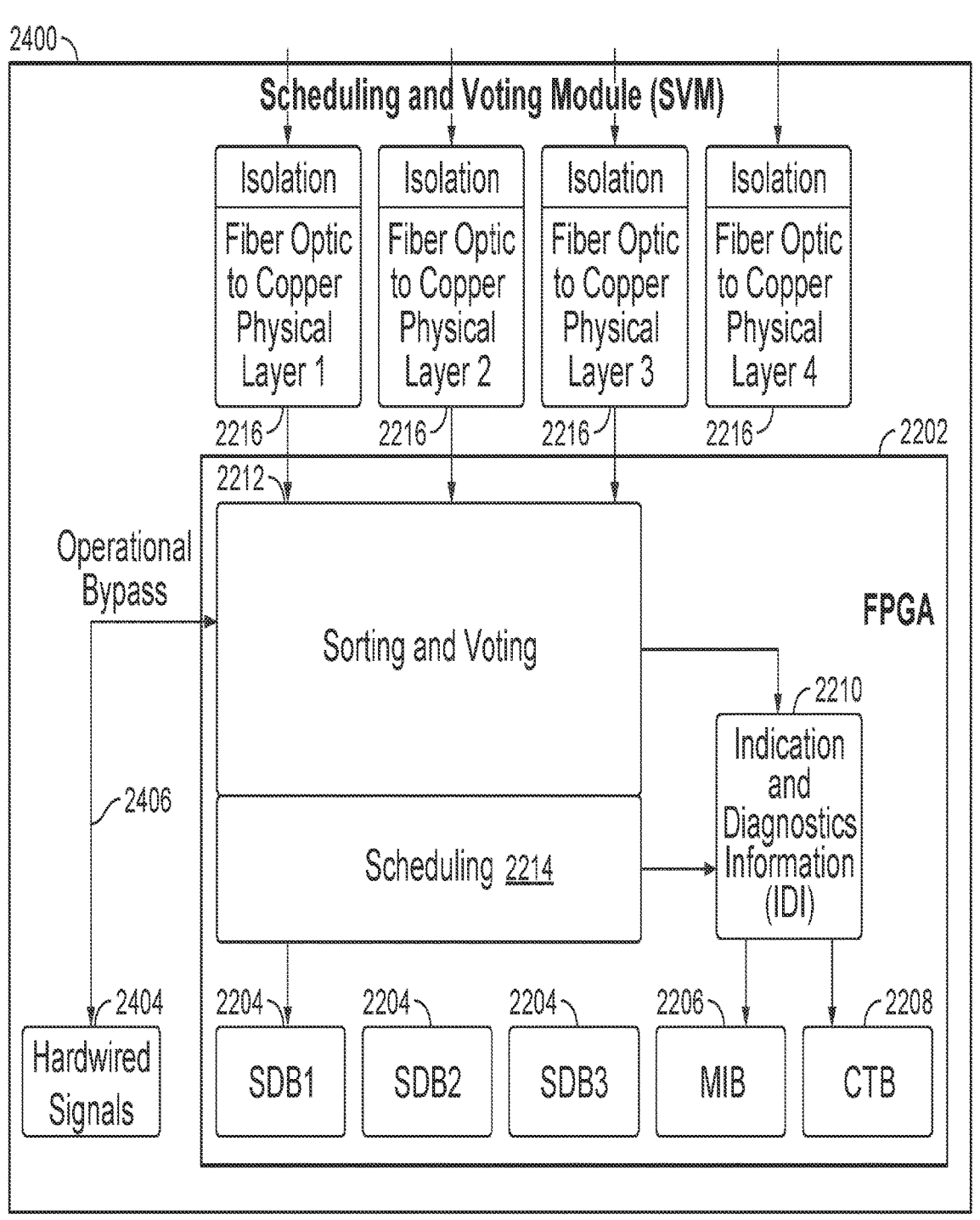
FIG. 24 illustrates a schematic of an example implementation of a scheduling and voting module (SVM) of an MPS.

The signal conditioners 1204a-1204d each may be comprised of multiple input modules 2104a-2104d (e.g., indicating any number of modules depending on the number of sensor inputs), as shown in FIG. 21, that are responsible for conditioning, measuring, filtering, and sampling field inputs from the sensors 1202a-1202d. Each input module 2104a-2104d may be dedicated to a specific input type, such as 24 V or 48 V digital inputs, 4-20 mA analog inputs, 0-10 V analog inputs, resistance thermal detector inputs, or thermocouple inputs.

Each input module 2104a-2104d may be comprised of an analog circuit 2106 and a digital circuit 2108. The analog circuit 2106 is responsible for converting analog voltages or currents into a digital representation. It is also referred to as signal conditioning circuitry. The digital portion 2108 of each input module 2104a-2104d may be located within a logic engine. The logic engine performs all input module control, sample and hold filtering, integrity checks, self-testing, and digital filtering functions. The digital representation of the sensor output is communicated from the signal conditioners 1204a-1204d to the trip determination 1208a-1208d through the outputs using, in some examples, a serial interface. In some implementations, sensor output can be communicated from the sensors 1202a-1202d to a respective signal conditioner 1204a-1204d through any appropriate transmission channel (e.g., fiber optics, copper wire, etc.).

Figure 13:
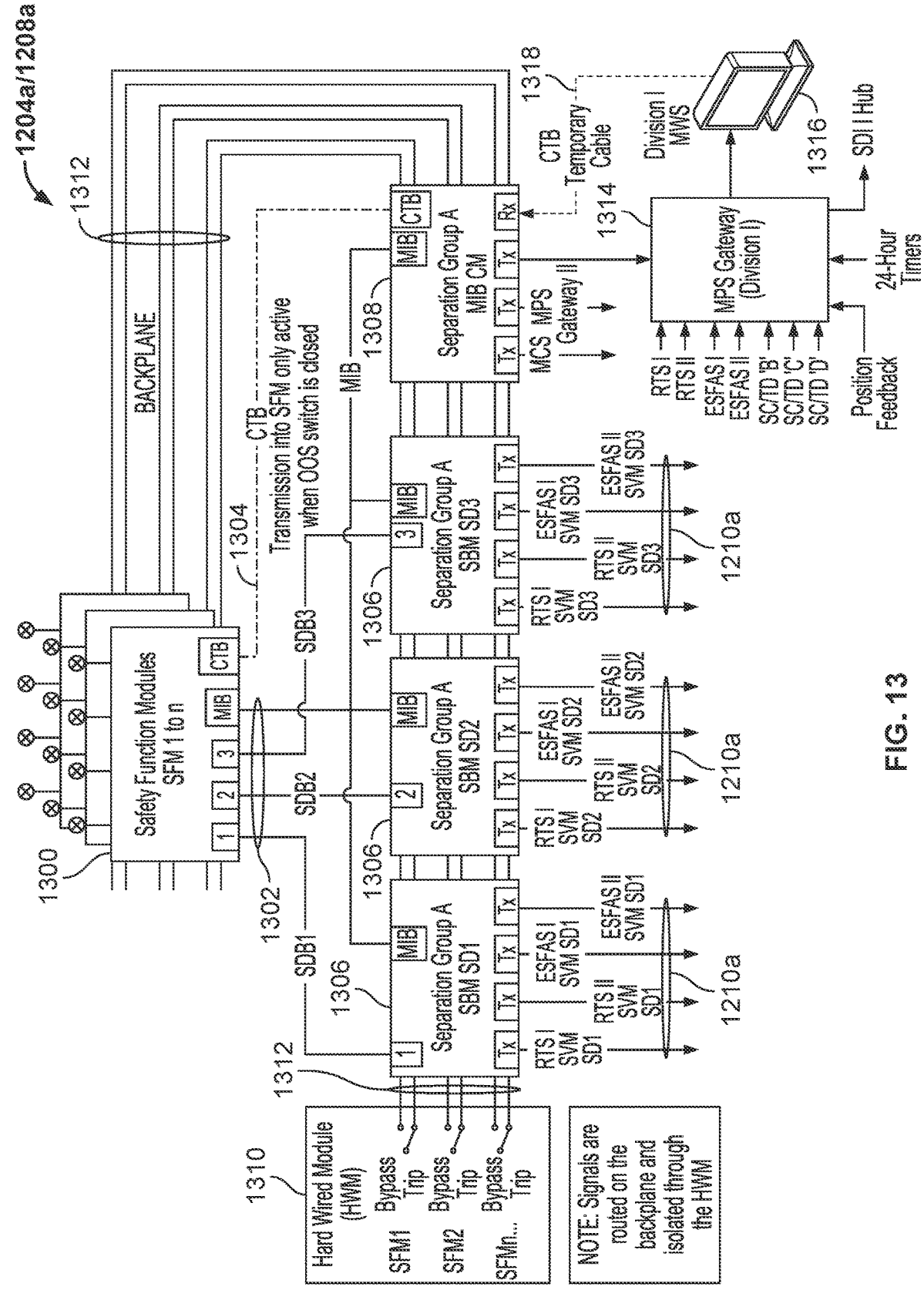
FIG. 13 illustrates a schematic of an example implementation of a separation group communication architecture of an MPS.

FIG. 13 illustrates a schematic of an example implementation of a separation group signal conditioning and trip determination 1204a/1208a (e.g., Separation Group A) communication architecture of MPS 1200. With reference to FIGS. 12 and 13, the trip determinations 1208a-1208d, generally, receive sensor input values in a digital format via a serial interface from the signal conditioners 1204a-1204d as described above. The trip determinations 1208a-1208d are each comprised of independent safety function modules (SFM 1-SFM n) 1300 (described more fully with reference to FIG. 21), where a specific module implements one set of safety functions (e.g., a set may be a single safety function or multiple safety functions related to a particular process parameter). For example, a set of safety functions may consist of a group of functions related to a primary variable, such as a high and low trip from the same pressure input. Each SFM 1300 contains a unique logic engine dedicated to implementing one set of safety functions. This results in a gate level implementation of each set of safety functions being entirely different from all other sets of safety functions.

The sensor input values may be communicated via a deterministic path and are provided to a specific SFM 1300 in each trip determination 1208a-1208d. These input values may then be converted to engineering units to determine what safety function, or a set of safety functions, is implemented on that specific SFM 1300. The trip determinations 1208a-1208d provide these engineering unit values to the control system via, in some examples, an isolated, transmit only, fiber optic connection. More specifically, the trip determination can provide appropriate engineering unit values to the MIB 1208 which provides the values to the control system.

The trip determination 1208a-1208d in each SFMs 1300 in each make a reactor trip determination based, if required, on a predetermined set point, and provides a trip or no-trip demand signal to each RTS division (e.g., the RTS voting 1214 and 1216 in divisions I and II, respectively) via isolated, and in some cases triple-redundant, transmit only, serial connections. The SFMs also make an ESFAS actuation determination, if required, based on a predetermined set point, and provides an actuate or do-not-actuate demand signal to each ESFAS division (e.g., the ESFAS voting 1212 and 1218 in divisions I and II, respectively) via isolated, in some cases, triple-redundant, transmit only, serial connections.

As shown in FIG. 13, for instance, a particular trip determination SFM 1300 provides a trip or no-trip demand signal to ESFAS voting 1212/1218 through the scheduling and bypass modules (SBMs) 1306. The trip determination SFM 1300 provides a trip or no-trip demand signal to RTS voting 1214/1216 through the scheduling and bypass modules (SBMs) 1306. The outputs of SBMs 1306 are also generally shown in FIG. 12 as outputs 1210a-1210d from the trip determinations 1208a-1208d, respectively.

Returning to FIG. 12, each RTS division (e.g., RTS voting 1214 for division I and RTS voting 1216 for division II) receives inputs 1210a-1210d from the trip determinations 1208a-1208d (separation groups A, B, C, and D) as described above via isolated, and in some aspects redundant (e.g., double, triple, or otherwise), receive only, serial connections, fiber optic or other connections. RTS voting and logic are arranged, in the example implementation, so that no single failure can prevent a safeguards actuation when required, and no single failure in a trip determination signal (e.g., 1210a-1210d) can generate an unnecessary safeguards actuation. The RTS system may provide both automatic and manual initiation of critical systems, such as the emergency core cooling system and the decay heat removal system.

The trip inputs are combined in the RTS voting logic so that two or more reactor trip inputs from the trip determinations 1208a-1208d produce an automatic reactor trip output signal on outputs 1228 and 1230 (as appropriate for each division) that actuates the trip coils for a reactor trip breaker (RTB) 1244 associated with the respective division.

ESFAS voting and logic are arranged, in the example implementation, so that no single failure can prevent a safeguards actuation when required, and no single failure in a trip determination signal (e.g., 1210a-1210d) can generate an unnecessary safeguards actuation. The ESFAS system may provide both automatic and manual initiation of critical systems, such as the emergency core cooling system and the decay heat removal system.

Each ESFAS voting 1212/1218 receives inputs 1210a-1210d from the trip determinations 1208a-1208d (separation groups A, B, C, and D) as described above via isolated, and in some aspects redundant (e.g., double, triple, or otherwise), receive only, fiber optic connections. Actuation logic and voting occur within the ESFAS voting 1212/1218. When the ESFAS voting 1212/1218 determine an actuation is required, the ESFAS voting 1212/1218 sends an actuation demand signal to ESFAS priority logic 1220/1222, respectively, which actuates appropriate ESF equipment 1224 and 1226.

Figure 14:
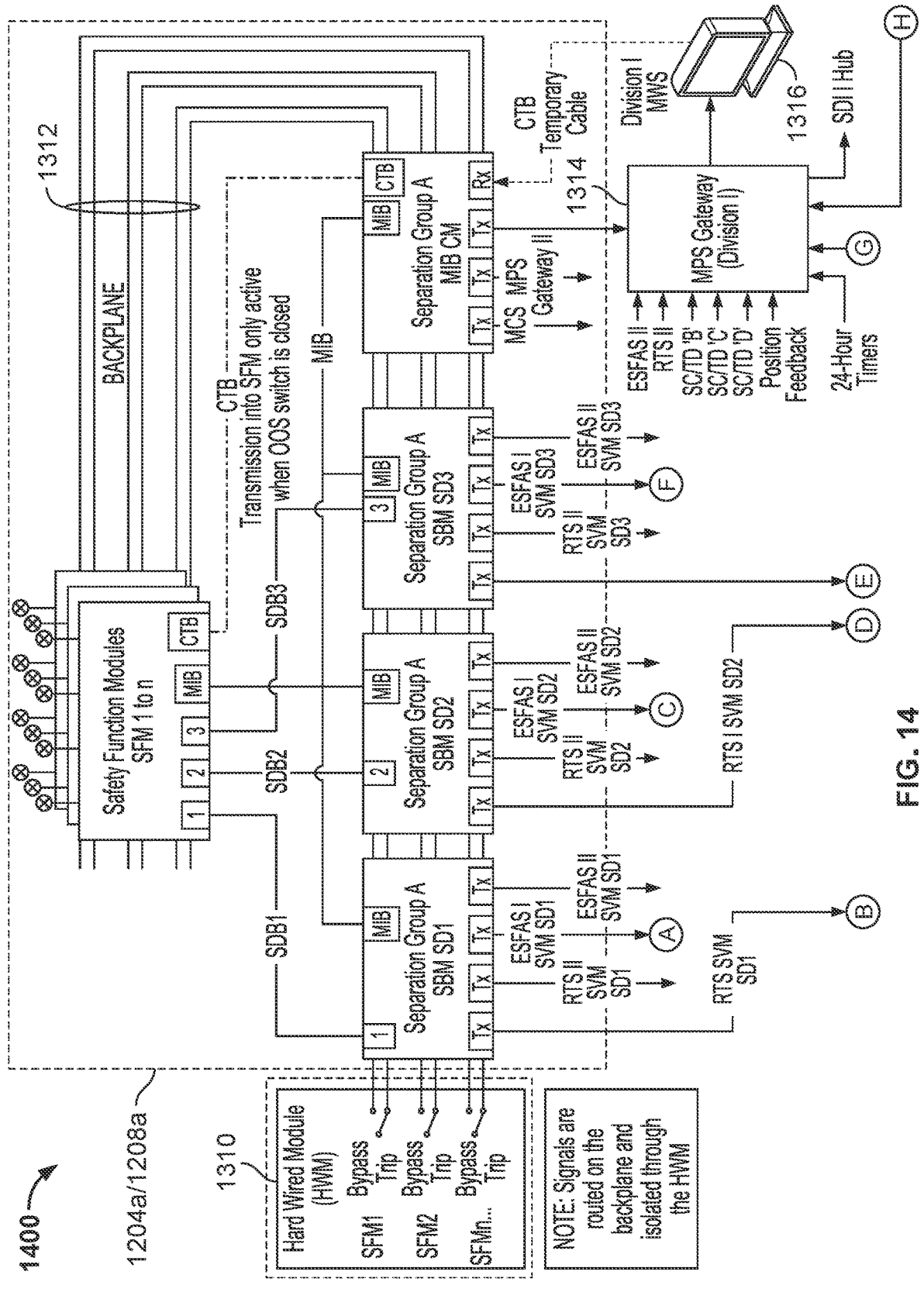
FIG. 14 illustrates a schematic of an example separation group and division reactor trip system (RTS) and ESFAS communication Architecture.
Figure 14:
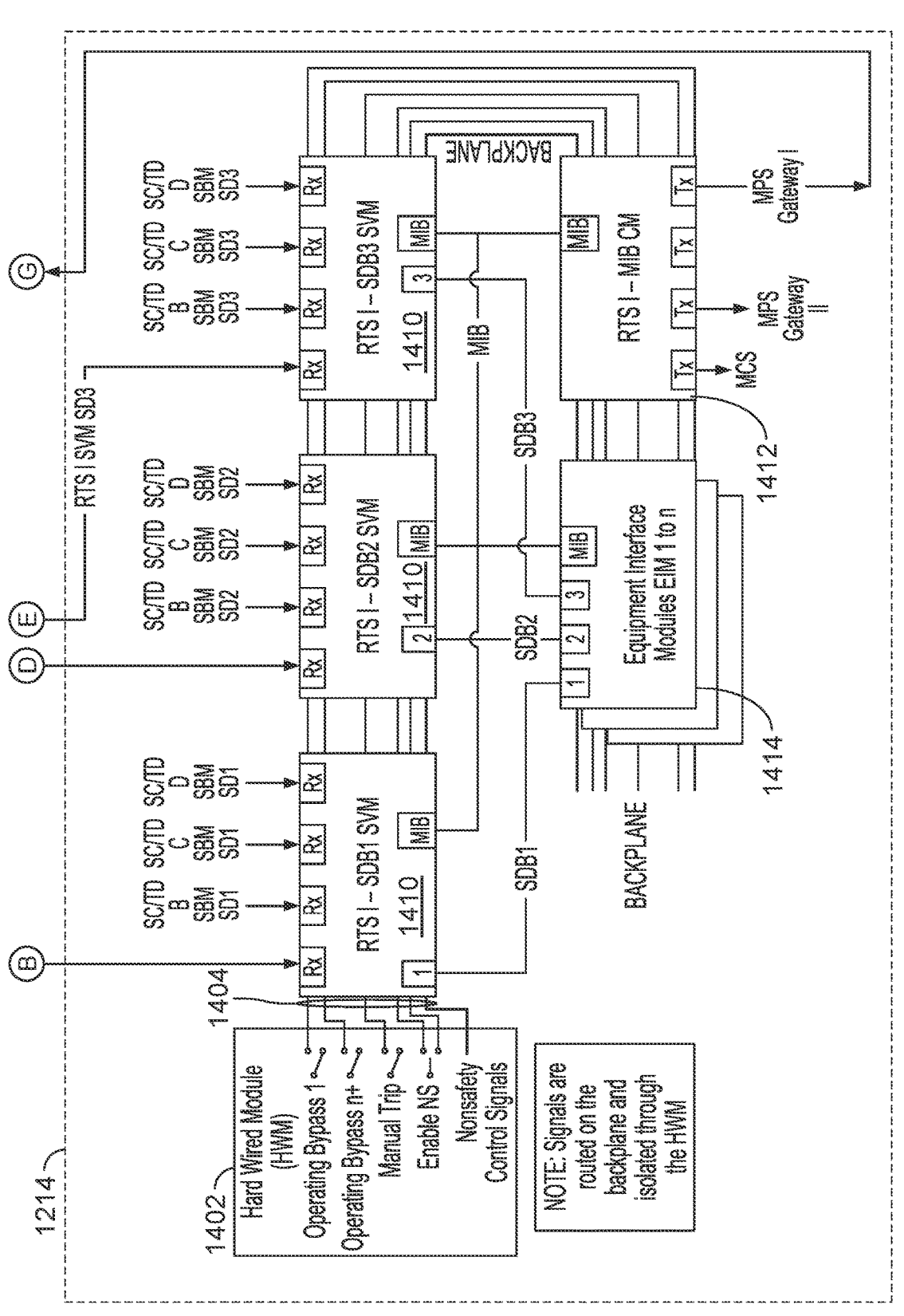
Figure 14:
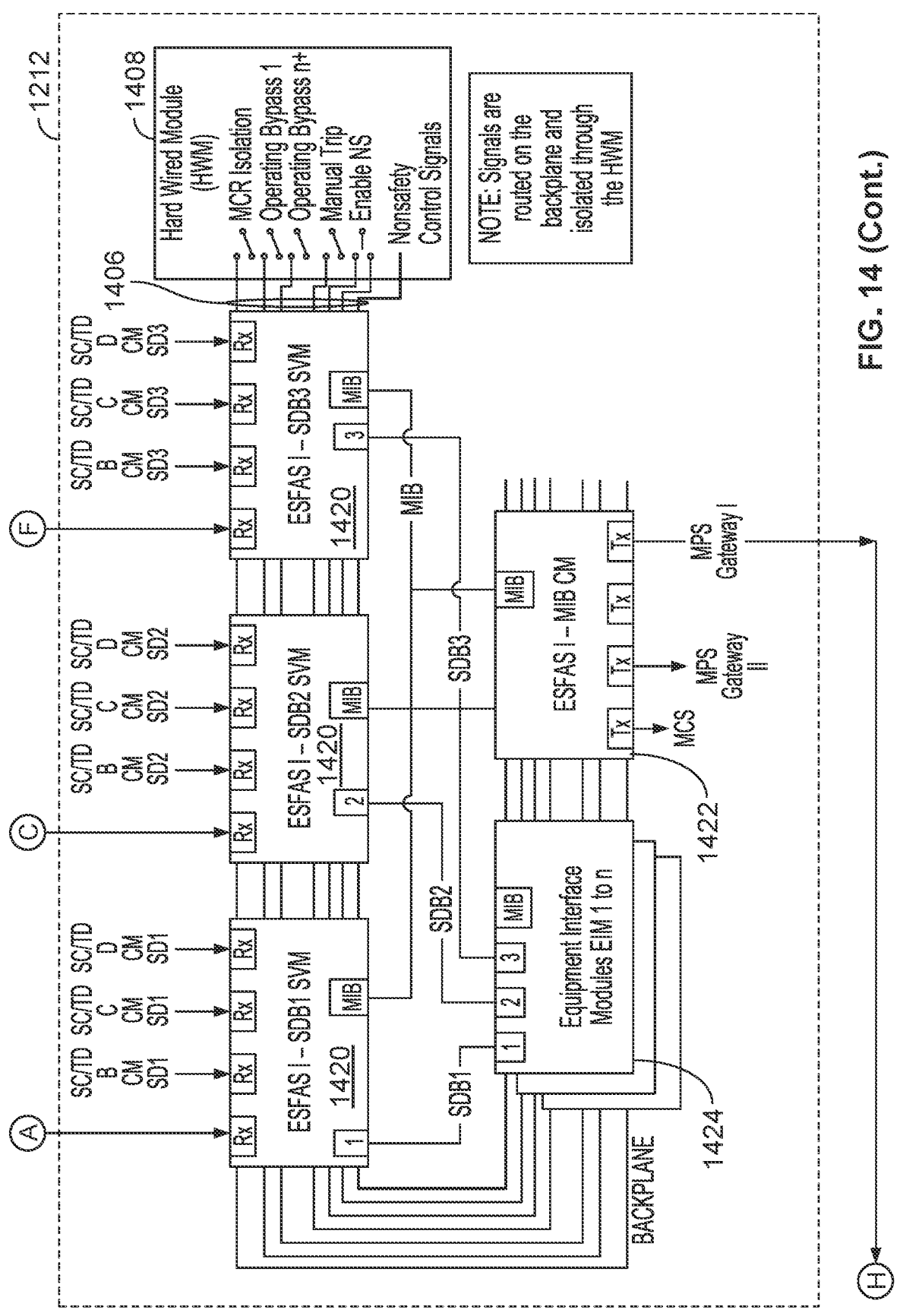

FIG. 14 illustrates a schematic 1400 of an example separation group and of division reactor trip system (RTS)

and ESFAS communication architecture. For example, FIG. 14 illustrates the individual component modules of signal conditioning and trip determination group A (1204a/1208a), RTS voting Division I 1214, and ESFAS voting Division II 1212. In addition, FIG. 14 illustrates hard-wire modules (HWM) associated with the separation group (HWM 1310), the RTS division (HWM 1402), and the ESFAS division (HWM 1408). As described in more detail below, each HWM 1310/1402/1408 passes hardwired analog signals though a respective backplane 1312/1404/1406 to associated component modules.

Referring collectively to FIGS. 12-14, the primary purpose of the MPS 1200 is to monitor process parameters and provide automatic initiating signals in response to out-of-normal conditions, providing protection against unsafe nuclear power system operation during steady state and transient power operation. There is one MPS 1200 for each nuclear power system. The two major functions that the MPS 1200 performs are: monitors plant parameters and trips the reactor when specified setpoints, which are based on plant safety analysis analytical limits, are reached or exceeded during anticipated operational occurrences. Exemplary nuclear power system reactor trip functions for the RTS are listed in Table 1 (shown in FIG. 27); and monitors plant parameters and actuates ESFAS equipment when specified setpoints, which are based on plant safety analysis analytical limits, are reached or exceeded during anticipated operational occurrences. Actuation of ESFAS equipment prevents or mitigates damage to the reactor core and reactor coolant system components and ensures containment integrity. Exemplary ESFAS functions are summarized in Table 2 (shown in FIGS. 28A-28C).

The MPS 1200 also transmits status and information signals to the non-safety-related MCS 155 (shown in FIG. 1), maintenance workstation (MWS) 1316, and SDIS (1800 of FIG. 18), and performs monitoring for post-accident monitoring (PAM) functionality.

The MPS 1200 is built on the highly integrated protection system platform, which is a field programmable gate array (FPGA)-based system. The MPS 1200 incorporates the fundamental I&C design principles of independence, redundancy, predictability and repeatability, and diversity and defense-in-depth as described above.

The MPS 1200 can include the following safety-related elements: separation group sensor electronics and input panels; four separation groups of signal conditioning; four separation groups of trip determination; division power distribution panels; Class 1E components to provide isolation and power monitoring from the non-safety-related highly reliable DC power system (EDSS) power supply; power supplies for sensors and MPS components, which also provide isolation from the non-safety-related EDSS; eight voltage sensors for detecting loss of 480 VAC to the EDSS battery chargers; four reactor trip breakers; four pressurizer heater trip breakers; two non-safety-related MWSs; two non-safety-related MPS gateways 1314; three 24-hour timers per division for PAM-only mode; two divisions of RTS voting and actuation equipment 1214/1216; two divisions of ESFAS voting and actuation equipment 1212/1218; reactor trip breakers 1244 and associated cabling pressurizer heater trip breakers and associated cabling; low voltage AC electrical distribution system (ELVS) 480 VAC bus voltage sensors and associated cabling for input to the MPS. The MPS boundary extends from the output connections of the sensors and detectors to the input connections of the actuated components.

The SFM 1300 for signal conditioning 1204a-1204d receives inputs from the process sensors and detectors to measure the process parameters as shown in FIG. 12. The interconnections of the process sensors and detectors to the signal conditioning 1204a-1204d are dedicated copper wires and are routed according to provided where needed based on the sensor requirements. An SFM 1300 performs three main functions: signal conditioning; trip determination; communication engines. The signal conditioning function is comprised of input modules that are part of the SFM 1300 consisting of a signal conditioning circuit, an analog-to-digital converter, and a serial interface. The signal condition function is responsible for conditioning, measuring, filtering, and sampling field inputs.

The trip determination 1208a-1208d receives process and detector input values in a digital format through a serial interface from the signal conditioning block. The trip determination 1208a-1208d performs the safety function algorithm and makes a trip determination based on a predetermined setpoint, and provides a trip or not-trip demand signal to each RTS division 1214/1216 through isolated, and in some aspects redundant (e.g., double, triple, or otherwise), transmit only, serial connections. The SFM 1300 also makes an ESFAS actuation determination based on a predetermined setpoint, and provides an actuate or do-not-actuate demand signal to each ESFAS division 1212/1218 through isolated, transmit only, serial connections.

There are two other logic functions within the SFM: monitoring and indication bus (MIB) functionality, and calibration and testing bus (CTB) functionality. The MIB logic function obtains the parameters, trip determination, status, and diagnostic information from each of the core logic paths and provides that to the MIB. The CTB functional logic allows the MWS 1316 to update the tunable parameters in nonvolatile memory when the SFM 1300 is out of service. A separation group architecture showing the interconnection of an SFM 1300 to the interfacing modules 1306/1308 as shown in FIG. 13.

The SFM 1300 communication engine sends the trip and actuate data to the three safety data buses (SDB1, SDB2, and SDB3) 1302 on the chassis backplane 1312 and the data is received on the scheduling and bypass modules (SBM SD1, SBM SD2, and SBM SD3) 1306. The scheduling and bypass modules (SBMs) 1306 are the bus masters of their associated bus and are responsible for scheduling the communications. The communication paths and equipment are redundant, making the safety data fault tolerant to single failures or multiple failures on a single data path. The SBM 1306 validates the data and transmits it through isolated, one-way, transmit-connections to both divisions of RTS 1214/1216 and ESFAS 1212/1218 to their respective scheduling and voting modules (SVMs) 1410/1420. The redundant data for the four separation groups is received by each division of RTS 1214/1216 and ESFAS 1212/1218 as shown in FIG. 12.

All status and diagnostics information for the SFM 1300 and SBM 1306 is provided to the MIB. The MIB communication module (MIB-CM) 1308 is the bus master for the MIB and schedules the communications for the MIB. The MIB-CM 1308 provides the status and diagnostics information to the MCS 155 and the MPS gateway 1314 through one-way, transmit only, isolated outputs. The MPS gateway 1314 sends the data to the MWS 1316 and SDIS 1800. The MIB-CM 1308 also provides a communication path from the MWS 1316 to the SFM 1300 through the CTB (path 1304) to allow for calibration and parameter updates for each safety function. In some implementations, the safety function must be out of service and a temporary cable 1318 from the MWS 1316 to the MIB-CM 1308 is required to allow changing parameters or calibration of a channel. An MWS 1318 can only access one separation group at a time using a temporary cable 1318.

The separation group signal conditioning and trip determination 1204a/1208a also provides manual bypass controls. Manual switches in the main control room (MCR) allow the operator to manually initiate a reactor trip. bypass controls for one or more separation group signals are provided to manually bypass a respective trip signal. The manual switches are input into the trip determination logic associated the SFM 1300 through the separation group hard-wired module HWM 1310. The separation group HWM 1310 is connected to the SFM 1300, SBMs 1406, and MIB 1308 through an analog hardwire backplane 11312.

An MIB is included for each separation group and each division. A divisional MIB-CM 1412/1422 only serves the function of monitoring and indication as there is no calibration available for the divisional RTS and ESFAS MIB-CMs 1412/1422.

In some aspects, RTS uses four redundant trip determination signals, one from each separation group (A, B, C, and D), to complete the logic decisions necessary to automatically open the reactor trip breakers 1244 when an RTS parameter exceeds a predetermined limit. Exemplary analytical limits for the RTS are listed in Table 1 (above).

The SFM 1300 for each separation group generates a trip signal that is sent through an SBM 1306 to an SVM 1410 in both RTS divisions 1214/1216. The SVM 1410 performs non-majority voting, e.g., two-out-of-four (2oo4) coincident logic voting, on the trip determination status. For example, if two or more trip determination signals generate a reactor trip, a trip signal is generated in the SVM and sent to the associated equipment interface modules (EIM) 1414 to open the reactor trip breakers 1244.

Each EIM 1414 in the RTS receives redundant trip signals from outputs created in the SVMs 1410 and provides a trip signal based on majority voting, e.g., two-out-of-three (2oo3) voting, from the incoming signals as shown in FIG. 14. Two divisions of RTS 1214/1216 circuitry and reactor trip breakers 1244 are provided to ensure that a single failure does not cause the loss of an RTS function. The reactor trip breakers 1244 can be configured in a series-parallel configuration, e.g., as shown in FIG. 2B.

Separation of the voting tiers between the SVM 1410 and the EIM 1414, as described above, provides a more efficient and more robust voting scheme. The SVM's non-majority voting scheme is triplicated across three SVMs 1410 and the EIM aggregates the results of the SVM voting. The EIM 1414 conducts a majority voting on the SVM signals.

An EIM 1414 is included for each reactor trip breaker 1244 in both RTS divisions 1214/1216 that are actuated by the MPS 1200. Each reactor trip breaker EIM 1414 has two separate logic paths. The primary coil is connected to the undervoltage trip circuit and the secondary coil is connected to the shunt trip circuit for each reactor trip breaker 1244. Each RTS division 1214/1216 controls one reactor trip breaker 1244 in each parallel path. This configuration allows for either division 1214/1216 to accomplish a reactor trip. When a reactor trip signal is generated in the SVM 1410, the under-voltage trip circuit is de-energized, and the shunt trip circuit is energized. Either action causes all four reactor trip breakers 1244 to open. Power is then interrupted from the control rod drive power supply and the control rods are inserted into the core by gravity.

The RTS also provides manual trip capability. Manual switches in the MCR allow the operator to manually initiate a reactor trip. Two manual switches, one per division, are provided to manually initiate a reactor trip. The manual switches are input into the actuation and priority logic (APL) associated with the reactor trip system EIM 1414 through the RTS hard-wired module (HWM) 1402. The RTS HWM 1402 is connected to the SVMs 1410, EIM 1414, and MIB 1412 through an analog hardwire backplane 1404. In addition to manual trip functions, the RTS HWM 1402 can provide operational bypass controls for one or more RTS trip signals, a non-1E enable (e.g., non-safety enable), and non-safety control signals. In some implementations, the non-1E enable control enables control signals from non-safety related systems to control RTS system operations (e.g., manipulate the RTBs 1244).

The APL accepts commands from three sources: digital trip signal from the SFM 1300; non-digital manual trip signal from its associated RTS division 1214/1216; non-digital manual control signals from the MCS 155.

The non-digital (e.g., analog) signals are diverse from the digital portion of the MPS 1200. Discrete logic is used by the APL for actuating a single device based on the highest priority. Regardless of the state of the digital system, manual initiation can always be performed at the division level. If the enable non-safety control permissive is active and there are no automatic or manual actuation signals present, the MCS 155 is capable of manipulating the reactor trip breaker.

The result from the APL is used to actuate equipment connected to the EIM 1414. Reactor trip breaker status is provided to the EIM 1414. Breaker status information is sent to the MIB-CM 1412, along with the status of the SDB signals.

In some aspects, ESFAS uses four redundant actuation determination signals, one from each separation group (A, B, C, and D), to complete the logic decisions necessary to automatically initiate the operation of necessary ESFs as shown in FIG. 12. Exemplary analytical limits for the ESFAS are listed in Table 2 (above).

When an ESFAS parameter exceeds a predetermined limit, the SFM 1300 for each separation group generates an actuation signal that is sent through an SBM 1306 to the SVM 1420 in both ESFAS divisions 1212/1218. The SVM 1420 performs non-majority voting, e.g., two-out-of-four coincident logic voting, on the trip determination status. If two or more actuation signals generate an actuation of an ESF system, an actuation signal is generated in the SVM 1420. The signal is then sent to the associated EIMs 1424 to de-energize the solenoids of the associated ESF system or open the breakers of the associated ESF system.

Figure 15:
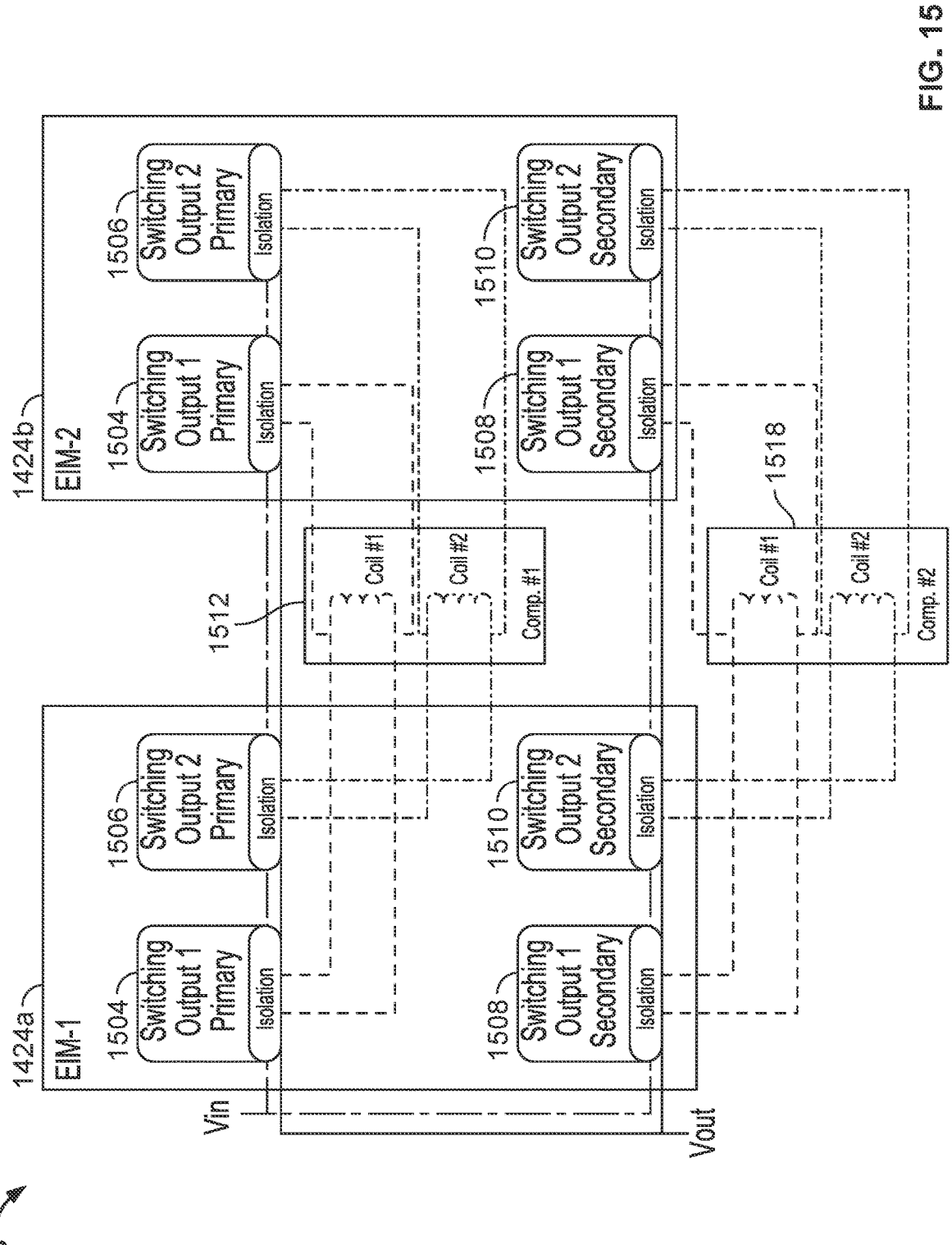
FIG. 15 illustrates a schematic of an example implementation of an EIM.

An EIM 1424 is included in each division 1212/1218 for each ESF component actuated by the MPS 1200. Each EIM 1424 can have two separate logic paths to allow for connection to separate ESF components. Each component is connected to two separate EIMs 1424, resulting in two EIMs 1424 providing redundant control to each component as shown in FIG. 15. This allows an EIM 1424 to be taken out of service and replaced online without actuating the connected equipment.

Separation of the voting tiers between the SVM 1420 and the EIM 1424, as described above, provides a more efficient and more robust voting scheme. The SVM's non-majority voting scheme can be performed redundantly across multiple (e.g., three) SVMs 1420 and the EIM 1424 aggregates the results of the SVM voting. The EIM 1424 conducts a majority voting on the SVM signals.

FIG. 15 illustrates a schematic 1500 of an example implementation of ESFAS EIMs 1424*a*/1424*b*. When an ESFAS actuation signal is generated in the SVM 1420, all four switching outputs 1504-1510 from the EIMs 1424*a*/1424*b* actuate, as shown in FIG. 15. For example, components can be actuated when power is interrupted to the component solenoids 1512/1518. The solenoids are de-energized, and the components change state to their de-energized position. For the pressurizer heater, the undervoltage trip circuit is de-energized, and the shunt trip circuit is energized. Either action causes all four breakers to open.

The ESFAS may also provide manual actuation capability. For example, in some implementations, manual switches in the MCR allow the operator to manually initiate an ESF function. Two manual switches, one per division 1212/1218, are provided to manually initiate each ESF function. These manual switches are inputs into the APL associated with the engineering safety features actuation system EIM 1424 through the ESFAS HWM 1408. The ESFAS HWM 1408 is connected to the SVMs 1420, EIM 1424, and MIB 1422 through an analog hardwire backplane 1406. In addition to manual ESF component actuation capability, the ESFAS HWM 1408 can provide operational bypass controls for one or more ESFAS trip signals, a non-1E enable control (e.g., non-safety enable), and non-safety control signals. In some implementations, the non-1E enable control enables control signals from non-safety related systems to control ESFAS system operations (e.g., manipulate ESF components).

The APL accepts commands from three sources: digital trip signal from the SFM 1300, non-digital manual trip signal from its own ESFAS division 1212/1218, non-digital manual control signals from the MCS 155.

The non-digital (e.g., analog) signals are diverse from the digital portion of the MPS 1200. Discrete logic is used by the APL for actuating a single component based on the highest priority. Regardless of the state of the digital system, manual initiation always can be performed at the division level. If the enable non-safety-related control permissive is active and there are no automatic or manual actuation signals present, the MCS 155 is capable of controlling (e.g., manipulating) the ESF components.

The result from the APL is used to control and actuate equipment connected to the EIM 1424. Equipment status is transmitted to each EIM 1424. Equipment status information is sent to the MIB-CM 1422, along with the status of the SDB signals.

Each MPS 1200 separation group and division, as well as the MPS gateway 1314, has a dedicated HWM (e.g., Separation group HWM 1310, RTS HWM 1402, and ESFAS HWM 1408). Features of the HWMs are described in more detail with respect to FIG. 25. The HWM accepts hard-wired signals external to the MPS cabinets and makes them available on the chassis backplane for the other modules (e.g., backplanes 1312, 1404, 1406). These signals include the manual actuation switches, operation bypasses switches, override switches, and enable non-safety control switches from the MCR 155. The operational bypass and override switches are described in more detail below. Other inputs to the HWM include the SFM 1300 trip/bypass switches, MCS 155 control inputs, and component position feedback.

Figure 16:
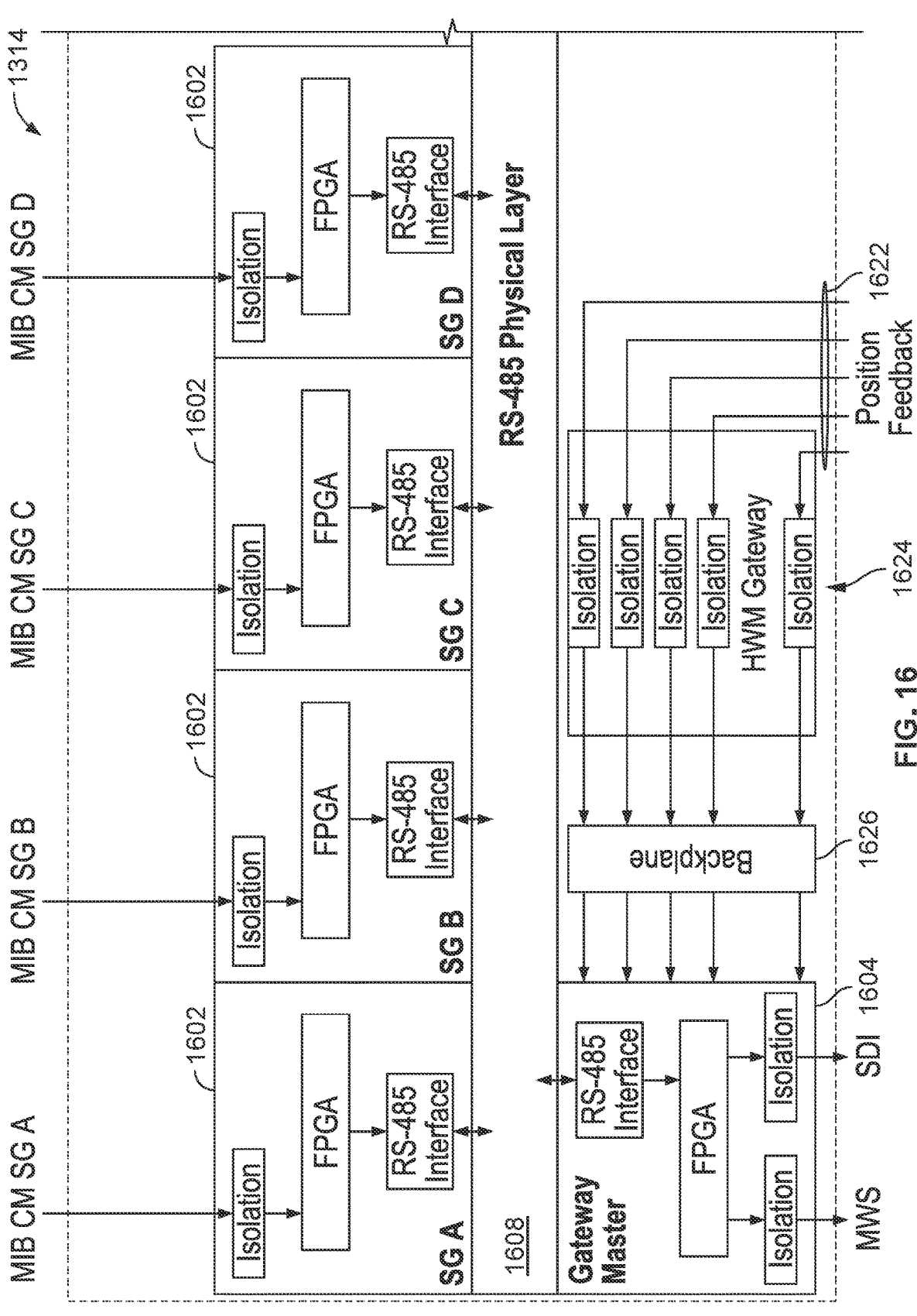
FIG. 16 illustrates a schematic of an example implementation of an MPS gateway.
Figure 16:
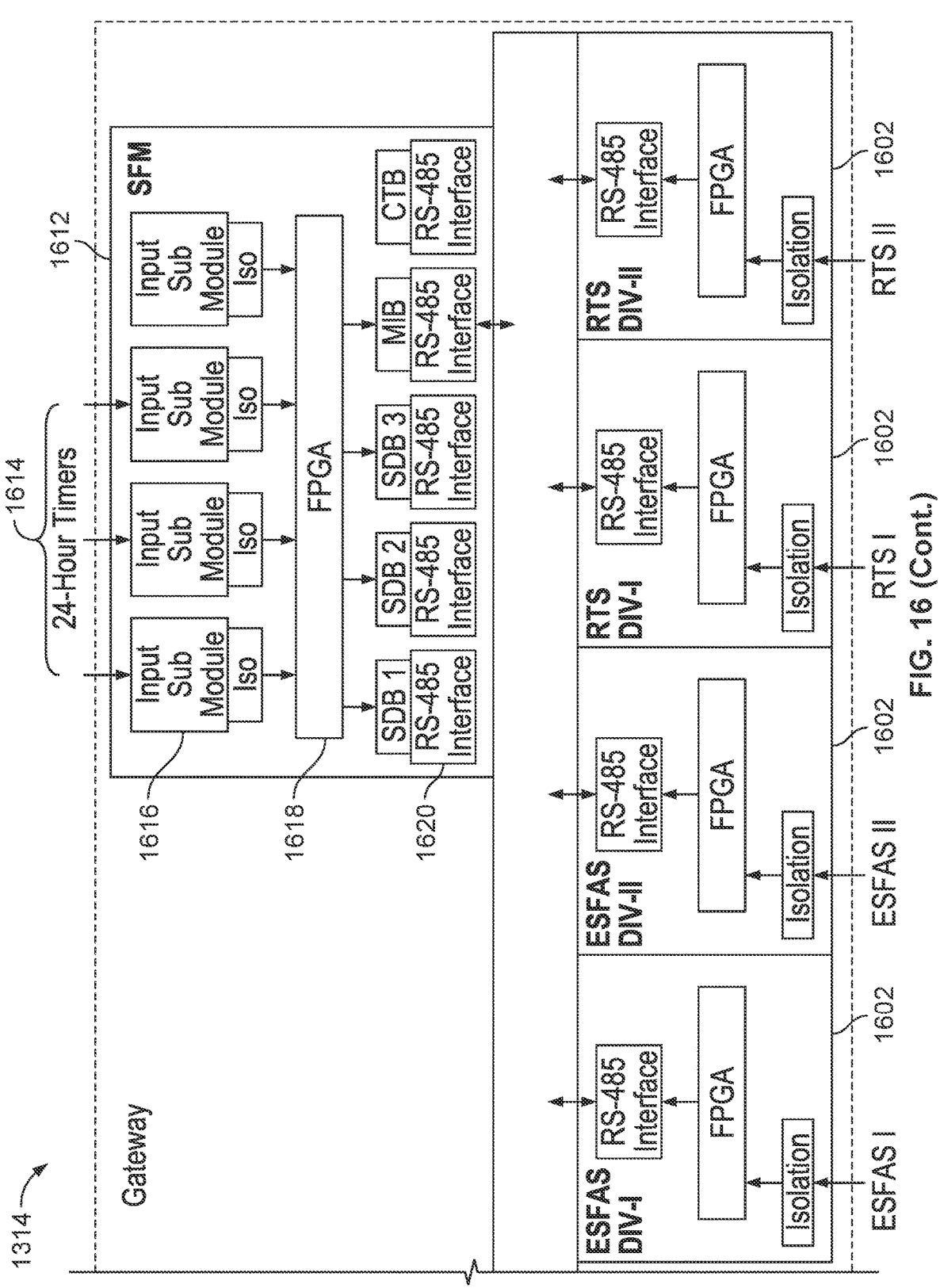

FIG. 16 illustrates a schematic of an example implementation of an MPS gateway 1314. Each division of MPS has a non-safety-related MPS gateway 1314. The MPS gateway includes a plurality of communication modules 1602 that consolidate the information received from the four separation groups (e.g., Groups A, B, C, and D), the two divisions of RTS 1214/1216, and the ESFAS 1212/1218. The MPS gateway 1314 can also collects equipment status feedback (position feedback 1622) from the equipment to HWM 1624 for PAM-only mode, as well as reads the status of the three 24-hour timers 1614 through a timer SFM 1612. All of the information transmitted to the MPS gateway 1314 is consolidated by a single communication module that acts as a gateway master 1604. The separation group and division communication modules 1602 and the timer SFM 1612 communicate with the gateway master 1604 through an RS-485 physical layer 1608. The gateway master 1604 on the MPS gateway backplane 1626 and then transmits the consolidated data through a qualified, isolated, one-way communication path to the MWS 1316 and the SDIS hubs as shown in FIG. 16. There is one MPS gateway 1314 for each division.

Each division of MPS 1200 has a non-safety-related MWS 1316 for the purpose of maintenance and calibration. The one-way, read-only data are provided through the MPS gateway 1314 for its division and are available continuously on each division's MWS 1316. The MWS 1316 is used to update tunable parameters in the SFMs 1300 when the safety function is out of service. Controls are put in place to prevent modifications to an SFM 1300 when it is being relied upon to perform a safety function. The MWS 1316 is used for offline maintenance and calibration, using a temporary cable 1318 that allows two-way communication to update setpoints and tunable parameters in the SFMs 1300. When an SFM 1300 is placed out of service by operating its out-of-service switch, the position of the trip/bypass switch associated with that SFM 1300 is read by the SBM 1306 and used as the status for the SFM 1300 output. Each division of the MPS 1200 has a non-safety-related MWS 1316 permanently connected for the purpose of online monitoring, using the MPS gateway 1314 through one-way isolated communication ports over point-to-point cables (e.g., copper or fiber-optic).

In some implementations, the EDSS is the power source for the MPS 1200. The DC-to-DC voltage converters are used for Class 1E isolation and protection of the MPS equipment. Division I MPS power is generated from power channels A and C through a DC-DC converter for Class 1E isolation and then auctioneered. Division II power is generated from power channels B and D, similar to Division I. Each of the separation groups is redundantly supplied and auctioneered by a single EDSS channel. The EDSS power channels A and C that supply power to MPS Division I are completely independent from EDSS power channels B and D that supply power to MPS Division II.

In some implementations, to ensure EDSS batteries supply power for their full mission time of 24 hours for A and D batteries and 72 hours for B and C batteries, only loads associated with maintaining the ECCS valves closed or PAM instrumentation functional remain energized during ECCS hold mode and PAM-only mode. These loads include the MPS and neutron monitoring system (NMS) cabinets including power to sensors, ECCS valve solenoids, radiation monitoring (RM) bioshield radiation monitors, and the EDSS battery monitors. If two out of four sensors detect a loss of voltage on both B and C battery charger switchgear, the MPS automatically generates a reactor trip, decay heat removal system (DHRS) actuation, pressurizer heater trip, demineralized water supply isolation, containment isolation, and starts the three 24-hour timers per division. For the first 24 hours following a loss of voltage, the four separation groups of MPS equipment and both divisions of ESFAS and RTS remain energized. If an ECCS actuation is not required due to plant conditions, then ECCS is not actuated (ECCS trip solenoid valves remain energized), which is defined as the ECCS hold mode, to allow time to restore AC power and prevent actuation of ECCS. The ECCS still actuates if the associated ESFAS signal is generated during this 24-hour period. If power has not been restored within 24 hours to the B and C battery switchgear, the 24-hour timers time out. At this time, the ESFAS and RTS chassis and MWS for both MPS divisions are automatically de-energized. This action de-energizes the ECCS solenoid trip valves and ECCS is actuated. The PAM instrumentation remains powered by the B and C EDSS batteries for an additional 48 hours (for a total of 72 hours). This configuration is defined as the PAM-only mode.

Figure 17:
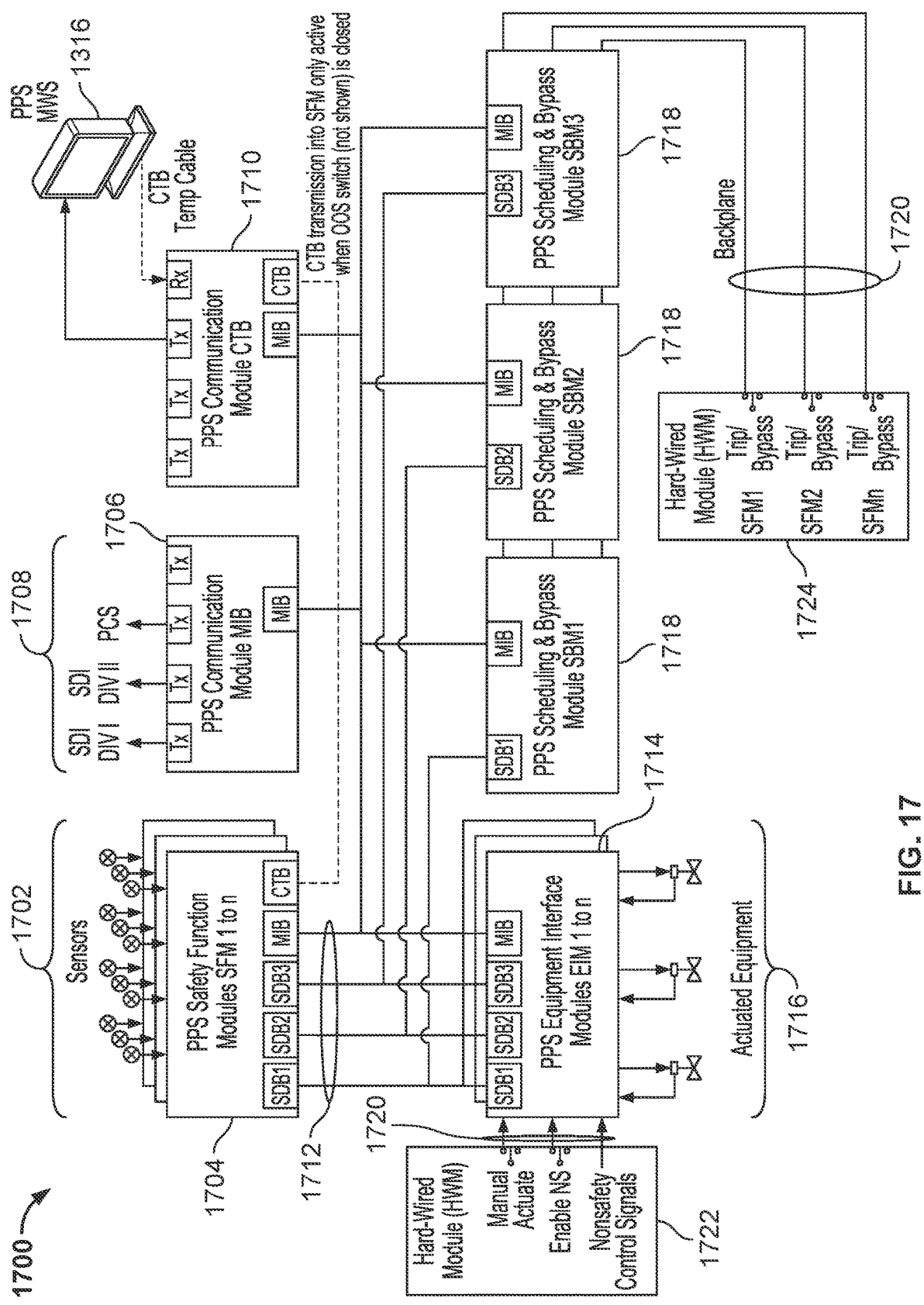
FIG. 17 illustrates a block diagram of a nuclear power plant protection system (PPS).

FIG. 17 illustrates a block diagram of a nuclear power plant protection system (PPS) 1700. The PPS 1700 monitors parameters at the plant level and executes actuations in response to normal and off-normal conditions. The PPS 1700 monitors and controls systems common to multiple nuclear power systems. Selected variables monitored and equipment actuated by the PPS 1700 require an augmented level of quality. The PPS 1700 can include two independent and redundant divisions. Either of the divisions is capable of accomplishing PPS functions.

The PPS is built on the highly integrated protection system platform and is an FPGA-based system. FIG. 17 displays the system diagram of the architecture of one PPS division. The architecture of the second division would be similar.

Division I and Division II of the PPS 1700 can be located in separate rooms of a Control Building. The boundaries of the PPS 1700 extend from the output connections of the sensors and detectors to the input connections of the actuated devices. Also included in the PPS 1700 boundary are the ELVS AC voltage sensors, which are classified as part of the PPS 1700. The non-safety-related displays, which receive data from the PPS 1700, are either part of the SDIS or the plant control system (PCS).

The process sensors measure different process parameters, such as radiation, level, and voltage. Separate sensors supply information to the two PPS divisions. Sensors are qualified for the environmental conditions before, during, and after a design basis event. The sensors provide input to the PPS 1700, but are classified as part of the system in which they are installed.

An individual PPS SFM 1704 is included in each division for each function performed by the PPS 1700. Each SFM 1704 can accept input 1702 from up to four sensors. Signal conditioning is performed to convert the sensor signals into a digital representation. With the digital signals, the SFM 1704 performs algorithms and setpoint comparisons necessary to determine if actuation is required for the function. The actuation decision is output to three separate communication buses 1712 to provide redundant communication between the SFMs 1704 and EIMs 1714. The SFMs 1704 also provide communication outputs the (e.g., via the MIB-CM 1706) for parameter values, status information, and alarms to be sent to the PCS and SDIS. Diagnostic information for each SFM 1704 is also sent to the MWS 1316.

The architecture of the PPS 1700 uses three independent data busses 1712 dedicated to actuation signals. The three communication safety data buses (SDB1, SDB2, and SDB3) 1712 are each configured in a master-slave communication protocol. The three redundant SBMs (SBM1, SBM2, and SBM3) 1718 are the masters for their associated bus and provide the redundant SDB 1712 communications from the SFM 1704 to the EIM 1714. The SDB1, SDB2, and SDB3 1712 are dedicated to processing the actuation signals.

The MIB-CM 1706 is independent of the three SDB communication modules and is the master of the MIB. It processes the information using the same master-slave communication protocol and interfaces with registers on the SFM 1704, communication module, and EIM 1714. These registers are different from the registers that are used for the actuation data path. The MIB-CM 1706 uses the MIB to communicate to the CTB communication module 1710 to update the MWS 1316. One-way data to the PCS and SDIS are transmitted through the MIB-CM 1706 isolated data paths. This interface is designed so that no credible failure of the non-safety equipment can prevent the PPS 1700 from performing its functions.

The CTB communication module 1710 is the master of the CTB; however, during normal operation there are no transactions on this bus. The CTB is only active if the channel is removed from service during calibration or changing of parameters. The CTB communication module 1710 isolated data path transmits one-way data to the MWS 1316.

An EIM 1714 is included in each division for each piece of equipment actuated or monitored by the PPS 1700. Each EIM 1714 can have two separate logic paths to allow for connection to a "primary" component and a "secondary" component. Each component 1716 is connected to two separate EIMs 1714, resulting in two EIMs 1714 providing redundant control to each component 1716. This allows an EIM 1714 to be taken out of service and replaced online without actuating any equipment 1716.

The actuation signals from the redundant SDBs 1712 are combined and delivered to the APL within the EIM 1714. The APL accepts commands from three sources: (1) the digital actuation signal from the SFM 1704, (2) the non-digital manual actuate input signal from its own PPS division, and (3) non-digital manual control signals from the PCS. The non-digital signals are diverse from the digital portion of the PPS 1700. Discrete logic is used by the APL for actuating a single device based on the highest priority. Regardless of the state of the digital system, manual initiation of actions can be initiated at the division level. When the appropriate configuration is enabled by the operator, component-level control can be achieved through the use of the PCS.

The result from the APL is used to control and actuate equipment connected to the EIM 1714. Equipment status is fed back to each EIM 1714. Equipment feedback information is sent to the MIB-CM 1706, along with the status of the SDB signals and the APL.

Each division of PPS 1700 has a dedicated MWS 1316. In order to perform maintenance activities, the ability to perform write commands from the MWS 1316 to the equipment is required.

Each PPS division cabinet has one or more HWMs 1722/1724 that accepts external signals and makes them available on the backplane 1720 for the other modules. These signals include the manual actuation switches, non-safety-control signals, and trip bypass controls.

The PPS 1700 provides monitoring and control of plant systems that are common to multiple nuclear power systems. The PPS 1700 is non-safety-related; however, because it supports the PAM function, the PPS 1700 is designed to meet augmented quality and regulatory requirements. All of the exemplary variables monitored by the PPS 1700 listed in Table 3 (shown in FIG. 29) are sent to the SDIS and the PCS to be displayed in the MCR as required by those systems. These provide the display and indication to support actuation of the control room habitability system and required PAM variables from the PPS 1700.

Figure 18:
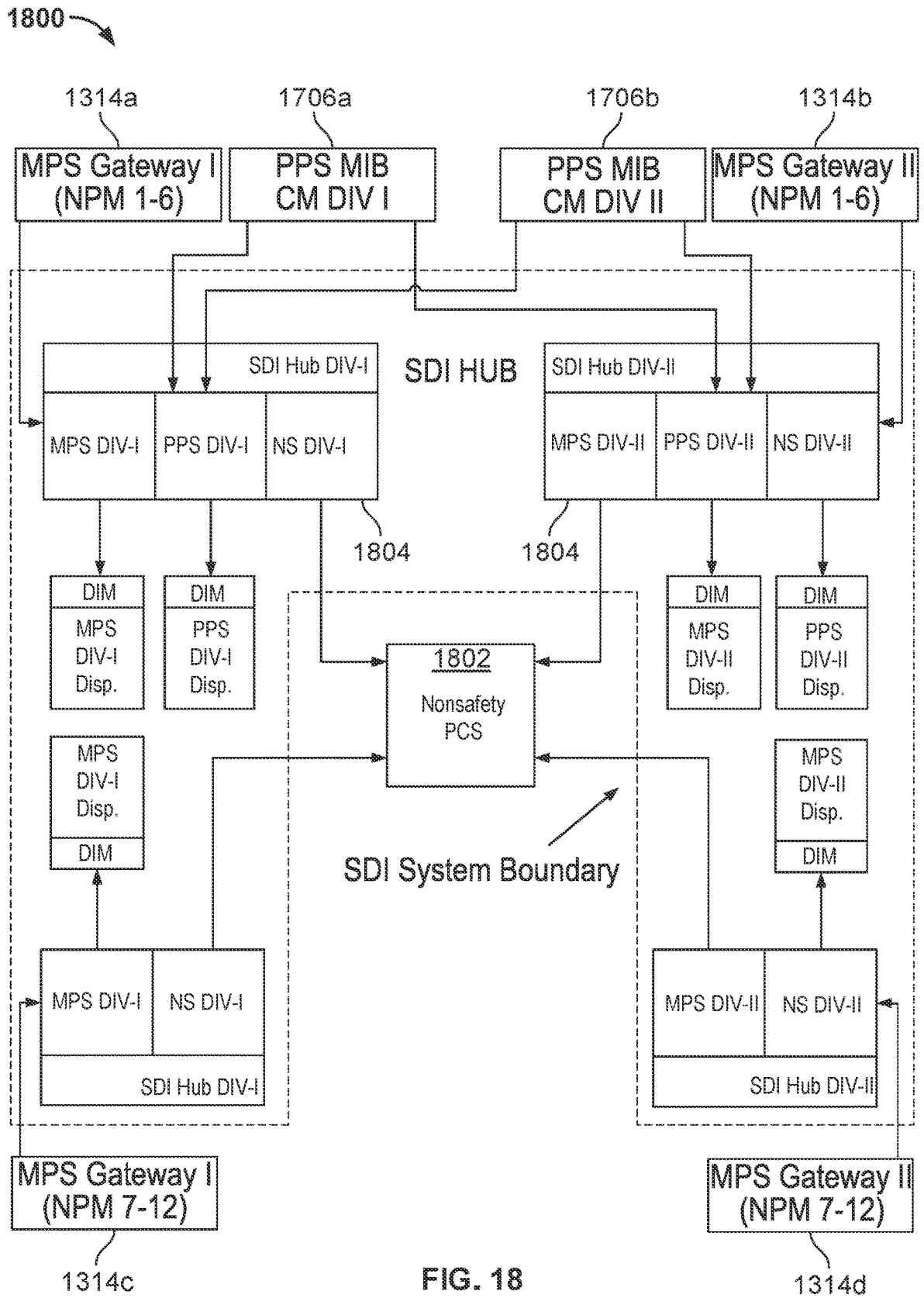
FIG. 18 illustrates a schematic of an example implementation of a safety display and indication system of an MPS.

FIG. 18 illustrates a schematic of an example implementation of a safety display and indication system (SIDS) of an MPS 1200. The SDIS provides accurate, complete, and timely information pertinent to MPS 1200 and PPS 1700 status and information displays to support the ability to initiate protective actions manually, if required. Display of information is designed to minimize the possibility of ambiguous indications and to enhance the human-system interface (HSI) for the operator.

The principal functions of the SDIS are to: provide operators the HSI and data to ensure that the plant is operating within the limits defined by safety analyses; notify operators when the ESFAS, RTS, and PPS setpoints are reached; supply operators with the data necessary to ensure that the nuclear power system is in a safe condition following an accident; and provide accurate, complete, and timely information pertinent to the MPS 1200 and PPS 1700 status and information displays to support post-accident monitoring (PAM). The SDIS provides HSI for the MPS and PPS to monitor and display PAM variables, and provides the capability for control inputs and status information. The SDIS can be a safety or non-safety related system. In some examples, the SDIS can be a non-safety-related, non-risk-significant system; however, because it supports the PAM function, the SDIS meets augmented quality and regulatory requirements.

Information regarding parameter values and equipment status is provided to the SDIS from each separation group and each division of the MPS 1200 and PPS 1700.

The SDIS interfaces with the MPS 1200 and PPS 1700 through communication modules. The MPS interface is referred to as an MPS gateway 1314, while the interface with the PPS is through an MIB communication module 1706. The SDIS consists of two independent divisions of equipment. Each SDIS division consists of communication hubs, display interface modules (DIMs) (described below in reference to FIG. 20), and display panels. The SDIS boundaries and interfaces are shown in FIG. 18.

The SDIS hub 1800 receives data from the MPS gateway and plant protection system MIB communication module. Each MPS gateway 1314 delivers data to a separate communication module 1804 within the SDIS hub 1800. The SDIS hub 1800 distributes the data it receives from the MPS 1200 and PPS 1700 to the DIM associated with the respective nuclear power system or PPS through one-way, optically-isolated, fiber-optic cables. Data from each of the communication modules 1804 on the SDIS hub 1800 for each SDIS hub rack is aggregated into a single communication module. This module polls each of the communication modules on its rack through the backplane for the rack. The communication module then sends the aggregated information to the PCS 1802 through a unidirectional, optically-isolated interface.

The SDIS hub 1800 is separated into two chassis of communication modules per division. The first chassis contains the communication modules for MPS 1200 associated with nuclear power system 1 through 6 and the PPS 1700 communication modules. The second chassis houses the communication modules for only MPS 1200 associated with nuclear power system 7 through 12. Both the first and second chassis of communication modules contain a communication module for interfacing with non-safety systems.

Figure 19:
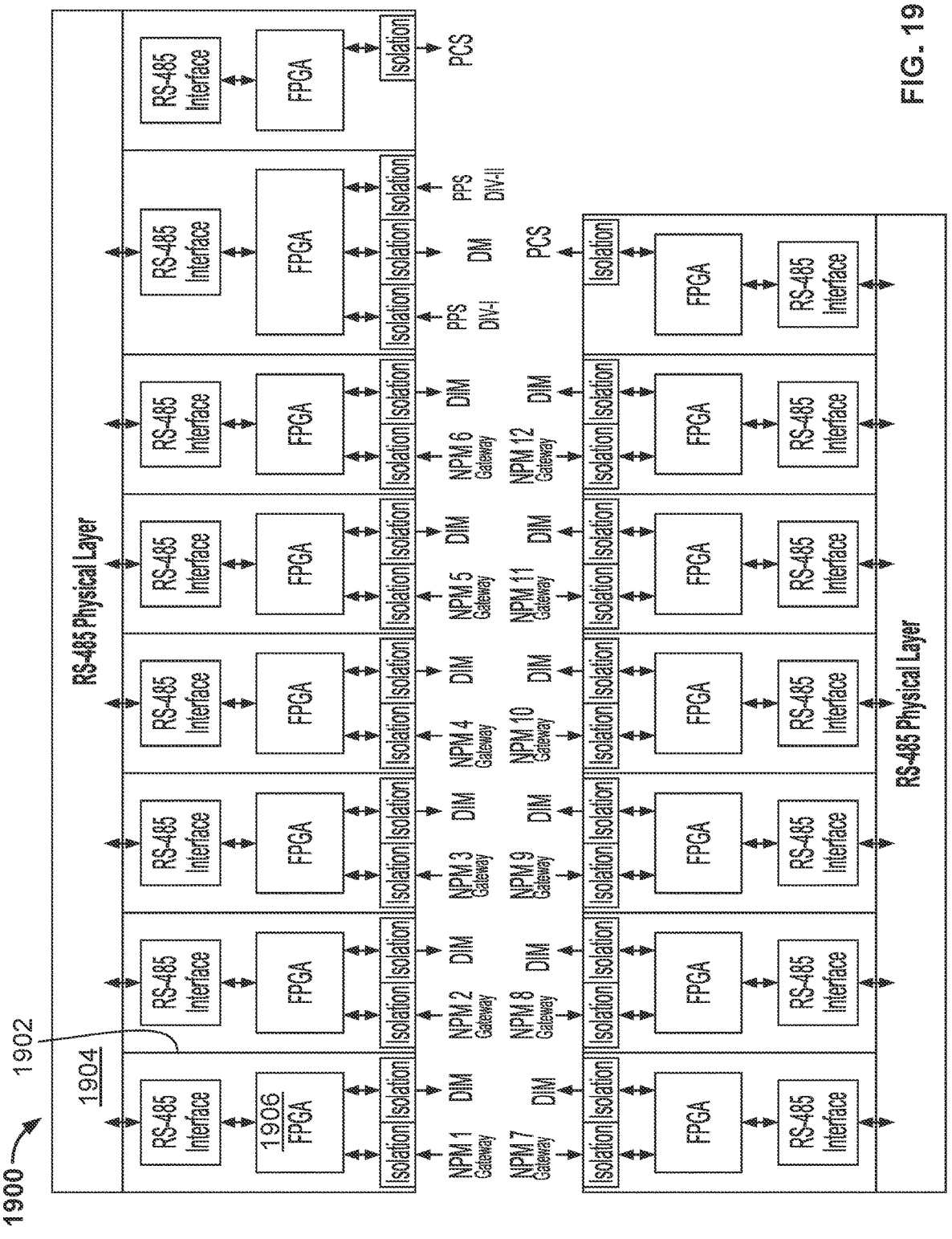
FIG. 19 illustrates a schematic of an example implementation of a safety display and indication hub of an MPS.

FIG. 19 illustrates a schematic of an example implementation of a SDIS hub rack 1900 of an MPS 1200. The SDIS rack 1900 includes a plurality of SDIS communication modules 1902. In some implementations of an MPS 1200, each rack 1900 includes SDIS-CMs 1902 for one division of a modular nuclear reactor system. The SDIS-CMs 1902 can be interconnected on an RS-485 physical layer 1904. For example, each rack 1900 includes twelve nuclear power module (NPM) SDIS-CMs 1902 each configured to receive and display I&C data associated with one of twelve modular nuclear reactors, and a PPS SDIS-CMs 1902 configured to receive and display I&C data associated with a PPS. The second rack 1900 may be similar but implemented with different types of software and/or hardware components to provide diversity. The SDIS rack 1900 may provide an efficient way to aggregate I&C data from multiple reactor systems.

Figure 20:
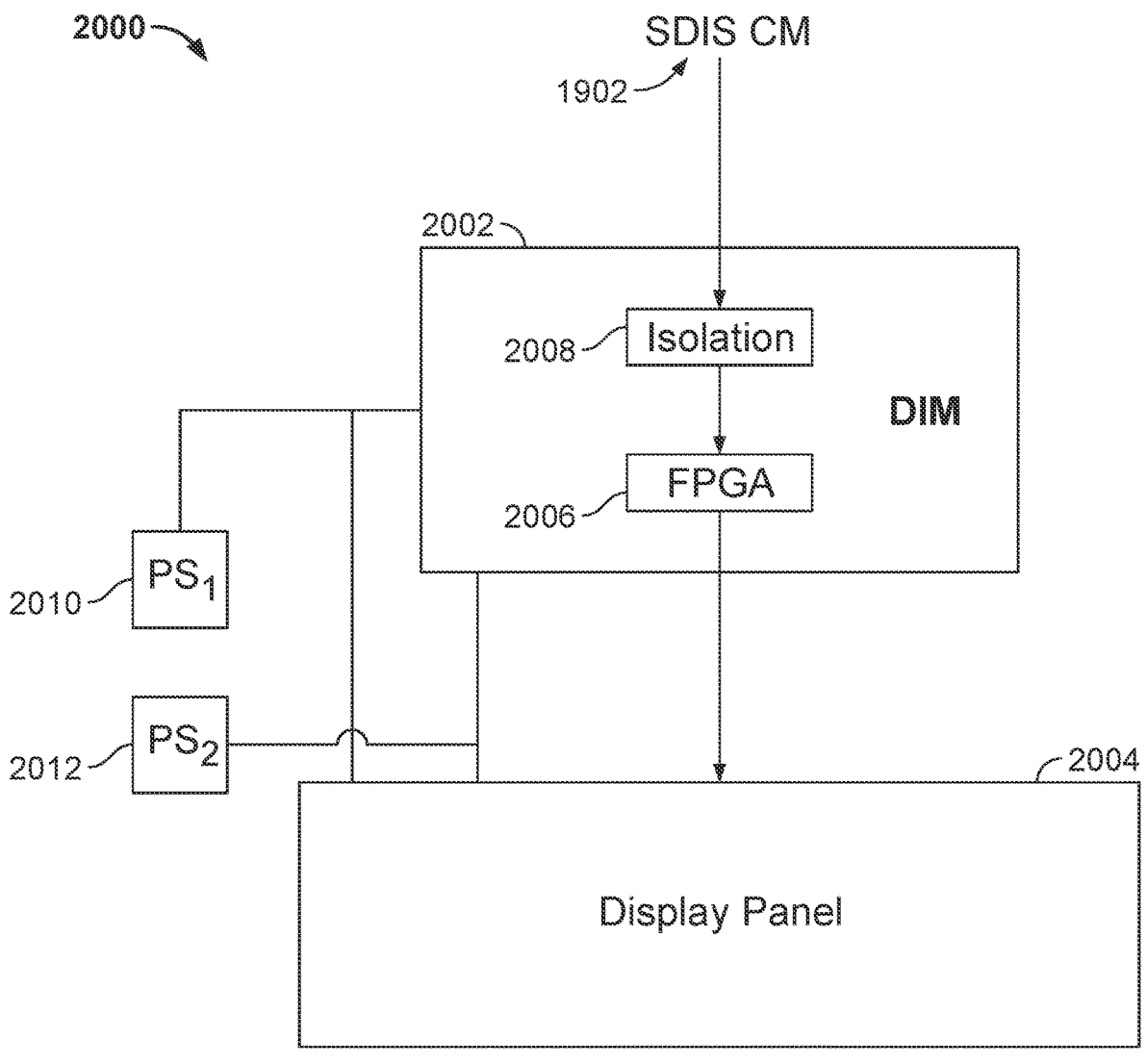
FIG. 20 illustrates a block diagram of an example implementation of a display system of an MPS.

FIG. 20 illustrates a block diagram of an example implementation of a display system (DS) 2000 of an MPS 1200. The DS 2000 includes a display interface module (DIM) 2002 in electrical communication with a digital display panel 2004 (e.g., a liquid crystal display (LCD) or a light-emitting diode (LED) display). The DS 2000 includes two independent power supplies 2010 and 2012. Each power supply 2010/2012 is connected to provide power to both the DIM 2002 and the display panel 2004. The use of two independent power supplies 2010/2012 ensures the supply of redundant power to the DS 2000.

The DIM 2002 within the SDIS receives data through an isolated fiber-to-copper interface. The received data are converted in an FPGA 2006 to a display ready format. For example, the DIM 2002 processes the data to be rendered in an appropriate format (e.g., a graphical user interface) and also serves as a display driver for the panel 2004. Thus, the display ready format may be panel drive signals for driving a pixel matrix of the display panel 2004.

The DIM 2002 then sends the display ready data through a cable to the display panel 2004. The display panels 2004 display the data made available from the MPS 1200 and PPS 1700 to the plant operators in the MCR. Data from each MPS 1200 and PPS 1700 are displayed on its own dedicated monitor, with one monitor per division. Both divisions of MPS 1200 and PPS 1700 data are displayed on both SDIS divisional displays.

In some implementations, each DS 2000 includes a pair of DIMs 2002 and a pair of display panels 2004. To provide redundancy of data display, each DIM 2002 in the DS 2000 is provided with the same MPS or PPS data. In other words, both DIMs 2002 in the DS 2000 are connected to the same SDIS output. Redundancy is further provided, by using a different type of FPGA 2006 in each DIM 2002 to provide design diversity. Similarly, the FPGA 2006 of each DIM 2002 can be programed with a different data and graphic processing algorithm to provide software diversity.

FIG. 21 illustrates a schematic of another example implementation of an SFM 2100. A safety function module (SFM) 2100 processes sensor inputs to make reactor trip and/or ESF actuation determinations for the separation group it is assigned to. The module is composed of three functional areas as shown in FIG. 21: Signal conditioning/analog to digital conversion (input sub-modules) 2104a-2104d, Digital logic circuits 2114 (e.g., safety function algorithm, calculations, diagnostics), and Communications engines 2120.

The SFM 2100 uses an FPGA 2112 device to contain all digital logic circuits that include the safety function algorithm, engineering unit calculations, bus communication logic, and indication and diagnostic information (IDI) logic circuits. There is an out of service (OOS) switch 2124 on the front of the SFM 2100 to allow removal of the SFM 2100 from service. With the OOS 2124 switch activated, the safety function will be placed in trip or bypass based on the position of the Trip/Bypass switch for that SFM 2100.

Activating this switch permits modification of the tunable parameters and setpoints in nonvolatile memory (NVM) 2110.

The input sub-modules 2104a-2104d receive information from multiple inputs 2102. The input sub-modules 2104a-2104d include a signal conditioning circuit 2106, analog-to-digital (ND) converter 2108, and a serial interface. Each SFM 2100 can handle multiple (e.g., four or more) input sub-modules 2104a-2104d. The input 2102 type can be any combination of analog and digital (e.g., RTD, TC, 4-20 mA, 10-50 mA, 0-10 V) that the SFM 2100 would need to make an actuation determination, including the generation of permissive and interlocks.

The logic functions are implemented within the programmable portion (FPGA) 2112 of the SFM 2100. The output of each of the input submodules is sent to multiple redundant core logic modules 2114 signal paths and a MIB logic module 2116 logic in the FPGA 2112. The core logic modules 2114 each function in a redundant signal path. The core logic modules 2114 perform functions including, but not limited to: performing the safety function algorithm, comparing the safety function algorithm output to a setpoint and makes a trip and/or ESF actuation determination, and generating permissives and control interlocks.

The core logic modules 2114 each operate within separate core logic signal path and perform functions logically independent from the other two core logic modules. This allows for three functionally independent core logic functions and provides three redundant signal paths. For example, the safety function algorithm is processed through three redundant paths to provide error detection and fault tolerance of the safety function.

There are two other logic functions within the FPGA 2112: the MIB logic module 2116; and the CTB logic module 2118. The monitoring and indication bus (MIB) logic module 2116 obtains the parameters, trip determination, status, and diagnostic information from each of the three redundant core logic paths and provides that information to the MIB. This information is sent to the MCS, SDI, and MWS through the MIB-CM and the MPS gateway. The CTB logic module 2118 allows the MWS to update the tunable parameters in NVM 2110 when the SFM 2100 is out of service (00S switch 2124 is activated).

The logic modules 2114/2116/2118 each include multiple deterministic state-machines. A logic function algorithm is processed through multiple redundant paths to provide error detection and fault tolerance. By using a dedicated SFM 2100 for a function or group of functions, the effect of a software CCF is limited due to the unique logic and algorithm on each module.

The communication block includes five separate and logically independent communication engines 2120 (e.g., capable of transmitting data regardless of the status of another communication engine). Each engine 2120 is dedicated to one of the following communication busses: Safety Data Bus 1 (SDB1), Safety Data Bus 2 (SDB2), Safety Data Bus 3 (SDB3), Monitoring and Indication Bus (MIB), and Calibration and Test Bus (CTB). Although each SDB communicates the same data, each communication port packages and transmits data differently. SDB1 may transmit, for example, 10 packets of data in sequential order (e.g., 1, 2, . . . , 10), while SDB2 transmits the same 10 packets in reverse order (e.g., 10, 9, . . . , 1), and SDB3 transmits even packets first followed by odd packets (e.g., 2, 4, . . . , 10, 1, 3, . . . 9).

In some implementations, the use of triple redundancy for the core logic functions on the SDBs not only allows for communication error detection but may limit a communication CCF to a particular bus without affecting the ability of downstream components to make correct trip and/or actuation determination.

FIG. 22 illustrates a schematic of an example implementation of a monitoring and indication (MIB) communication module 2200 of an MPS 1200. The communication module (CM) 2200 is a base module which provides communications channels for transferring safety data from the SFM to the EIMs. The CM 2200 also provides communications capabilities for passing monitoring and indication and diagnostic information outside of the protection system architecture: (1) to an accident monitoring and display system (e.g., SDI); and (2) to other systems (e.g., MCS and MWS) for control, diagnostic, display, and monitoring purposes.

In some implementations, the CM 2200 also incorporates hard-wired signal inputs via logic level backplane signals. If used, these hard-wired signals are placed directly on the backplane thru the hard-wired module (HWM) within the same chassis or daisy chained chassis.

CMs 2200 can be configured differently based on their function. The different types of communication modules are based on the same module hardware architecture and include: Monitoring and indication bus CM (MIB-CM), Scheduling and bypass module (SBM), Scheduling and voting module (SVM), MPS gateway CM.

The basic CM 2200 includes following circuits: FPGA 2202, scheduling and communication logic 2214, indication and diagnostic information (IDI) 2210, CM functional logic circuit 2212 (configured based on the specifically desired function of the CM), hard-wired signal inputs, and communication physical layers 2216. The CM utilizes an FPGA 2202 device to implement the logic circuits based on the specific functions the CM will perform. The logic implemented in the FPGA 2202 includes the bus communication and scheduling logic, any functions the CM is to perform, and IDI logic circuits. For example, in an MIB-CM the functional logic circuit 2212 is configured to perform monitoring and indication information collection and assignment. The MIB CM is used to collect and transmit indication and diagnostics information from the SFMs, SBMs, and EIMs to the SDI system and the PCS through an isolated one-way data path.

Each of the four copper to fiber physical layers 2216 can be configured as receive-only or transmit-only. Inter-divisional communication or communication to non-safety-related or other safety-related systems must be through the transmit-only or receive-only communication ports (e.g., copper or fiber optic). These ports provide Class 1E isolation for either receive or transmit configurations. The CM includes self-test capabilities to ensure detection of failures within the FPGA logic circuits, the nonvolatile memory (NVM), the clock circuitry, and the power and power management circuitry.

The MIB-CM is used to collect and transmit indication and diagnostics information from the SFMs, SBMs, SVMs, and EIMs to the MCS and the MPS gateway through a qualified isolated one-way data path. It is also used to transmit the calibration and test bus (CTB) information from the MWS to the SFMs.

Three of the copper to fiber data ports for the MIB-CM in each separation group and the RTS and ESFAS Divisions are configured for transmit only and send information to: MCS, Division I MPS gateway, and Division II MPS gateway. The remaining copper to fiber data port on the separation group MIB-CM is configured as receive only and receives information from the MWS through a temporary cable that is connected during maintenance activities. The remaining port on the MIB-CM in the RTS and ESFAS Divisions is a spare.

FIG. 23 illustrates a schematic of an example implementation of a scheduling and bypass module (SBM) 2300 of an MPS 1200. The SBM 2300 is a CM 2200 configured to perform scheduling and bypass functions. For example, in the SBM-CM the functional logic circuit 2212 is configured to perform scheduling and bypass functions. As described above, there are multiple redundant SBMs 2300 per separation group (e.g., three SBMs per group); one for each safety data bus. The SBM 2300 requests and receives safety data from each SFM, then transmits the data to its associated SVM in both divisions of RTS and the associated SVM in both divisions of ESFAS. The SBM copper to fiber data ports 2210 are configured for transmit only to provide one-way data to the RTS and ESFAS. The three SBMs 2300 provide a triple redundant data communication path to assist in error detection and the ability to detect transmission faults.

The HWM for a separation group converts the trip/bypass switch position into a logic level signal for each safety function and places this information on the chassis backplane which are received at the SBM 2300 hardwired signals interface 2304. The data packet received from the SFM contains the position of the OOS switch on the SFM. The SBM 2300 determines if the SFM is out of service from the OOS switch position information received in the data packet from the SFM. If the SFM is out of service and the trip/bypass switch is in bypass, the SBM 2300 transmits a non-actuate condition to the SVM no matter what the output of the SFM safety function is calling for. If the SFM is out of service and the trip/bypass switch is in trip, the SBM 2300 transmits an actuate signal to the SVM no matter what the output of the safety function is calling for. If the SFM is not out of service, the SBM 2300 transmits the safety function algorithm result that was calculated and transmitted from the SFM to the SBM 2300.

If the SBM 2300 does not receive a valid response from the SFM, an alarm is generated and the SBM 2300 uses the position of the Trip/Bypass switch to determine what to transmit to the SVM. If the Trip/Bypass switch is in the trip position, the SBM 2300 transmits an actuate signal to the SVM for that safety function. If the switch is in the bypass position, the SBM 2300 transmits a non-actuate signal to the SVM for that safety function.

FIG. 24 illustrates a schematic of an example implementation of a scheduling and voting module (SVM) 2400 of an MPS 1200. The SVM 2400 is a CM 2200 configured to perform scheduling and voting functions. For example, in the SVM-CM the functional logic circuit 2212 is configured to perform scheduling and voting functions. The SVM 2400 receives data from the four separation groups and performs a non-majority vote (e.g., 2oo4 vote) for each safety function to determine if a trip or actuate signal is required. If two or more separation groups agree that a trip or actuate signal is required, the trip or actuate signal is passed on to the appropriate EIMs for that safety function. As described above, there are three redundant SVMs 2400, one for each safety data bus, in each division of the RTS and three in each division of the ESFAS. The communication ports 2216 are configured as receive only.

The HWMs for the RTS and the HWMs for the ESFAS convert the operating bypass switch positions into a logic level signal and places this information on the chassis backplane which are received at the SVM 2400 hardwired signals interface 2404. If there is an operating bypass signal present for the safety function being evaluated, any actuate signal for that safety function is ignored and a non-actuate signal is transmitted to the appropriate EIMs.

Figure 25:
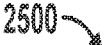
FIG. 25 illustrates a schematic of an example implementation of an equipment interface module (EIM) of an MPS.

FIG. 25 illustrates a schematic of an example implementation of an equipment interface module (EIM) 2500 of an MPS 1200 or PPS 1700. The EIM 2500 is the final actuating device the RTS, the ESFAS and the PPS. The EIM 2500 includes the following circuitry: an FPGA 2502, bus communication logic 2508, IDI logic 2512, automatic actuation voting logic 2510, hardwired signals logic 2504, actuation and priority logic (APL) 2514, switching outputs 2516, and position feedback inputs 2518.

The logic implemented in the FPGA 2502 includes bus communication logic 2508, automatic actuation voting logic 2510, and the IDI logic 2512. The bus communication logic 2508 processes the data from the SDBs (SDB1, SDB2, and SDB3) and sends the data to the automatic actuation voting logic 2510. The IDI logic 2512 is sent to the MIB communication logic 2520 to be processed by the PCS, SDIS hub, and the MWS.

The automatic actuation voting logic 2510 votes on the actuation signals received from the three SDBs. The automatic actuation voting logic 2510 determines if an actuation is warranted for the primary or the secondary actuation paths. For example, the automatic actuation voting logic 2510 conducts majority voting on the actuation signals. The automatic actuation voting logic 2510 indicates that an automatic actuation is warranted if two-out-of-three (2oo3) actuation signals so indicate. The data communication is triple redundant and voted on to eliminate single failure issues.

The IDI logic 2512 collects status and diagnostic information from the various circuits on the EIM 2500 and sends the diagnostic information to the MIB communication logic 2520 for processing.

The EIM 2500 can be connected to a HWM through a chassis backplane (e.g., RTS HWM 1402, ESFAS HWM 1408, and PPS HWM 1722). The respective HWM converts manual switch positions and the non-safety related control signals into analog logic level signals and places this information on the chassis backplane. The hardwired signals logic 2504 distributes this information from the backplane of the chassis to the APL 2514 primary and secondary circuits. Hardwired signals 2506 can include, but are not limited to, manual actuation signals, non-safety (NS) enable switch position signals, permissive signals, bypass signals, and non-safety related control signals.

The APL 2514 is constructed of discrete logic components and receives commands from the automatic actuation voting logic 2510, the hardwired signals logic 2504, and PCS control signals. The APL 2514 prioritizes and processes the highest priority commands received. For example, the APL 2514 prioritizes automatic and manual actuation signals above PCS control signals and NS enable signals. For example, if the NS enable switch is active, the PCS is capable of controlling an end device coupled to the EIM 2500 when no higher priority function actuation signal is present. However, an automatic or manual actuation command will override the PCS input. Without the NS enable signal, the EIM 2500 always ignores PCS command signals. For example, the APL 2514 permits the use of non-safety signals (e.g., NS enable and PCS command signals) to actuate or reset an end device through the EIM 2500 so long as no higher priority signal (e.g., automatic or manual actuation signals) are present. Furthermore, the APL 2514 permits such operations from non-safety signals while preventing any errors of faults from the non-safety system (e.g.,

48

PCS) to propagate through the EIM 2500 into a safety system (e.g., RTS or ESFAS).

In some implementations, each EIM 2500 can control multiple components. For example, each EIM 2500 can control two field components. The EIM 2500 is equipped with four switching outputs 2516: two primary and two secondary. The switching outputs 2516 are implemented as redundant outputs where a single failure in one of the driving components is automatically detected and mitigated without affecting the output operation. A single failure in one of the four switching outputs 2516 cannot prevent the output channel from energizing or de-energizing a load. The self-test capability is implemented by measuring the current though the switching outputs 2516 while the solenoid is energized and by measuring continuity through the solenoid while the solenoid is de-energized. The switching output is isolated from the field to allow connection to non-safety components or voltage sources.

With only one EIM 2500 supplying power to the coil of the end device, a failure or removal of the EIM 2500 would cause the field component to be actuated. To allow replacing an EIM 2500 without actuating the end device, a second EIM 2500 switching output is placed in parallel with a second EIM 2500 so that either EIM 2500 will keep the output energized, as shown and described in reference to FIG. 15. This configuration also permits more thorough testing of the EIM 2500 circuits.

Figure 26:
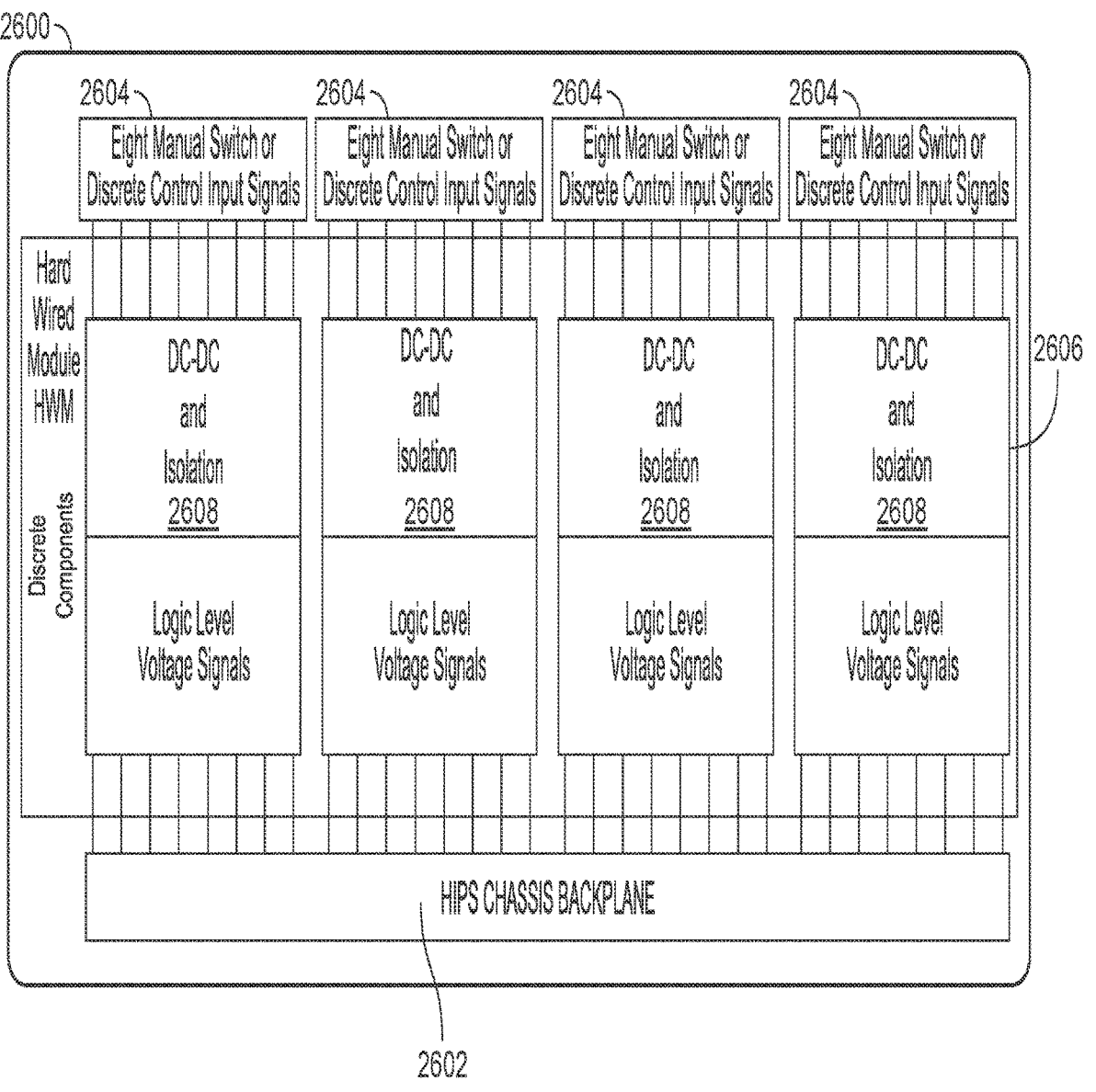
FIG. 26 illustrates a block diagram of a hard wired module (HWM) of an MPS.

FIG. 26 illustrates a block diagram of a hard wired module (HWM) 2600 of an MPS 1200. Each MPS separation group and division, as well as the MPS gateway, and each PPS division, has a dedicated HWM 2500 (e.g., HWMs 1310, 1402, 1408, 1722, 1724). The HWM 2600 accepts hardwired analog signals external to the MPS cabinets and makes them available on the chassis backplane 2602 for the other modules. For example, these signals include, but are not limited to, the manual actuation switches, operation bypasses switches, override switches, and enable non-safety control switches from the MCR. Other inputs to the HWM include the SFM trip/bypass switches, MCS control inputs, and component position feedback.

The HWM 2600 can receive signals from the manual switches in the main control room, the discrete control signals from MCS, position feedback, and the trip/bypass switch panels. The HWM 2600 is constructed of discrete analog components only, there are no programmable devices. These signals consist of: Separation Group Switch Inputs (e.g., maintenance Trip/Bypass (each separation group)), RTS and ESFAS Switch Inputs (e.g., manual actuation (MCR), block or override (MCR), enable NS control (MCR), operating bypasses (MCR), non-safety-related MCS control signals), and MPS Gateway (e.g., position feedback from the RTS and ESFAS components for accident monitoring indications).

All signals from the manual switches and the non-safety-related MCS signals are isolated from the field, converted to an analog logic voltage level voltage, and placed on the backplane for use by any module that needs the signal. The example HWM 2600 shown in FIG. 26 has up to 32 inputs coming into the top of the module. The 32 inputs are divided into 4 sets of 8 inputs 2604. Each set 2604 has its own electrical isolation 2508 from the external input as well as the adjacent 3 sets of inputs 2604. Each input channel provides its own galvanic isolation 2608. The galvanic isolation can be provided by an opto-isolator device. Each set of 8 inputs 2608 has its own DC-DC convertor to provide an isolated power source.

An operating bypass is provided for certain protective actions when they are not necessary in a particular mode of plant operation. Different modes of plant operation may necessitate an automatic or manual bypass of a safety function. Operating bypasses are used to permit mode changes. A maintenance bypass is provided to bypass safety system equipment during maintenance, testing, or repair. A maintenance bypass may reduce the degree of redundancy of equipment, but it does not result in the loss of a safety function. Operating and maintenance bypasses are described in the following sections.

The MPS includes interlocks, permissives, and operational and maintenance bypasses that prohibit or permit certain protective actions either automatically or through a combination of automatic and manual actions to allow plant mode changes.

The MPS logic automatically prevents the activation of an operating bypass or initiates the appropriate safety function(s) when permissive or interlock conditions for the operating bypass are not met. The operating bypass circuits contain both permissive features that allow a protective function to be bypassed when the function is not required and interlock features that automatically activate an operating bypass when conditions are met. When permissive and interlock conditions are no longer met, operating bypasses are automatically deactivated.

Operating bypasses are required to allow changing plant modes and provide operator control of certain functions based on safety analysis or plant operations. Exemplary operating bypasses for MPS functions, interlocks, and permissives are listed in Table 4. (shown in FIGS. 30A-30C). These bypasses either automatically or manually block certain protective actions that otherwise prevent mode changes during plant operation (e.g., plant startup). The operating bypasses are automatically removed when the plant moves to an operating condition where the protective action is required to be operable. Indication is provided in the control room if some part of the system has been bypassed or taken out of service.

Manual operational bypasses have two switches, one per division. The only manual operating bypasses used for some designs use a permissive in conjunction with the manual bypass in order to achieve the function of the bypass. The operational bypass switches can be momentary-contact switches and will normally be open and only closed momentarily to enact an operational bypass function.

In the identified events, the failures are limited to one of two MPS divisions. The other MPS division is fully operable and capable of performing the safety function and no single failure disables a safety function. Inadvertent bypasses of a safety function are limited to one MPS division. The other MPS division is able to perform the required safety function.

For automatic and manual operating bypasses, a trip determination is used for the permissive or interlock from the separation group and is similar to the trip determination for a protective action. A three-out-of-four coincidence is used to determine when an operating bypass is warranted. To remove the operating bypass, two-out-of-four of the separation groups are needed to determine that the permissive or interlock is no longer valid and the operating bypass is automatically reset.

MPS variables are monitored by four redundant channels which actuate the protective functions utilizing two-out-of-four coincident logic. This configuration allows required safety functions to remain operable in the event of a single random failure of a protection channel concurrent with a channel in maintenance bypass.

The MPS is designed to permit the administrative bypass of a protection channel for maintenance, test, or repair. Indication is provided in the control room if an MPS channel has been administratively bypassed or taken out of service. The time period allowed for removal from service in maintenance bypass is administratively controlled by the plant technical specifications.

To perform maintenance on the MPS, there are two associated switches: a trip/bypass switch associated with each SFM and an out of service switch on the front of the SFM to allow removal of the SFM from service for maintenance and repair. With the out of service switch activated, the safety function is placed in trip or bypass based on the position of the trip/bypass switch for that SFM. Activating the out of service switch permits modification of the tunable parameters and setpoints in nonvolatile memory via the MWS. The trip bypass switch status input is received through the hard-wired module (HWM) which converts the switch position into a logic level signal and places this information onto the backplane.

The data packet received from the SFM contains the position of the out of service switch on the SFM. The scheduling and bypass module (SBM) determines if the SFM is out of service from the out of service switch position information received in the data packet from the SFM. If the SFM is out of service and the trip/bypass switch is in bypass, the SBM transmits a non-actuate or no-trip condition to the schedule and voting module (SVM) regardless of the output of the SFM. There is no change to the 2-out-of-4 voting coincidence logic; with one separation group providing a no trip to the SVM, requiring two of the remaining three channels received by the SVM to vote to trip/actuate. In this case, the MPS is still capable of performing the safety function with the required level of redundancy and continues to meet the single failure criteria.

If the SFM is out of service and the trip/bypass switch is in trip, the SBM transmits a trip/actuate signal to the SVM regardless of the output of the SFM. There is no change to the 2-out-of-4 voting coincidence logic. The SBM forces one channel to trip/actuate; with one separation group providing a trip/actuate input to the SVM, requiring one other separation group to issue a vote to trip/actuate to cause a trip/actuate to occur for the particular safety function. In this case, the MPS is in a "partial trip" condition, but still meets the single failure criteria and is capable of performing the safety function with the required level of redundancy.

In some implementations, the maintenance trip/bypass switches can be located on a panel in the separation group cabinets located in the MPS equipment rooms. The switches are connected to the HWM in the SFM chassis (shown in FIG. 13).

If the SFM is not out of service, the SBM transmits the safety function algorithm result that was calculated and transmitted from the SFM to the SBM. If the SBM does not receive a valid response from the SFM, an alarm is generated and the SBM uses the position of the trip/bypass switch to determine what to transmit to the SVM.

Using the out of service function of the SFM allows for periodic parameter updates of certain tunable parameters during an outage and during the fuel cycle. Periodic testing is required to verify operability of the safety function.

The MPS is designed to allow periodic and corrective maintenance during normal operation and during outages. For maintenance to be performed, the safety function must be removed from service. The affected channel is placed in a trip condition or bypass subject to technical specification limitations.

Safety functions within a separation group can be taken to bypass or trip for testing or corrective maintenance. The RTS and ESFAS divisions do not have bypass functionality; however, the modules have continuous self-testing coverage. The reactor trip breakers can be tested at power because of the breaker configuration by opening one breaker at a time. This allows for reactor trip breaker testing without the need for a maintenance bypass associated with the reactor trip breakers. Most of the ESFAS components are not tested at power since they cause a trip or engineered safety feature (ESF) actuation and need to be tested during an outage. The manual trip and actuate switches in the MCR cannot be tested at power and are tested during shutdown conditions in accordance with plant technical specifications.

Four reactor trip breakers are associated with each of two divisions of the MPS. The MPS divisions are configured so that opening a single division of breakers de-energizes the control rod drive mechanisms, thus causing the reactor trip (shown in FIG. 12). During testing of the trip actuation logic, the trip signals to the undervoltage trip mechanism of the reactor trip breakers are not actuated. The MPS is designed to permit overlapping online testing of MPS logic and reactor trip breakers.

The part of MPS that is not tested at power is the actuation priority logic circuit on the EIM. This includes the manual MCR switches and the enable non-safety control switch that provide inputs to the actuation priority logic. The actuation priority logic consists of discrete components and directly causes actuation of field components that cause the reactor to shutdown or adversely affect operation. The actuation priority logic is tested when the reactor is shut down. Due to the simplicity of the actuation priority logic circuit, testing during shutdown conditions is sufficient to ensure the actuation priority logic function performs as required.

For maintenance bypass purposes, the NMS is treated as a sensor input into the MPS where the MPS provides the bypass capability for maintenance purposes.

Indication is provided in the control room if an MPS channel has been administratively bypassed or taken out-of-service. The time period allowed for removal from service in maintenance bypass is administratively controlled by the technical specifications.

The MPS equipment status information is automatically sent to the MCS and SDIS. The MCS and SDIS will provide the operator with continuous indication of bypass, trip, and out of service status. The display of the status information allows the operator to identify the operability of the safety functions.

A Division I and Division II set of manual switches are provided for manual initiation of protective actions and are connected to the HWM of the corresponding RTS and ESFAS division. Input signals to the HWM are isolated, converted to logic level signals and placed on the backplane. These signals are provided to the associated EIM actuation priority logic circuits downstream of the FPGA logic components that generate automatic signals.

A Division I and Division II manual actuation switch is provided in the MCR for each of the following protective actions. Each manual actuation switch actuates the respective protective function within its associated division. Actuation of either divisional switch is sufficient to complete the safety function. The manual actuation switches can include, but are not limited to, reactor trip, ECCS actuation, decay heat removal actuation, containment isolation, demineralized water system isolation, chemical and volume control system isolation, pressurizer heater trip, and low temperature over pressure protection. Because the hard-wired manual actuation switch input is downstream of digital components within the MPS, failure of the MPS automatic function does not prevent the manual initiation of the required protective action.

If enabled by the operator using the safety-related enable non-safety control switch, the capability for manual component level control of ESF equipment is possible using non-safety discrete hard-wired inputs from the MCS to the HWM. These signals are then input to the actuation priority logic circuit on the EIM. Any automatic or manual safety related signal will override the non-safety signal and is prioritized within the actuation priority logic. For beyond DBEs and for a limited number of actuated equipment, a safety-related override switch can be used to prioritize a non-safety signal over an automatic signal.

Override switches are provided for the following function. Override switches can include two switches/one per division. Manual override switches can override the containment flooding and drain system and valves. Manual override switches can generate an alarm when activated. The manual controls are controlled administratively through approved plant procedures.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results. Accordingly, the above description of example implementations does not define or constrain this disclosure. Other changes, substitutions, and alterations are also possible without departing from the spirit and scope of this disclosure.

We claim:

1. A nuclear reactor protection system, comprising:
a first logic circuit configured in hardware to derive a first safety determination associated with an estimated condition of a nuclear reactor or a portion thereof, the first logic circuit receiving input from a first set of sensors wherein the first logic circuit comprises a combination of a first digital module and a first analog module and wherein the first analog module is configured to override operations of the first digital module;
a second logic circuit that is diverse from the first logic circuit and configured in hardware to derive a second safety determination, the second logic circuit receiving input from a second set of sensors that is separate from the first set of sensors,
wherein the second safety determination is redundantly associated with the estimated condition and separate from the first safety determination; and
a first display interface module coupled to the first logic circuit and configured in hardware to provide driver functionalities for displaying the first safety determination or the processing result thereof on one or more directly connected display panels; and
a second display interface module coupled to the second logic circuit and configured in hardware to provide driver functionalities for displaying the second safety determination on the one or more directly connected display panels, wherein the first display interface module and second display interface module have differences that preserve one or more forms of diversity in processing the first and second safety determinations.

2. The nuclear reactor protection system of claim 1, wherein the first display interface module and second display interface module are preconfigured in hardware settings and/or connections between circuit components therein to generate panel drive signals based on processing the first and second safety determinations, wherein the panel drive signals are configured to operate the one or more display panels to communicate the first and second safety determinations.

3. The nuclear reactor protection system of claim 2, wherein the first display interface module, the second display interface module, or a combination thereof comprises a field-programmable gate array (FPGA) configured in hardware to generate the panel drive signals.

4. The nuclear reactor protection system of claim 2, wherein the first display interface module and second display interface module are configured in hardware to generate the panel drive signals without executing software instructions.

5. The nuclear reactor protection system of claim 4, wherein the first display interface module and second display interface module comprise dedicated hardware configured to generate the panel drive signals, the dedicated hardware being unable to selectively implement a different function.

6. The nuclear reactor protection system of claim 2, wherein the first logic circuit, the second logic circuit, and the first display interface module and second display interface module are physically separate and independently operated circuits that are configured in hardware to operate without interacting with a common or centralized processor for reducing hardware-based single-point limitations.

7. The nuclear reactor protection system of claim 2, wherein the first display interface module and second display interface module are configured in hardware to serve as a display driver for the one or more display panels.

8. The nuclear reactor protection system of claim 1, further comprising:

a control circuit communicatively coupled to receive the first and second safety determinations and configured to generate a safety action signal based on the first and second safety determinations, wherein the safety action signal is configured to control a nuclear reactor safety actuator to address the estimated condition; and wherein the first display interface module and second display interface module are configured to generate one or more panel drive signals configured to operate the one or more display panels to communicate the estimated condition of the nuclear reactor safety actuator according to the first and second safety determinations.

9. The nuclear reactor protection system of claim 8, further comprising:

a monitoring and indication bus (MIB) communicatively coupled to the first logic circuit, the second logic circuit, and the first display interface module and second display interface module, wherein the MIB is configured to communicate status and/or diagnostics information associated with the nuclear reactor protection system to the first display interface module and second display interface module for displaying on the one or more display panels, wherein the status and/or diagnostics information includes the first and second safety determinations or representations thereof.

10. The nuclear reactor protection system of claim 9, further comprising an MIB communication circuit configured in hardware to operate as a dedicated master for the MIB by controlling communication of data exchanged over the MIB.

11. The nuclear reactor protection system of claim 9, wherein:

the first logic circuit includes two or more circuit groupings, wherein one of the circuit groupings is configured to logically derive the first safety determination and remaining of the circuit groupings is configured to logically derive one or more redundant determinations associated with the estimated condition;

the control circuit is configured to generate the safety action signal according to a majority of values indicated by the first safety determination and the one or more redundant determinations;

further comprising:

a safety function bus including two or more bus paths, wherein each of the two or more bus paths (1) individually couple one of the two or more circuit groupings to the control circuit, (2) is isolated from other paths in the safety function bus, and (3) is separate and independent from the MIB.

12. The nuclear reactor protection system of claim 11, wherein the first display interface module and second display interface module are configured to generate a panel drive signal based on a mismatch between the first safety determination and the one or more redundant determinations, wherein the panel drive signal represents a diagnostics information associated with the estimated condition.

* * * * *